(12) United States Patent
Yamazaki et al.

(10) Patent No.: US 7,019,909 B2
(45) Date of Patent: Mar. 28, 2006

(54) OPTICAL SYSTEM, IMAGE DISPLAY APPARATUS, AND IMAGE TAKING APPARATUS

(75) Inventors: Shoichi Yamazaki, Kanagawa (JP); Hideki Morishima, Tochigi (JP); Kazutaka Inoguchi, Tochigi (JP); Akinari Takagi, Tochigi (JP); Motomi Matsunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/292,014

(22) Filed: Nov. 12, 2002

(65) Prior Publication Data
US 2003/0197943 A1 Oct. 23, 2003

(30) Foreign Application Priority Data

| Nov. 14, 2001 | (JP) | ..................................... | 2001-349347 |
| Nov. 14, 2001 | (JP) | ..................................... | 2001-349349 |
| Nov. 14, 2001 | (JP) | ..................................... | 2001-349350 |
| Nov. 14, 2001 | (JP) | ..................................... | 2001-349352 |
| Nov. 14, 2001 | (JP) | ..................................... | 2001-349353 |

(51) Int. Cl.
*G02B 27/14* (2006.01)

(52) U.S. Cl. .................. 359/633; 359/630; 359/732

(58) Field of Classification Search ............... 359/633, 359/630–632, 727–732, 856–858, 859–861
See application file for complete search history.

(56) References Cited

U.S. PATENT DOCUMENTS

| 3,583,790 A | 6/1971 | Baker | .................. | 359/676 |
| RE27,356 E | 5/1972 | LaRussa | .................. | 359/494 |
| 3,697,154 A | 10/1972 | Johnson | .................. | 359/631 |
| 4,026,641 A | 5/1977 | Bosserman et al. | .................. | 359/869 |
| 4,081,209 A | 3/1978 | Heller et al. | .................. | 359/631 |
| 4,322,135 A | 3/1982 | Freeman | .................. | 359/643 |

(Continued)

FOREIGN PATENT DOCUMENTS

| EP | 0 380 035 A2 | 8/1990 |
| EP | 0 408 344 A2 | 1/1991 |
| EP | 0 618 471 A2 | 10/1994 |

(Continued)

OTHER PUBLICATIONS

European Search Report, Feb. 6, 2003.
Official Action of JP Application No. 2001-349347, dated Mar. 29, 2005 (w/ partial English translation).
Official Action of JP Application No. 2001-349349, dated Mar. 29, 2005 (w/ partial English translation).
Official Action of JP Application No. 2001-349350, dated Mar. 29, 2005 (w/ partial English translation).
Official Action of JP Application No. 2001-349352, dated Mar. 29, 2005 (w/ partial English translation).
Official Action of JP Application No. 2001-349353, dated Mar. 29, 2005 (w/ partial English translation).

*Primary Examiner*—Jordan M. Schwartz
(74) *Attorney, Agent, or Firm*—Morgan & Finnegan, LLP

(57) ABSTRACT

A small optical system that is capable of widening an angle of view is provided. This optical system is provided with a first surface having a reflecting action and a second surface that reflects a light beam reflected on this first surface toward the first surface again. Then, a principal ray at central angle of view that is made incident on the first surface again is reflected and travels to a side opposite to a side of the last time it was reflected from the first surface with respect to a normal line of a surface at a hit point thereof.

14 Claims, 25 Drawing Sheets

U.S. PATENT DOCUMENTS

| | | | |
|---|---|---|---|
| 4,563,061 A | 1/1986 | Ellis | 359/364 |
| 4,650,292 A | 3/1987 | Baker et al. | 359/720 |
| 4,669,810 A | 6/1987 | Wood | 340/908 |
| 4,775,217 A | 10/1988 | Ellis | 313/524 |
| 4,812,028 A * | 3/1989 | Matsumoto | 359/366 |
| 4,874,214 A | 10/1989 | Cheysson et al. | 359/15 |
| 4,969,724 A | 11/1990 | Ellis | 359/364 |
| 5,000,544 A | 3/1991 | Staveley | 359/630 |
| 5,006,072 A | 4/1991 | Letovsky et al. | 434/61 |
| 5,050,962 A | 9/1991 | Monnier et al. | 359/13 |
| 5,093,567 A | 3/1992 | Staveley | 250/221 |
| 5,134,521 A | 7/1992 | Lacroix et al. | 359/631 |
| 5,384,654 A | 1/1995 | Iba | 359/364 |
| 5,416,876 A | 5/1995 | Ansley et al. | 385/116 |
| 5,430,634 A | 7/1995 | Baker et al. | 362/32 |
| 5,436,763 A | 7/1995 | Chen et al. | 359/565 |
| 5,436,765 A | 7/1995 | Togino | 359/631 |
| 5,453,877 A | 9/1995 | Gerbe et al. | 359/633 |
| 5,459,612 A | 10/1995 | Ingleton | 359/630 |
| 5,479,224 A | 12/1995 | Yasugaki et al. | 353/101 |
| 5,483,307 A | 1/1996 | Anderson | 353/98 |
| 5,486,841 A | 1/1996 | Hara et al. | 345/8 |
| 5,486,892 A | 1/1996 | Suzuki et al. | 354/402 |
| 5,506,728 A | 4/1996 | Edwards et al. | 359/629 |
| 5,513,041 A | 4/1996 | Togino | 359/631 |
| 5,535,025 A | 7/1996 | Hegg | 359/40 |
| 5,539,422 A | 7/1996 | Heacock et al. | 345/8 |
| 5,546,227 A | 8/1996 | Yasugaki et al. | 359/630 |
| 5,594,588 A | 1/1997 | Togino | 359/631 |
| 5,596,433 A | 1/1997 | Konuma | 359/633 |
| 5,598,248 A | 1/1997 | Nagano et al. | 396/51 |
| 5,619,377 A | 4/1997 | Rallison | 359/631 |
| 5,640,632 A | 6/1997 | Koyama et al. | 396/382 |
| 5,663,833 A | 9/1997 | Nanba et al. | 359/631 |
| 5,671,062 A | 9/1997 | Nakamura | 359/687 |
| 5,699,194 A | 12/1997 | Takahashi | 359/633 |
| 5,701,202 A | 12/1997 | Takahashi | 359/631 |
| 5,734,505 A | 3/1998 | Togino et al. | 359/631 |
| 5,748,378 A | 5/1998 | Togino et al. | 359/633 |
| 5,768,024 A | 6/1998 | Takahashi | 359/631 |
| 5,768,025 A | 6/1998 | Togino et al. | |
| 5,777,795 A | 7/1998 | Colucci | 359/633 |
| 5,790,312 A | 8/1998 | Togino | 359/633 |
| 5,836,667 A | 11/1998 | Baker et al. | 362/32 |
| 5,875,056 A | 2/1999 | Takahashi | 359/633 |
| 5,917,656 A | 6/1999 | Hayakawa et al. | 359/637 |
| 5,936,773 A | 8/1999 | Togino | 359/630 |
| 5,995,291 A | 11/1999 | Togino | |
| 6,014,524 A | 1/2000 | Suzuki et al. | 396/50 |
| 6,018,423 A | 1/2000 | Takahashi | 359/633 |
| 6,023,373 A | 2/2000 | Inoguchi et al. | 359/633 |
| 6,084,715 A | 7/2000 | Aoki et al. | 359/627 |
| 6,128,136 A | 10/2000 | Togino et al. | |
| 6,166,859 A * | 12/2000 | Inuzuka et al. | 359/633 |
| 6,181,475 B1 | 1/2001 | Togino et al. | |
| 6,195,207 B1 | 2/2001 | Takahashi | 359/637 |
| 6,201,646 B1 | 3/2001 | Togino et al. | 359/629 |
| 6,222,676 B1 | 4/2001 | Togino et al. | 359/630 |
| RE37,175 E | 5/2001 | Takahashi | 359/631 |
| RE37,292 E | 7/2001 | Togino et al. | 359/633 |
| 6,310,736 B1 | 10/2001 | Togino | 359/834 |
| 6,317,267 B1 | 11/2001 | Takahashi | 359/630 |
| 2001/0009478 A1 | 7/2001 | Yamazaki et al. | 359/630 |
| 2001/0048552 A1 | 12/2001 | Koyama et al. | 359/431 |
| 2002/0003667 A1 * | 1/2002 | Curley et al. | 359/630 |
| 2002/0163734 A1 * | 11/2002 | Inoguchi | 359/631 |
| 2002/0163742 A1 | 11/2002 | Togino | 359/834 |
| 2003/0049062 A1 * | 3/2003 | Machida | 399/371 |

FOREIGN PATENT DOCUMENTS

| | | | |
|---|---|---|---|
| EP | 0 556 598 B1 | | 11/1997 |
| EP | 0 845 692 A2 | | 6/1998 |
| EP | 0 583 116 B1 | | 4/1999 |
| EP | 0 945 748 A2 | | 9/1999 |
| GB | 1 578 136 | | 11/1980 |
| GB | 2 108 283 A | * | 5/1983 |
| GB | 2 246 900 A | | 2/1992 |
| JP | 58-78116 | | 5/1983 |
| JP | 62-96627 U | | 6/1987 |
| JP | 62-214782 | | 9/1987 |
| JP | 1-274736 | | 11/1989 |
| JP | 2-297516 | | 12/1990 |
| JP | 3-101709 | | 4/1991 |
| JP | 03-109029 | | 5/1991 |
| JP | 4-242630 | | 8/1992 |
| JP | 4-343313 | | 11/1992 |
| JP | 5-303056 | | 11/1993 |
| JP | 7-191274 | | 7/1995 |
| JP | 7-333551 | | 12/1995 |
| JP | 8-50256 | | 2/1996 |
| JP | 8-160340 | | 6/1996 |
| JP | 8-179238 | | 7/1996 |
| JP | 8-248481 | | 9/1996 |
| JP | 9-033855 A | | 2/1997 |
| JP | 9-065245 A | | 3/1997 |
| JP | 9-197336 A | | 7/1997 |
| JP | 10-153748 | | 6/1998 |
| JP | 10-161018 A | | 6/1998 |
| JP | 11337863 | | 9/1999 |
| JP | 11-337863 A | | 12/1999 |
| JP | 2000-66106 | | 3/2000 |
| JP | 2000-105338 | | 4/2000 |
| JP | 2000-131614 | | 5/2000 |
| JP | 2000-131614 A | | 5/2000 |
| JP | 2000-199853 | | 7/2000 |
| JP | 2000-199853 A | | 7/2000 |
| JP | 2000-227554 | | 8/2000 |
| JP | 2000-231060 | | 8/2000 |
| JP | 2000-330025 A | | 11/2000 |

* cited by examiner

OPTICAL SYSTEM, IMAGE DISPLAY APPARATUS, AND IMAGE TAKING APPARATUS

BACKGROUND OF THE INVENTION

1. Field of the Invention

The present invention relates to a display optical system that is preferable for image display apparatuses such as a head-mount display and a projector for enlarging to display an original image displayed on an image display device or the like. The present invention also relates to an image taking optical system that is preferable for an image taking apparatus.

2. Related Background Art

There is well known an image display apparatus of a head-mounting type (head-mount display) that uses an image display device such as a CRT or an LCD to enlarge to display an image displayed on the display device via an optical system.

An image display apparatus such as the head-mount display is, in particular, desired to be miniaturized and lightened as the apparatus as a whole in order to be mounted on the head. In addition, when a weight balance, an appearance and the like are taken into account, it is desirable to make the apparatus thin in an visual axis direction of an observer. Moreover, an image is desirably enlarged as much as possible in order to make an enlarged image to be displayed powerful.

FIG. 32 shows an image display apparatus using a conventional coaxial concave mirror. In this apparatus, a light beam from an image displayed on a display device 101 is reflected on a half mirror 102 and made incident on a concave mirror 103, and the light beam reflected on the concave mirror 103 is guided to an eye E of an observer via the half mirror 102. The image displayed on the display device 101 is formed as a virtual image enlarged by the concave mirror 103. Consequently, the observer can observe the enlarged virtual image of the image displayed on the display device 101.

In addition, for example, in Japanese Patent Application Laid-open No. 7-333551 (European counterpart patent No. EP687932A2), Japanese Patent Application Laid-open No. 8-50256 (European counterpart patent No. EP687932A2), Japanese Patent Application Laid-open No. 8-160340, Japanese Patent Application Laid-open No. 8-179238 (European counterpart patent No. EP687932A2) and the like, there is proposed an image display apparatus that uses an LCD (liquid crystal display) as an image display device for displaying an image and a thin prism as an observation optical system to realize thinning of the entire apparatus.

FIG. 33 shows an image display apparatus that is proposed in Japanese Patent Application Laid-open No. 7-333551. In this apparatus, light emitted from an LCD 111 is made incident on an incidence surface 113 of a small eccentric prism 112. Then, a light beam is returned between a total internal reflection surface 114 and a reflection surface 115 which are formed in the prism 112 and have curvatures, and thereafter, exits from the eccentric prism 112 through the surface 114 and is guided to an eye E of an observer. Consequently, a virtual image of an image displayed on the display device (LCD) 111 is formed, and the observer observes this virtual image.

The reflection surface 115 of the eccentric prism 112 is constituted by an eccentric rotation asymmetrical surface (a surface having different optical power depending on an azimuth angle, a so-called free-form surface).

A type of an optical system shown in FIG. 33 has a characteristic that it is easy to make the entire apparatus thin and make an angle of view of an observation field of vision wide compared with a type using the conventional coaxial concave mirror shown in FIG. 33.

In recent years, precision of an LCD or the like that is a display device for displaying an image has been improved, and an LCD or the like has been developed which is miniaturized compared with that in the past while having the same number of pixels. When such a miniaturized image display device is used, although it is advantageous for miniaturization of an apparatus, it becomes necessary to increase a magnitude of an optical system in order to attain the same angle of view as in the past.

In view of such circumstances, Japanese Patent Application Laid-open No. 10-153748 proposes an optical system in which an eccentric prism and a relay lens system are combined, and an intermediate image is once formed by the relay lens system and, then, an image displayed on a display device is guided to an observer. Consequently, a magnitude is further improved and an angle of view is widened with respect to an LCD size while maintaining the characteristic that the entire apparatus is thin as shown in FIG. 33.

In addition, as an optical system with more improved optical performance compared with the optical system proposed in Japanese Patent Application Laid-open No. 10-153748, an optical system of a type in which a total internal reflection surface of an eccentric prism is increased to form an intermediate image only by the eccentric prism and guide the image to an observer, an optical system of a type in which a second eccentric prism is added to a first eccentric prism optical system, and the like are proposed in Japanese Patent Application Laid-open No. 2000-066106 (U.S. counterpart U.S. Pat. No. 6,310,736BA), Japanese Patent Application Laid-open No. 2000-105338, Japanese Patent Application Laid-open No. 2000-131614, Japanese Patent Application Laid-open No. 2000-199853 (U.S. counterpart U.S. Pat. No. 6,201,646BA), Japanese Patent Application Laid-open No. 2000-227554 and Japanese Patent Application Laid-open No. 2000-231060.

In general, an optical system of a type in which an intermediate image is once formed has a problem in that an optical path is lengthened and an apparatus becomes large. However, in the optical system proposed in each of the above-mentioned patent applications or patents, miniaturization is attempted through contrivances such as using a surface for carrying out both of a transmitting action and a reflecting action or making optical paths intersect.

SUMMARY OF THE INVENTION

The present invention has been devised in view of the above and other drawbacks, and it is an object of the present invention to provide a small display optical system that can attain a display wide angle of view while using a small display device and is small as a whole and an image taking optical system that can attain a photographing wide angle of view with a small size.

In order to attain the above-mentioned object, in an embodiment of the present invention, there is provided a display optical system for guiding light from an original image to an eye of an observer or a surface to have light projected thereon or an image taking optical system for guiding light from a subject to an image taking surface, which has a first surface having at least a reflecting action and a second surface for reflecting a light beam reflected on the first surface to the first surface again, wherein a principal ray at central angle of view that is made incident on the first surface again is reflected and travels to a side which is opposite to a side of the last time it was reflected from the first surface with respect to a normal line of the surface on a hit point thereof.

Note that, in the present invention, wording "the principal ray at central angle of view" means a ray exiting from center of objective plane and passing through center of pupil, or a ray passing through center of pupil and to be incident on to center of image plane.

That is, light is caused to direct generally back and forth between the first surface and the second surface to substantially duplicate optical paths (turn the optical paths into a forward and backward optical path), whereby a long optical path can be secured despite the fact that the optical system is small. Consequently, a display wide angle of view or a photographing wide angle of view can be attained while using a small original image (an image or the like displayed on an image display device), and then, it becomes possible to realize an optical system that is small as a whole.

In addition, after being reflected on the second surface and reflected again on the first surface, the light beam from the original image is reflected to the side of the eye or the surface to have light projected thereon on a third surface that is eccentric with respect to a light beam. This is for setting a light beam projected from the forward and backward optical path formed by the first and second surfaces to a direction different from a direction of a light beam made incident on the forward and backward optical path (to the side of the eye or the surface to have light projected thereon) on the third surface to avoid interference with light made incident on the forward and backward optical path.

On the other hand, after being reflected on the third surface that is eccentric with respect to a light beam, the light beam from the subject is reflected on the first surface and reflected again on the second surface, and then is reflected on the first surface again and travels to be guided to an image taking surface. This is for avoiding interference of light from the subject made incident on the forward and backward optical path formed by the first and second surfaces and exiting light guided to the image taking surface due to the reflection on the third surface.

An optical system described in detail in an embodiment below has a return surface having only a reflecting action on which a principal ray at center angle of view is returned and reflected generally on the opposite side. This corresponds to a turning point of a marathon race. A forward path and a backward path substantially duplicate with the return reflection surface as a boundary, a long forward and backward optical path including surfaces other than the first and second surfaces is formed, and further miniaturization of an optical system becomes possible.

Moreover, the return reflection surface is the first surface or the second surface. In this way, since an optical system can be constituted with the necessary minimum number of surfaces, miniaturization of the optical system can be realized.

Further, it is preferable to cause light to intermediately focus in an optical system (e.g., transparent body). That is, in the case of the display optical system, the display optical system is constituted as an intermediate focusing type for enlarging to display an intermediate focusing surface for a small original image, whereby a degree of freedom of layout increases, it becomes possible to display an original image on a large screen, and at the same time, it becomes possible to form the display optical system small even if an optical path length is made relatively long.

In addition, in the case of the image taking optical system, the image taking optical system is constituted as an intermediate focusing type for reducing an intermediate focusing surface of a subject to guide it to a photographing surface, whereby a degree of freedom of layout increases, it becomes possible to sufficiently reduce a subject image of a wide angle of view and guide it to a photographing surface, and at the same time, it becomes possible to form the image taking optical system small even if an optical path length is made rather long.

In addition, it becomes possible to realize further thinning of an optical system by causing an optical surface constituting the optical system to be eccentric with respect to a light beam. It also becomes possible by giving a curvature to an optical surface to remove an unnecessary surface in the optical system and realize reduction in size. Moreover, by forming an optical curved surface as a rotation asymmetrical surface (free-form surface), various aberrations can be corrected satisfactorily, it becomes possible to make an aspect ratio of an original image and an aspect ratio of a displayed image to be close to each other when a plurality of free-form surfaces are adopted, and it becomes possible to obtain a high quality displayed image or photographed image.

Further, this display optical system is preferable for an image display apparatus such as a head-mount display (HMD) that an observer mounts on the head to observe an image or a projecting image display apparatus (projector) for enlarging to project an image on a surface to have an image projected thereon such as a screen. The image taking optical system is preferable for an image taking apparatus such as a digital still camera or a video camera.

In addition, the rotation asymmetrical surface is preferably a plane symmetrical shape having a local meridian section as an only symmetrical surface. Consequently, it becomes possible to make processing and manufacturing of the optical system easier compared with the case in which the optical system does not have symmetricalness.

In addition, it is possible to reduce a loss in an amount of light even in a long optical path by forming optical surfaces on a transparent body and subjecting light to total internal reflection on any of the optical surfaces. In particular, when it is assumed that the first surface is an internal reflection surface, the display optical system and the image taking optical system can be arranged compactly.

Moreover, in both the display optical system and the image taking optical system, it is preferable to make a focal length of a local meridian section on a surface having an optical refracting power is the shortest in positive on a reflection surface of the third surface for reflecting light from an original image for a plurality of times on the first surface to be reflected to the side of an eye or a surface to have light projected thereon or a reflection surface of the third surface for reflecting light from a subject toward the first surface. If a strong refracting power is given to an eccentric surface, a twice as large eccentric aberration occurs on the local meridian section because there are a forward path and a backward path of light. Thus, it becomes possible to control the occurrence of the eccentric aberration on the local meridian section by giving strong positive power to the third surface for reflecting light only once.

In addition, in both the display optical system and the image taking optical system, it is preferable to form a surface for reflecting and returning light as a curved surface.

If the return reflection surface is a plane, since directions of light beams of images around it cannot be controlled respectively at the time of reflection, the optical system tends to be large. If the return reflection surface is a rotation asymmetrical surface, since directions of light beams of images around it can be controlled freely, it is possible to further miniaturize the optical system than in the case of a curved surface.

Here, the return reflection surface is preferably a surface having only a reflecting action and is applied metal mirror coating for reflecting almost 100% of light to reduce a loss in an amount of light as much as possible.

Further, the return reflection surface in the display optical system and the image taking optical system may also be used as an eccentric reflection surface. In this case, the optical system can be miniaturized because an optical surface can be reduced. In particular, if the first surface or the second surface is also used as the return reflection surface, miniaturization is most possible.

In addition, if this display optical system is used as a head mount display (HMD), it is preferable to provide original images (image display devices) and display optical systems independently from each other for both eyes. That is, two original images (identical) and two display optical systems (identical) corresponding to the original images are provided, whereby a displayed image that is brighter than a displayed image of the HMD for dividing light to right and left display optical systems by one original image.

In addition, in this display optical system, it is preferable to arrange local meridian sections, which are eccentric sections both for a left eye and a right eye, in a vertical direction of a human face (to return a light beam vertically). Usually, since a displayed enlarged image has a wide angle of view in the horizontal direction of a human face and a narrow angle of view in the vertical direction (at a ratio of 4:3 or 16:9), it is preferable to set the local meridian section, which is an eccentric section and has a large number of occurrences of an eccentric aberration, in the vertical direction in which an angle of view is small because occurrences of an eccentric aberration in the displayed enlarged image can be reduced.

Further, in other words, the above-mentioned optical system is constituted such that an angle of reflection with respect to a normal line at a hit point of a principal ray at central angle of view that is made incident on the first surface first and an angle of reflection with respect to a normal line at a hit point of a principal ray at central angle of view that is reflected on the second surface and made incident on the first surface again have opposite signs. That is, the optical system reflects light reflected on the first surface so as to return it to a first reflection area side (a reflection area, an area in the vicinity of the reflection area or an area close to the reflection area) of light on the first surface by the second surface to effectively duplicate optical paths and allow a long optical path to be contained in the small optical system.

DESCRIPTION OF THE PREFERRED EMBODIMENTS

Before starting description of an embodiment of the present invention, definitions of a meridian section, a sagittal section, a local meridian section and a local sagittal section used in this embodiment will be described.

In a definition of a conventional system that does not correspond to an eccentric system, when the z axis is assumed to be an optical axis in a vertex coordinate system of each surface, a yz section is a conventional meridian section and an xz section is a sagittal section.

Since an optical system of this embodiment is an eccentric system, a local meridian section and a local sagittal section that correspond to the eccentric system are defined anew.

A surface that includes incident light and exiting light of a principal ray at central angle of view on a hit point of a principal ray at central angle of view (in a display optical system, a light beam from an image center of a display device to an exit pupil center of a display optical system and, in an image taking optical system, a light beam passing through an entrance pupil center of the image taking optical system to reach an image center of an image taking device) and each surface is defined as a local meridian section. A surface that includes a hit point and is vertical to the local meridian section and parallel with a sagittal section of a vertex coordinate system of each surface (usual sagittal section) is defined as a local sagittal section.

A curvature of the principal ray at central angle of view on the hit point in each surface is calculated, and a radius of curvature ry of the local meridian section and a radius of curvature rx of the local sagittal section with respect to the principal ray at central angle of view in each surface are defined.

Moreover, indexes of refraction in front of and behind the pertinent surface are assumed to be nd and nd', respectively. Then, fy given by fy=ry/(nd'−nd) is defined as a focal length of the local meridian section, and fx given by fx=rx/(nd'−nd) is defined as a focal length of the local sagittal section.

In addition, a distance between a hit point of the pertinent surface with the principal ray at central angle of view and a hit point of the next surface with the principal ray at central angle of view (a value without air conversion at a distance on the principal ray at central angle of view) is defined as a surface interval d.

First Embodiment

Figure 1:
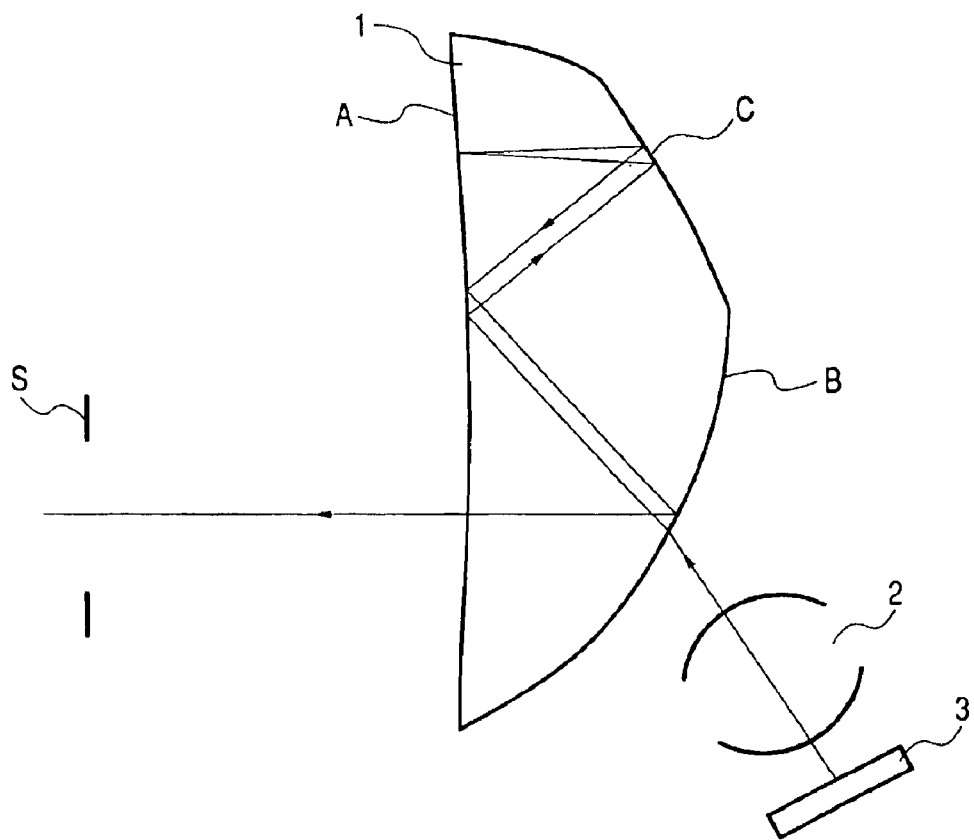
FIG. 1 is a diagram of a display optical system that is First Embodiment of the present invention.

FIG. 1 shows a display optical system that is First Embodiment of the present invention. This display optical system is constituted by a first optical system 1 and a second optical system 2 that are formed of transparent bodies filled with an optical medium such as glass or plastics having an index of refraction larger than one.

Three optical surfaces are formed on the transparent body of the first optical system 1 (hereinafter referred to also as first optical element 1). Both of a surface A (first surface) and a surface B (third surface) are surfaces for both transmission and reflection that act as a transmission surface and a reflection surface. A surface C (second surface) is a reflection surface.

Reflective films are formed on a part (upper part) of the surface A and the surface C, and a semi-transmission reflective film (half mirror) is formed on the surface B.

The upper part of the surface A is an area having a return reflecting action. The lower part of the surface A is an area where a light beam exits the surface A.

Further, the reflective film and the half mirror are preferably made of a metal film. This is because the metal film has a flat spectral reflectance characteristic and an inconspicuous color and has little difference of reflectance with respect to light having different deflection directions.

Reference numeral 3 in the figure denotes an image display device (LCD or the like) for displaying an image. In this embodiment, the surface B acts as an incidence surface and a reflection surface of light from the image display device 3, the surface A acts as a reflection surface and an exit surface, and the surface C acts as a reflection surface.

Light emitted from the image display device 3 is guided to the first optical element 1 via the second optical system 2. The light made incident on the first optical element 1 from the surface B is reflected on the surface A, and then reflected on the surface C to be guided to the upper part of the surface A. Then, after being returned and reflected on the upper part of the surface A, the light is reflected again on the surface C and returned to the vicinity of a first reflection area of the light on the surface A. Then, the light is reflected again on the surface A, further reflected on the surface B, transmitted through the lower part of the surface A and exits the first optical element 1 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 1, light passes through each surface in the order of the surface B (transmission)→the surface A (reflection)→the surface C (reflection)→the surface A (return reflection)→the surface C (re-reflection)→the surface A (re-reflection)→the surface B (re-reflection) (→the surface A (transmission)) and, on attaining the return reflection on the surface A, tracks back the optical path from that point to thereby reach the final reflection surface B.

Here, the optical path of the surface B (transmission)→the surface A (reflection)→the surface C (reflection)→the surface A (return reflection) is referred to as a forward path and the optical path of the surface A (return reflection)→the surface C (re-reflection)→the surface A (re-reflection)→the surface B (reflection) is referred to as a backward path. The forward path and the backward path are collectively referred to as a forward and backward optical path.

In particular, re-reflection on the surface A forms the forward and backward optical path such that a principal ray at central angle of view is reflected to advance to a side opposite to the first reflection on the surface A with respect to a normal line of a surface on its hit point.

In this way, the action as the return reflection surface is given to the surface A to form the forward and backward optical path in the first optical element 1, whereby the optical paths can be substantially duplicated to contain a long optical path in the first optical element 1. Consequently, the entire display optical system including the second optical system 2 can be miniaturized.

In addition, the light beam from the image display device 3 passes through the forward and backward optical path by the reflection on the final reflection surface B to be guided to the eyeball side.

Figure 2:
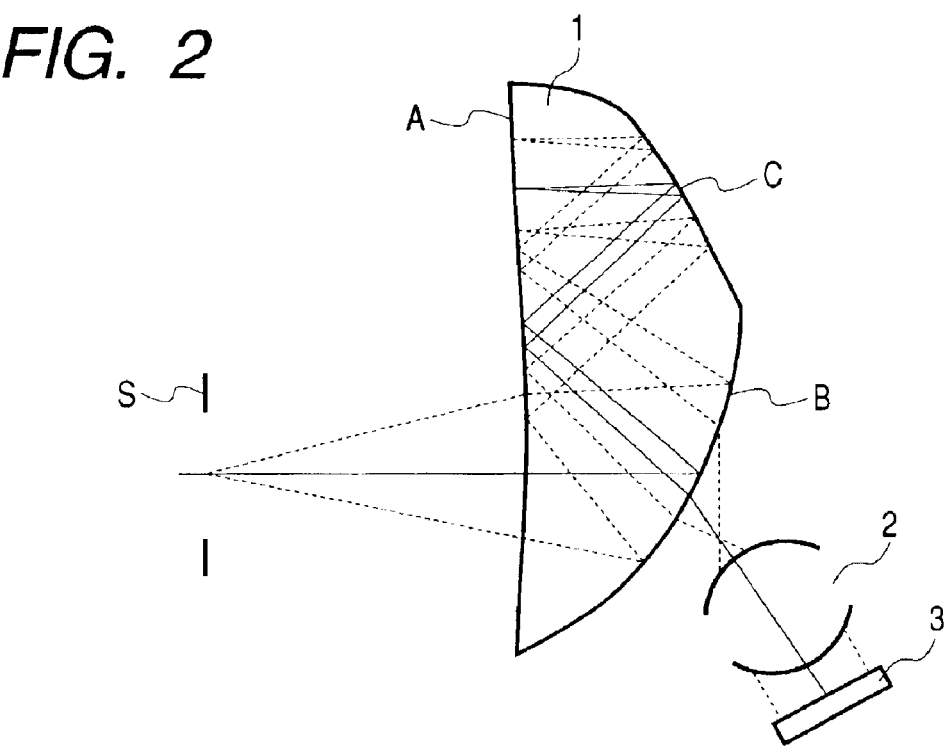
FIG. 2 is a diagram showing optical paths of a principal ray at maximum angle of view in the display optical system of FIG. 1.

Moreover, as indicated by dotted lines in FIG. 2, light beams emitted from the ends of the image display surface of the image display device 3 to reach the center of the exit pupil S (principal rays at maximum angle of view) are guided to the first optical element 1 through the second optical system 2 and to the center of the exit pupil S passing through the surfaces in the order of the surface B (incidence) →the surface A (reflection)→the surface C (reflection)→the surface A (return reflection)→the surface C (re-reflection) →the surface A (re-reflection)→the surface B (reflection) →the surface A (exit) in the same manner as the principal ray of central angle of view is guided.

Figure 3:
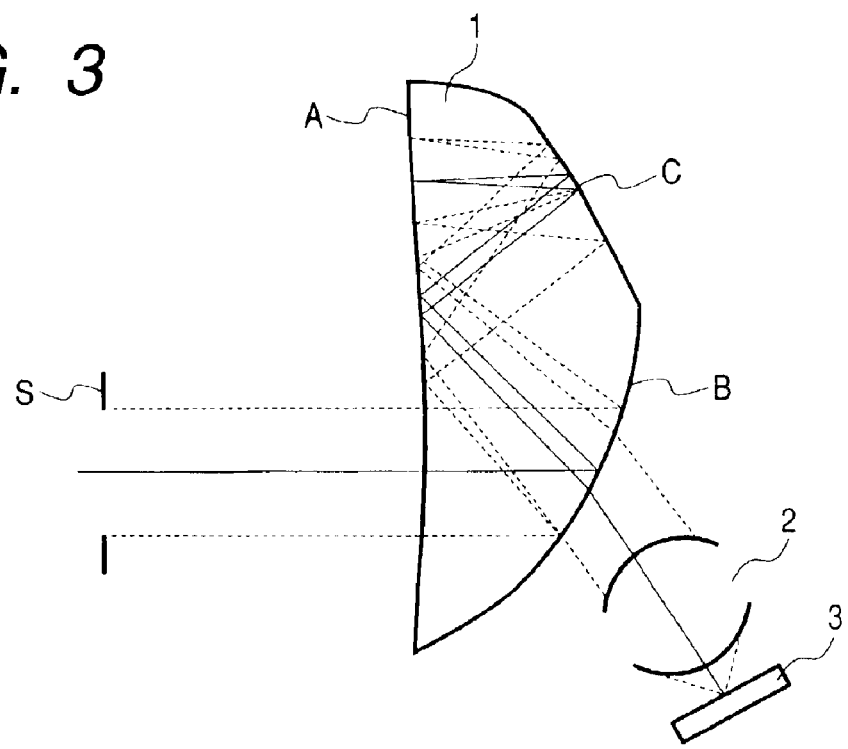
FIG. 3 is a diagram showing optical paths of a light beam emitted from a center of an image display surface in the display optical system of FIG. 1.

In addition, as indicated by a chain line in FIG. 3, a light beam emitted from the center of the image display surface of the image display device 3 to reach both the ends of the exit pupil S is guided to the first optical element 1 through the second optical system 2 and to both the ends of the exit pupil S passing through the surfaces in the order of the surface B (incidence)→the surface A (reflection)→the surface C (reflection)→the surface A (return reflection)→the surface C (re-reflection)→the surface A (re-reflection)→the surface B (reflection)→the surface A (exit) in the same manner as the principal ray at central angle of view is guided.

In this case, an intermediate image of an image displayed on the image display device 3 is formed in the first optical element 1. By forming the intermediate image in the first optical element 1, the optical system can be made compact even if the curvature of the second optical system 2 is weakened, and generation of excess aberrations in the second optical system 2 can be controlled to prevent the second optical system 2 from becoming complicated.

Further, although the intermediate image is formed between the re-reflection on the surface C and the re-reflection on the surface A in FIG. 3, an intermediate focusing position is not always required to be in this position but may be formed within the first optical element 1.

In addition, in order to facilitate correction of an aberration in a so-called ocular optical system part that guides an intermediate image to the exit pupil S as substantially parallel light, the intermediate focusing surface may be formed so as to be appropriately curved or have an astigmatic difference in accordance with a situation in which a curvature of field or an astigmatism occurs in the ocular optical system part.

In FIG. 3, the surface B that is the final reflection surface and the part acting as the re-reflection surface and the exit surface on the surface A correspond to the ocular optical system part. The other parts in the first optical system 1 and the second optical system 2 correspond to a relay optical system.

It is preferable to make the reflections other than the return reflection on the surface A total internal reflection because a loss in an amount of light is reduced. In addition, when at least light is subjected to total internal reflection in an area common for both a reflected light beam and an exiting light beam on the surface A (the lower part of the surface A) and light is reflected by reflective films in areas other than the common area, the same degree of brightness can be secured while increasing a degree of freedom of design compared with the case in which all reflected light beams other than the return reflection on the surface A are subjected to total internal reflection.

In addition, in a boundary of the reflective film area and the common area, boundaries of reflective films are clearly seen. Since this is not preferable, it is desirable to gradually increase a reflectance from the lower part toward the upper part in the vicinity of the boundary (between the upper part and the lower part of the surface A) to make the boundaries of the reflective films less conspicuous. Further, a metal film is preferable as the reflective film due to the reason described above.

In this embodiment, the surface B, when it acts as the final reflection surface, is a concave mirror having very strong optical power (1/focal length) with respect to the surface A (reflection, return reflection, re-reflection, and transmission) and the surface C (reflection and re-reflection) and assumes main power of the first optical system 1. Therefore, a large amount of eccentric aberrations occur in the concave mirror B and it is difficult to completely correct the aberrations only by the surface A and the surface B as ocular optical systems. Thus, an intermediate image is formed such that an intermediate focusing surface can be made in a form in which a relay optical system part cancels aberrations in the ocular optical system, whereby it becomes possible to improve an image quality in final image observation.

Since light is reflected twice or more on the surface A and the surface C in order to form a forward and backward optical path in the first optical system 1, power is given to the surface B and power of each of the surfaces A and C is set to be weak to control occurrence of aberrations.

In particular, since a local meridian section is an eccentric section, if positive power of the surface B on this section in a principal ray at central angle of view is set strong (focal length is set short) and power of each of the surfaces A and C is set weak, occurrence of eccentric aberrations can be controlled. In addition, power may be given to only the surface B and the surfaces A and C may be planes.

Since the surface B is an eccentric curved surface, it is desirable to use a surface of a rotation asymmetrical shape (so-called free-form surface) as the surface B to control occurrence of eccentric aberrations as much as possible. In addition, if another surface other than the surface B is a free-form surface, it becomes possible to set an aspect ratio of the image display device 3 and an aspect ratio of the enlarged display surface to close values.

In addition, if the surfaces A, B, and C are formed of curved surfaces, respectively, since all the surfaces contribute to condensing of light, or divergence or correction of an aberration, an effect of cost reduction can be expected.

More preferably, the three surfaces A, B, and C constituting the first optical system 1 are formed in a rotation asymmetrical shape, whereby a degree of freedom of correction of an eccentric aberration increases and it becomes possible to display an image with a high image quality.

At this point, it is preferable to form each rotation asymmetrical surface in a shape that is plane symmetrical in a direction of a local sagittal section having a local meridian section as an only symmetrical surface because processing and manufacturing can be easily performed compared with the case there is no symmetricalness.

By constituting the display optical system as described above, an image display apparatus can be provided which displays an image displayed on the image display device 3 as an enlarged image with a good optical performance.

In addition, a degree of freedom of setting a display angle of view with respect to a display size of the image display device 3 is improved by intermediately focusing light once in a transparent body to make it possible to set an angle of view wider (display an image at a high magnitude). At the same time, the total length of the first optical system 1 can be controlled to be short by substantially duplicating a forward and backward optical path with a long optical path length to constitute a very compact display optical system.

In the above-described embodiment, return reflection of the principal ray at central angle of view (in the display optical system, a light beam reaching the center of the exit pupil S from the center of display surface of an image display device and, in the image taking optical system, a light beam passing through the center of the entrance pupil to reach the center of an image taking surface of an image taking device) on the surface A is shown as substantially vertical reflection. However, the optical system of the present invention is not limited to this configuration.

Figure 4:
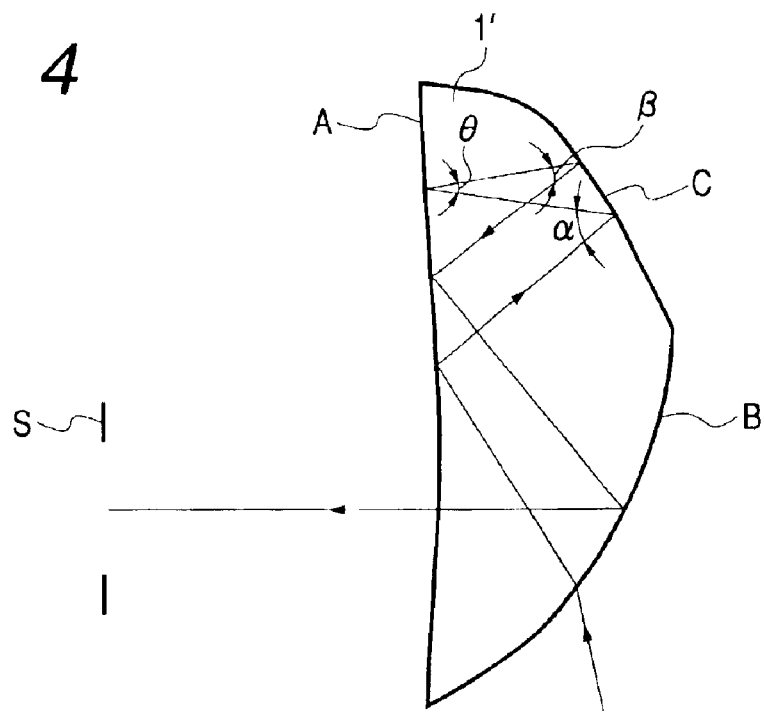
FIG. 4 is a diagram of a display optical system having optical paths of a principal ray at central angle of view different from those in FIG. 1.
Figure 5:
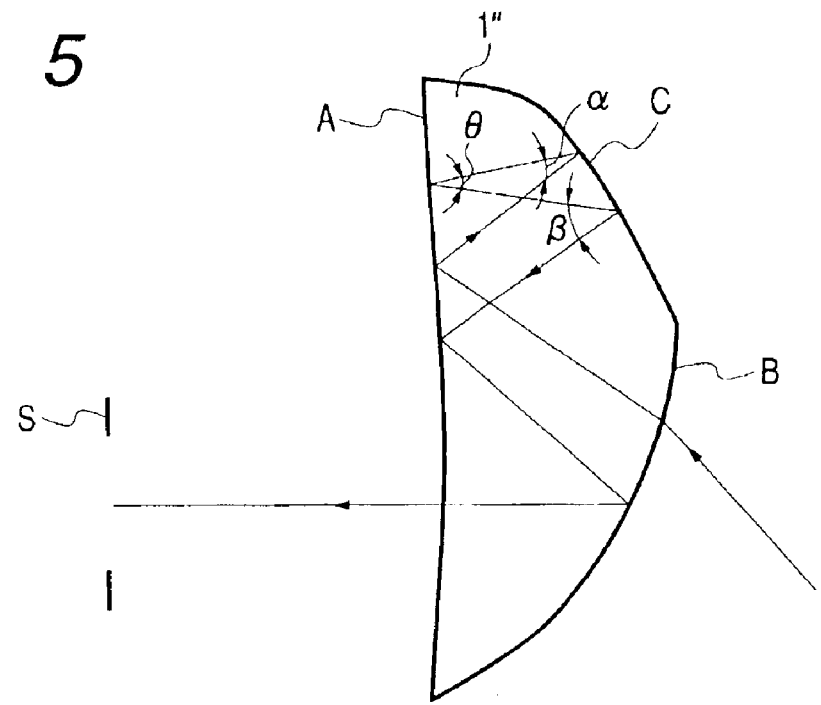
FIG. 5 is a diagram of a display optical system having optical paths of a principal ray at central angle of view different from those in FIG. 1.

FIGS. 4 and 5 show a structure of a display optical system in which return reflection as described above is not substantially vertical reflection, respectively. In first optical systems 1' and 1" shown in these figures, optical paths of principal rays at central angle of view are different from that shown in FIG. 1.

The first optical systems 1' and 1" shown in FIGS. 4 and 5 are the same as the first optical system 1 shown in FIG. 1 in that an optical path of the surface B (incidence)→the surface A (reflection)→the surface C (reflection)→the surface A (return reflection)→the surface C (re-reflection)→the surface A (re-reflection)→the surface B (reflection)→the surface A (exit) is formed.

However, the first optical system 1' of FIG. 4 is different from the first optical system 1 of FIG. 1 in that a principal ray at central angle of view reflected on the surface C is first returned and reflected at an angle of θ on the surface A and re-reflected at a position higher than the previous reflection point on the surface A (provided that it is an area close to the first reflection area of the light beam).

In addition, the first optical system 1" of FIG. 5 is different from the first optical system 1 of FIG. 1 in that a principal ray at central angle of view reflected on the surface C is first returned and reflected at an angle of θ on the surface A and re-reflected at a position lower than the previous reflection point on the surface A (provided that it is an area close to the first reflection area of the light beam).

In this way, a light beam may be incident and reflected with a predetermined angle θ in front of and behind the return reflection surface A. However, the angle θ is defined as follows:

$$|\theta| < 60°  \quad (1)$$

If the angle θ exceeds the upper limit of this conditional expression (1), an optical path after the return reflection (backward path) does not track back a forward path, and a zigzag optical path is formed rather than a forward and backward optical path. As a result, the optical system becomes large.

$$|\theta| < 30°  \quad (2)$$

If the angle θ deviates from the condition of this conditional expression (2), a backward path can retract a forward path but they do not overlap. Thus, the optical system becomes large to make it difficult to miniaturize the entire optical system. Therefore, this condition is not preferable.

$$|\theta| < 20°  \quad (3)$$

If the angle θ satisfies this conditional expression (3), it becomes possible to further miniaturize the optical system.

Moreover, in FIGS. 4 and 5, a principal ray at central angle of view reflected on the surface A and made incident on the surface C first is reflected on the surface C with an angle of α, returned and reflected on the return reflection surface A at an angle of θ, and re-reflected with an angle of β when the light beam is incident on the surface C for the second time. In this case, the angles α and β preferably satisfy the following expressions, respectively:

$$25° < |\alpha| < 85°  \quad (4)$$

$$20° < |\beta| < 75°  \quad (5)$$

When the angle α deviates from the condition of the above-mentioned expression (4), the first optical system becomes large and it becomes difficult to miniaturize the entire display optical system. Similarly, if the angle β deviates from the condition of the expression (5), the first optical system becomes large and it becomes difficult to miniaturize the entire display optical system.

In addition, in the first optical systems 1, 1' and 1" shown in this embodiment, when it is assumed that: a focal length of local meridian section fy is to be fya when a principal ray at central angle of view is returned and reflected on the surface A among hit points on each surface of the principal ray at central angle of view in the case in which light follows the optical path of the surface B (incidence)→the surface A (reflection)→the surface C (reflection)→the surface A (return reflection)→the surface C (re-reflection)→the surface A (re-reflection)→the surface B (reflection)→the surface A (exit); and a focal length of local meridian section fy is to be fyc when the principal ray at central angle of view is re-reflected on the surface C, fya and fyc desirably satisfy a condition of the following expression:

$$|fyc/fya| \leq 4  \quad (6)$$

When the upper limit of the expression (6) is exceeded, total reflection at the time when light is reflected and re-reflected on the surface A (excluding return reflection) and return reflection on the surface A cannot be made.

Second Embodiment

Figure 6:
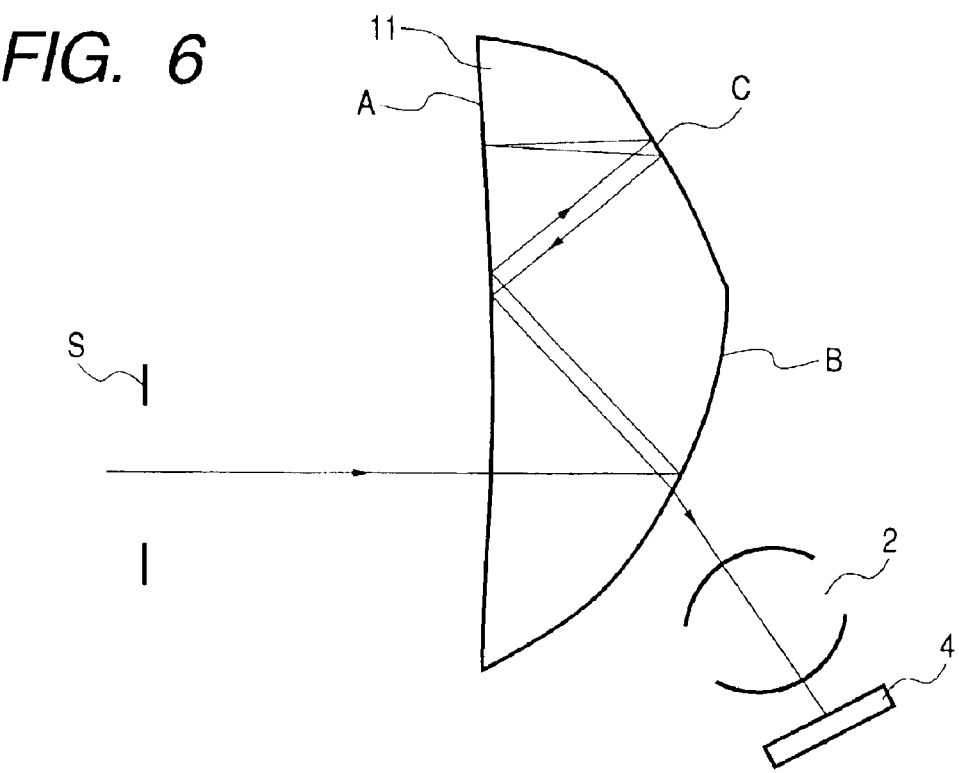
FIG. 6 is a diagram of an image taking optical system that is Second Embodiment of the present invention.

FIG. 6 shows an image taking optical system that is Second Embodiment of the present invention. Reference numeral 11 in the figure denotes a first optical system that is the same as that shown in FIG. 1; 2, a second optical system; and 4, a solid-state image taking device (photoelectric conversion device) such as a CCD or a CMOS.

Reference symbol S denotes an entrance pupil of the image taking optical system consisting of the first optical system (hereinafter referred to as first optical element) 11 and the second optical system 2. The stop S is placed in this position to prevent incidence of unnecessary light.

In this embodiment, a surface A (first surface) acts as an incidence surface and a reflection surface of light from a subject, a surface B (third surface) acts as a reflection surface and an exit surface, and a surface C (second surface) acts only as a reflection surface.

Light from the outside that has passed the stop S is incident on the first optical element 11 from the surface A, reflected on the surface B, reflected on the surface A, and reflected on the surface C to be guided to the upper part of the surface A. Then, after being returned and reflected on the surface A having a return reflecting action in its upper part, the light is re-reflected on the surface C, re-reflected in the vicinity of a first reflection area of light on the surface A, and transmitted through the surface B to exit the first optical element 11 to travel toward the second optical system 2.

The light that has passed through the second optical system 2 is guided to the image taking device 4 to be focused. In this case, a light beam from a desired image of the outside is focused on an image taking surface of the image taking device 4 to make it possible to obtain the image of the outside.

By constituting the image taking optical system as described above, an image taking apparatus can be provided which focuses a subject outside on the image taking device 4 with a high optical performance. In addition, a degree of freedom of an image taking angle of view with respect to a display size of the image display device 4 is improved by intermediately focusing light once in the first optical element 11 to make it possible to set a wider angle of view (present a high magnitude). At the same time, the total length of the first optical system 11 can be controlled to be short by substantially duplicating a long optical length to be formed in the first optical element 11 to constitute a very compact image taking optical system.

Further, in this embodiment, it is also desirable to satisfy the Expressions (1) to (6) described in First Embodiment.

Third Embodiment

Figure 7:
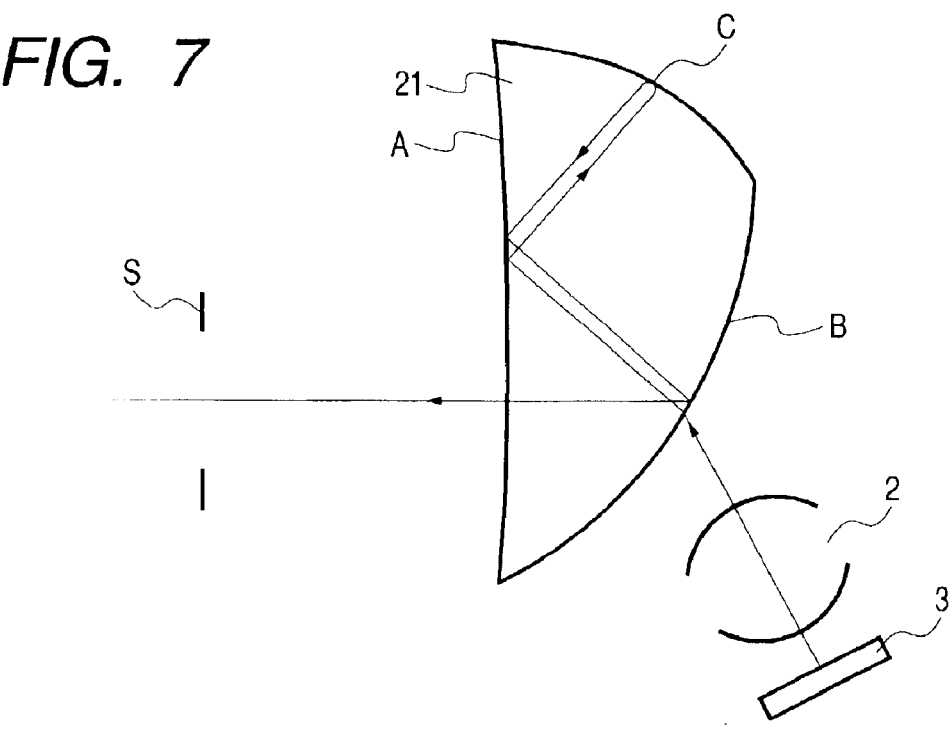
FIG. 7 is a diagram of a display optical system that is Third Embodiment of the present invention.

FIG. 7 shows a display optical system that is Third Embodiment of the present invention. This display optical system is constituted by a first optical system 21 and a second optical system 2. Three optical surfaces are formed on a transparent body forming the first optical system 21 (hereinafter referred to as first optical element 21). Both of a surface A (first surface) and a surface B (third surface) are surfaces for both transmitting and reflecting actions as a transmission surface and a reflection surface, and a return reflection surface C (second surface) is a surface for only a reflecting action.

Reflective films are formed on the reflection surface C, and a semi-transmission reflective film (half mirror) is formed on the surface B.

Further, the reflective film and the half mirror are preferably made of a metal film.

Reference numeral 3 in the figure denotes an image display device (LCD or the like) for displaying an image. In this embodiment, the surface B acts as an incidence surface and a reflection surface of light from the image display device 3, the surface A acts as a reflection surface and an exit surface and the surface C acts as a reflection surface.

Light emitted from the image display device 3 is guided to the first optical element 21 via the second optical system 2. The light incident on the first optical element 21 from the surface B is reflected on the surface A to be guided to the return reflection surface C. On the return reflection surface C, the incident light is reflected so as to be returned substantially opposite to the incident direction. The light is returned to the vicinity of a first reflection area of the light on the surface A. Then, the light is reflected again on the surface A, reflected on the surface B, transmitted through the surface A and exits the first optical element 21 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 21, light passes through each surface in the order of the surface B (incidence)→the surface A (reflection)→the surface C (return reflection)→the surface A (re-reflection)→the surface B (reflection)→the surface A (exit), and on attaining the return reflection on the surface C, tracks back the optical paths from that point.

The optical path of the surface B→the surface A→the return reflection surface C is formed as a forward path and the optical path of the return reflection surface C→the surface A→the surface B is formed as a backward path. The forward path and the backward path are collectively formed as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path is formed in the first optical element 21, whereby the optical paths can be substantially duplicated to effectively utilize the inside of the first optical element 21. Consequently, the first optical element 21 can be reduced in size with respect to the optical path length, and thus the entire display optical system can be miniaturized.

The reflection in the return reflection surface C is based on the reflective film. In addition, the light from the image display device 3 passes through the forward and backward optical path by the reflection on the surface B and is guided to the eyeball side.

Figure 8:
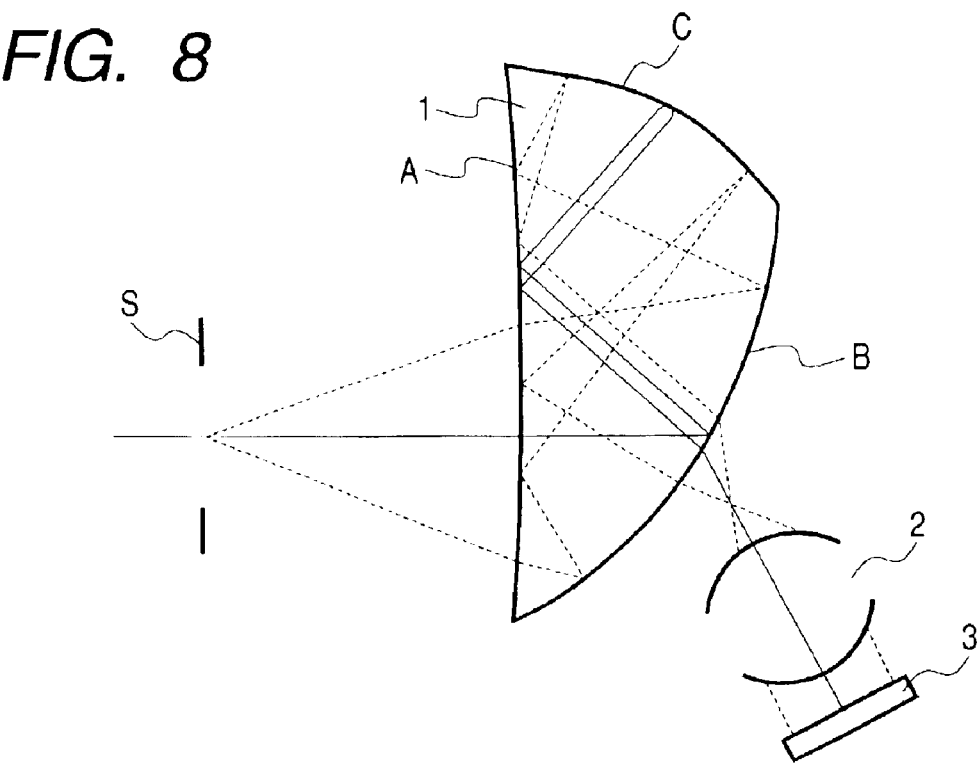
FIG. 8 is a diagram showing optical paths of a principal ray at maximum angle of view in the display optical system of FIG. 7.

Moreover, as indicated by dotted lines in FIG. 8, light beams emitted from the ends of the image display surface of the image display device 3 to reach the center of the exit pupil S (principal rays at maximum angle of view) are guided to the first optical element 1 through the second optical system 2 and to the center of the exit pupil S passing through the surfaces in the order of the surface B (incidence)→the surface A (reflection)→the surface C (return reflection)→the surface A (reflection)→the surface B (reflection)→the surface A exit in the same manner as the principal ray of central angle of view is guided.

Figure 9:
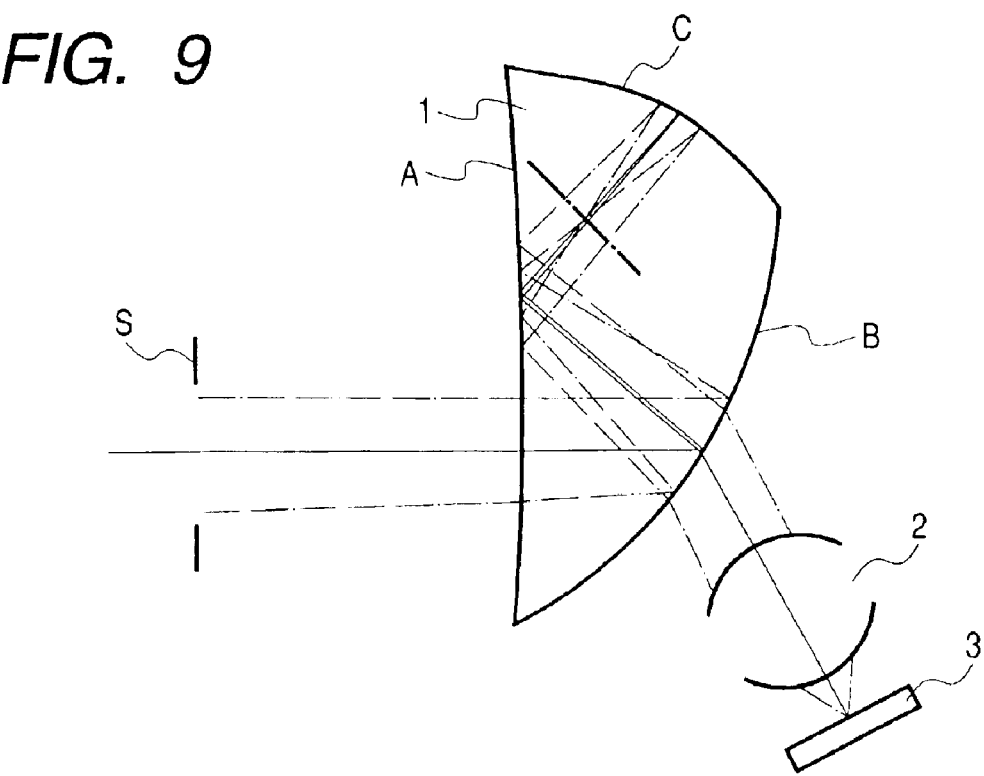
FIG. 9 is a diagram showing optical paths of a light beam emitted from a center of an image display surface in the display optical system of FIG. 7.

In addition, as indicated by a chain line in FIG. 9, a light beam emitted from the center of the image display surface of the image display device 3 to reach both the ends of the exit pupil S is guided to the first optical element 1 through the second optical system 2 and to both the ends of the exit pupil S passing through the surfaces in the order of the surface B (incidence)→the surface A (reflection)→the surface C (return reflection)→the surface A (reflection)→the surface B (reflection)→the surface A (exit) in the same manner as the principal ray at central angle of view is guided.

In this case, an intermediate image of an image displayed on the image display device 3 is formed in the first optical system 1. By forming the intermediate image in the first optical element 1, the optical system can be made compact even if the power of the second optical system 2 is weakened, and generation of excess aberrations in the second optical system 2 can be controlled to prevent the second optical system 2 from becoming complicated.

Further, although the intermediate image is formed between the return reflection on the surface C and the reflection on the surface A in FIG. 9, an intermediate focusing position is not always required to be in this position but may be formed within the first optical element 1.

In addition, in order to facilitate correction of an aberration in a so-called ocular optical system part that guides an intermediate image to the exit pupil S as substantially parallel light, the intermediate focusing surface may be formed so as to be appropriately curved or have an astigmatic difference in accordance with a situation in which a curvature of field or an astigmatism occurs in the ocular optical system part.

In FIG. 9, the surface B that is the final reflection surface and the part acting as the exit surface on the surface A correspond to the ocular optical system part. The other parts in the first optical system 1 and the second optical system 2 correspond to a relay optical system.

It is preferable to make the reflection on the surface A total internal reflection because a loss in an amount of light is reduced. In addition, when at least light is subjected to total internal reflection in an area common for both a reflected light beam and an exiting light beam on the surface A (the lower part of the surface A) and light is reflected by reflective films in areas other than the common area, the same degree of brightness can be secured while increasing a degree of freedom of design compared with the case in which all reflected light beams on the surface A are subjected to total internal reflection.

In addition, in a boundary of the reflective film area and the common area, boundaries of reflective films are clearly seen. Since this is not preferable, it is desirable to gradually increase a reflectance from the lower part toward the upper part in the vicinity of the boundary (in the lower part side in the reflective film area) to make the boundaries of the reflective films less conspicuous.

In this embodiment, the surface B, when it acts as the final reflection surface, is a concave mirror having very strong optical power (1/focal length) with respect to the surface A (reflection, re-reflection, and transmission) and assumes main power of the first optical system 1. Therefore, a large amount of eccentric aberrations occur with the concave mirror B and it is difficult to completely correct the aberrations only by the surface A and the surface B as ocular optical systems. Thus, an intermediate image is formed such that an intermediate focusing surface can be made in a form in which a relay optical system part cancels aberrations in the ocular optical system, whereby it becomes possible to improve an image quality in final image observation. In addition, since light is reflected twice on the surface A due to the forward and backward optical path, power is given to the surface B and power of the surface A is set to be weak to control occurrence of aberrations.

In particular, since a local meridian section is an eccentric section, if power of the surface B on this section is set strong and power of the surface A is set weak with respect to a principal ray at central angle of view, occurrence of eccentric aberrations can be controlled.

In addition, power may be given to only the surface B and the surface A may be a plane. Furthermore, since the surface B is an eccentric curved surface, it is desirable to use a surface of a rotation asymmetrical shape (so-called freeform surface) as the surface B to control occurrence of eccentric aberrations as much as possible.

In addition, if another reflection surface other than the surface B is a free form surface, it becomes possible to set an aspect ratio of the image displayed on the image display device 3 and an aspect ratio of the enlarged display surface to close values.

In addition, if the surfaces A, B and C are formed of curved surfaces, respectively, since all the surfaces contribute to condensing of light, divergence or correction of an aberration, an effect of cost reduction can be expected.

More preferably, the three surfaces A, B and C constituting the first optical system 1 are formed in a rotation asymmetrical shape, whereby a degree of freedom of correction of an eccentric aberration increases and it becomes possible to display an image with a high image quality. At this point, it is preferable to form each rotation asymmetrical surface in a shape that is plane symmetrical in a direction of a local sagittal section having a local meridian section as an only symmetrical surface because processing and manufacturing can be easily performed compared with the case where there is no symmetricalness.

In addition, a degree of freedom of setting a display angle of view with respect to a display size of the image display device 3 is improved by intermediately focusing light once in a transparent body to make it possible to set an angle of view wider (display of an image at a high magnification). At the same time, the total length of the first optical system 1 can be controlled to be short by substantially duplicating a forward and backward optical path with a long optical path length to constitute a very compact display optical system.

Further, in this embodiment, it is also desirable to satisfy Expressions (1) to (6) described in First Embodiment.

Further, although a display optical system having a first optical system is described in this embodiment, a similar idea in this embodiment may be applied to an image taking optical system shown in Second Embodiment.

Fourth Embodiment

Figure 10:
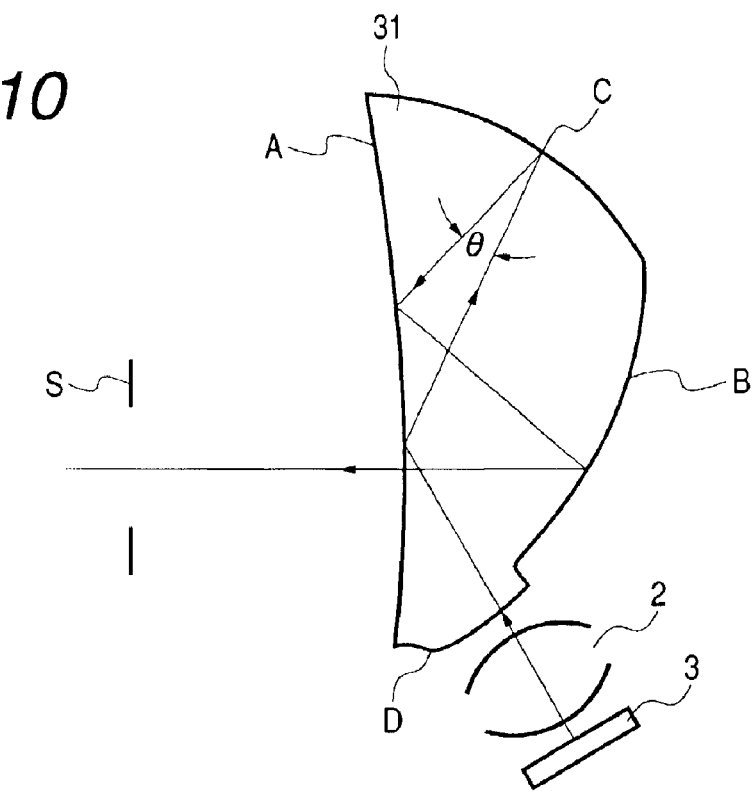
FIG. 10 is a diagram of a display optical system that is Fourth Embodiment of the present invention.

FIG. 10 shows a display optical system that is Fourth Embodiment of the present invention. This display optical system is constituted by a first optical system 31 and a second optical system 2. Four optical surfaces are formed on a transparent body forming the first optical system (hereinafter referred to as first optical element) 31. A surface A (first surface) is a surface used for both transmitting and reflecting actions as a transmission surface and a reflection surface, a return reflection surface C (second surface) and a surface B (third surface) are surfaces for only a reflecting action, and an incidence surface D is a transmission surface.

Reflective films are formed on the return reflection surface C and the surface B. Further, the reflective films are preferably made of a metal film.

Reference numeral 3 in the figure denotes an image display device (LCD or the like) for displaying an image. In this embodiment, the surface D acts as an incidence surface of light from the image display device 3, the surface A acts as a reflection surface and an exit surface and the surfaces B and C act as a reflection surface.

Light from the image display device 3 is guided to the first optical element 31 via the second optical system 2. The light made incident on the first optical element 31 from the incidence surface D is reflected on the surface A to be guided to the return reflection surface C. The light is reflected on the surface C so as to be returned to the vicinity of a first reflection area of the light made incident on the surface A. In this case, an angle formed by the incident light and the reflected light on the return reflection surface C of a principal ray at central angle of view is θ.

Then, the light is reflected again on the surface A, further reflected on the surface B, transmitted through the surface A and exits the first optical element 31 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 31, light passes through each surface in the order of the surface D (incidence)→the surface A (reflection)→the surface C (return reflection)→the surface A (re-reflection)→the surface B (reflection)→the surface A (exit), and on attaining the return reflection on the surface C, tracks back the optical paths from that point.

Here, the optical path of the surface A→the surface C (return reflection) is referred to as a forward path and the optical path of the surface C (return reflection)→the surface A is referred to as a backward path. The forward path and the backward path are collectively referred to as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path is formed in the first optical element 31, whereby the optical paths can be substantially duplicated to effectively utilize the inside of the first optical element 31. Consequently, the first optical system 31 can be reduced in size with respect to the optical path length and thus the entire display optical system can be miniaturized.

In addition, the light beam from the image display device 3 passes through the forward and backward optical path by the reflection on the surface B and is guided to the eyeball side instead of the image display device 3 side.

The display optical system of this embodiment is advantageous in terms of brightness compared with the display optical systems of First to Third Embodiments. In First to Third Embodiments, since light from an image display device is incident from the surface B of the first optical system and the surface B has a reflecting action in the optical path of the first optical system, the first optical system needs to be a half mirror. Therefore, an amount of light from the image display device is substantially halved when the light enters the first optical system.

On the other hand, in this embodiment, an angle θ formed by incident light and reflected light of a principal ray at central angle of view to the return reflection surface C is set to a relatively large value and the backward path is set to be extended to the surface A such that the light thereafter reaches the surface B which is separate from the incidence surface D. In this way, by separating the incidence surface D and the surface B (surface having only a reflecting action), a loss in an amount of light at the time of incidence on the first optical system is eliminated and a bright display optical system is realized.

It is preferable to make the reflection on the surface A total internal reflection because a loss in an amount of light is reduced. In addition, when at least light is subjected to total internal reflection in an area common for both a reflected light beam and an exiting light beam on the surface A (the lower part of the surface A) and light is reflected by reflective films in areas other than the common area, the same degree of brightness can be secured while increasing a degree of freedom of design compared with the case in which all reflected light beams on the surface A are subjected to total internal reflection.

In addition, in a boundary of the reflective film area and the common area, boundaries of reflective films are clearly seen. Since this is not preferable, it is desirable to gradually increase a reflectance from the lower part toward the upper part in the vicinity of the boundary (the lower part side within the reflective film area) to make the boundaries of the reflective films less conspicuous.

In this embodiment, the surface B, when it acts as the final reflection surface, is a concave mirror having very strong optical power (1/focal length) with respect to the surface A (reflection, re-reflection and transmission) and assumes main power of the first optical system 31. This is because since light is reflected twice on the surface A due to a forward and backward optical path, power is given to the surface B and power of the surface A is set to be weak to control occurrence of aberrations.

In particular, since a local meridian section is an eccentric section, if power of the surface B on this section is set strong and power of the surface A is set weak with respect to a principal ray at central angle of view, occurrence of eccentric aberrations can be controlled.

In addition, power may be given to only the surface B and the surface A may be a plane. Since the surface B is an eccentric curved surface, it is desirable to use a surface of a rotation asymmetrical shape (so-called free-form surface) as the surface B to control occurrence of eccentric aberrations as much as possible.

In addition, if another reflection surface other than the surface B is a free-form surface, it becomes possible to set an aspect ratio of the image displayed on the image display device 3 and an aspect ratio of the enlarged display surface to close values.

In addition, if the surfaces A, B, C, and D are formed of curved surfaces, respectively, since all the surfaces contribute to condensing of light, divergence or correction of an aberration, an effect of cost reduction can be expected.

More preferably, the four surfaces A, B, C and D constituting the first optical system 31 are formed in a rotation asymmetrical shape, whereby a degree of freedom of correction of an eccentric aberration increases and it becomes possible to display an image with a high image quality.

At this point, it is preferable to form each rotation asymmetrical surface in a shape that is plane symmetrical in a direction of a local sagittal section having a local meridian section as an only symmetrical surface because processing and manufacturing can be easily performed compared with the case where there is no symmetricalness.

In addition, a degree of freedom of setting a display angle of view with respect to a display size of the image display device 3 is improved by intermediately focusing light once in a transparent body to make it possible to set an angle of view wider (display of an image at a high magnitude). At the same time, the total length of the first optical system 31 can be controlled to be short by substantially duplicating a forward and backward optical path with a long optical path length to constitute a very compact display optical system.

Further, also in this embodiment, it is desirable that Expressions (1) to (6) described in First Embodiment be satisfied.

Further, although a display optical system having a first optical system is described in this embodiment, a similar idea may be applied to an image taking optical system shown in Second Embodiment.

Fifth Embodiment

Figure 11:
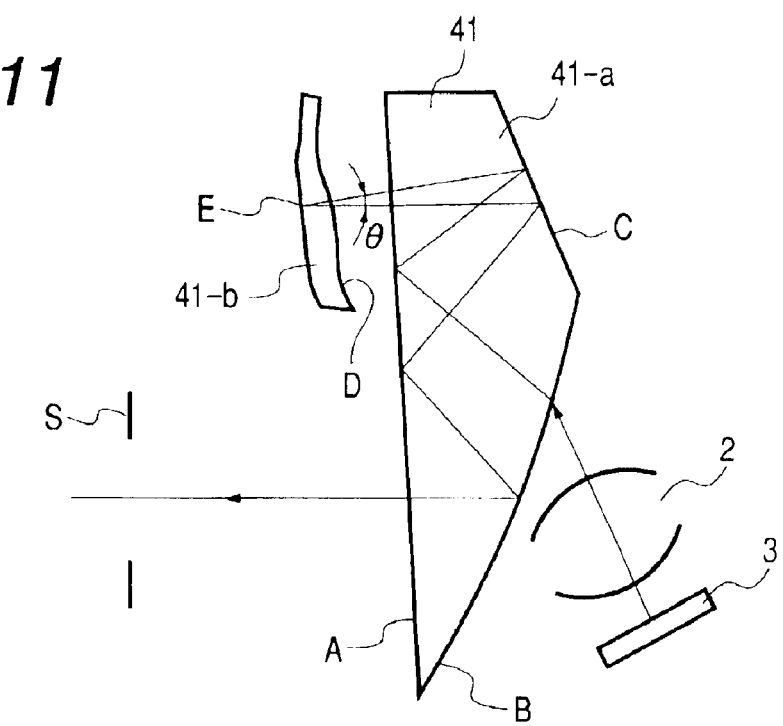
FIG. 11 is a diagram of a display optical system that is Fifth Embodiment of the present invention.

FIG. 11 shows a display optical system that is Fifth Embodiment of the present invention. This display optical system is constituted by a first optical system 41 consisting of an optical element 41-$a$ and a reflective member 41-$b$, which are transparent bodies, and a second optical system 2.

The optical element 41-a has three optical surfaces. A surface A (first surface) and a surface B (third surface) are surfaces used for both transmitting and reflecting actions as a transmission surface and a reflection surface, and a surface C (second surface) is a surface only for a reflecting action. The reflective member 41-b has a transmission surface D eccentric with respect to a principal ray at central angle of view and a return reflection surface E of a back side reflection.

Reflective films are formed on the surface C and the return reflection surface E of the reflective member 41-b, and the surface B is formed of the half mirror. Further, the reflective film and the half mirror are preferably made of a metal film.

Reference numeral 3 in the figure denotes an image display device (LCD or the like) for displaying an image. In this embodiment, the surface B acts as an incidence surface and a reflection surface of light from the image display device 3, and the surface A acts as an exit surface (exits toward the reflective member 41-b and toward an exit pupil S) and a reflection surface.

Light emitted from the image display device 3 is guided to the optical element 41-a of the first optical system 41 via the second optical system 2. After being incident on the optical element 41-a from the surface B, the light is reflected on the surface A and the surface C in order and is incident on and exits the surface A at a critical angle or less. Then, after exiting the optical element 41a, the light is transmitted through the transmission surface D of the reflective member 41-b and is reflected on the return reflection surface E. The return reflection surface E reflects incident light so as to return the light substantially in the opposite direction with respect to an incident direction. In this case, an angle formed by the incident light and the reflected light on the return reflection surface of a principal ray at central angle of view is θ.

Thereafter, the light enters the optical element 41-a from the surface A again and is returned, due to reflection on the surface C, to an area on the surface A which is closer to a first light reflection area and reflected. After being reflected to the side of the exit pupil S (eyeball) on the surface B, the light transmits through the surface A to exit the optical element 41-a and reaches the exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In the first optical system 41, light passes through each surface in the order of the surface B (transmission)→the surface A (reflection)→the surface C (reflection)→the surface A (transmission)→the transmission surface D of the reflective member 41-b (transmission)→the return reflection surface E of the reflective member 41-b (return reflection) →the transmission surface D of the reflective member 41-b (re-transmission)→the surface A (re-transmission)→the surface C (re-reflection)→the surface A (re-reflection)→the surface B (reflection) (→the surface A (re-re-transmission)), and after the reflection on the return reflection surface, tracks back the optical paths from that point.

The optical path of the surface B (transmission)→the return reflection surface E is formed as a forward path and the optical path of the return reflection surface E→the surface B (reflection) is formed as a backward path. The forward path and the backward path are collectively formed as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path is formed in the first optical system 41, whereby the optical paths can be substantially duplicated to effectively utilize the inside of the first optical system 41 to thereby miniaturize the size of the first optical system 41 with respect to the optical path length. Consequently, the entire display optical system can be miniaturized.

In addition, the light beam from the image display device 3 passes through the forward and backward optical path by the reflection on the surface B and is guided to the eyeball side.

In this embodiment, the angle θ is set such that an incident light beam on the return reflection surface (return reflection surface E of the reflective member 41-b) is reflected slightly to the lower side in the figure. Consequently, since the second optical system 2 or the image display device 3 can be arranged relatively on the upper side with respect to the first optical system 41, the display optical system can be made compact vertically.

In addition, in the first optical system 41, the reflective member 41-b including the return reflection surface is formed as a separate member from the optical element 41-a, whereby effective surfaces in an optical path are increased and a degree of freedom of design is increased to realize improvement of an optical performance.

It is preferable to make the reflection on the surface A total internal reflection because a loss in an amount of light is reduced. In addition, when at least light is subjected to total internal reflection in an area common for both a reflected light beam and an exiting light beam on the surface A (the lower part of the surface A where light exits toward the exit pupil S and the upper part of the surface A where light exits toward the reflective member 41b) and light is reflected by reflective films in areas other than the common area, the same degree of brightness can be secured while increasing a degree of freedom of design compared with the case in which all reflected light beams on the surface A are subjected to total internal reflection.

In addition, in a boundary of the reflective film area and the common area, boundaries of reflective films are clearly seen. Since this is not preferable, it is desirable to gradually increase a reflectance as the distance from the common area increases in the vicinity of the boundary (in the lower part side and the upper part side in the reflective film area) to make the boundaries of the reflective films less conspicuous.

In this embodiment, the surface B, when it acts as the final reflection surface, is a concave mirror having very strong optical power (1/focal length) with respect to the surface A (reflection, transmission, re-transmission, re-reflection and re-re-transmission) and the surface C (reflection, re-reflection) and assumes main power of the first optical system 41. Since light is reflected twice or more on the surfaces A and C due to the forward and backward optical path in the first optical system 41, power is given to the surface B and power of the surfaces A and C is set to be weak to control occurrence of aberrations.

In particular, since a local meridian section is an eccentric section, if power of the surface B on this section in a principal ray at central angle of view is set strong and power of the surfaces A and C is set weak, occurrence of eccentric aberrations can be controlled.

In addition, power may be given to only the surface B and the surfaces A and C may be planes. Furthermore, since the surface B is an eccentric curved surface, it is desirable to use a surface of a rotation asymmetrical shape (so-called free-form surface) as the surface B to control occurrence of eccentric aberrations as much as possible.

In addition, if another surface other than the surface B is a free-form surface, it becomes possible to set an aspect ratio of the image displayed on the image display device 3 and an aspect ratio of the enlarged display surface to close values.

In addition, if the surfaces A, B and C of the optical element 41-*a* and both the surfaces D and E of the reflective member 41-*b* are formed of curved surfaces, respectively, since all the surfaces contribute to condensing of light, divergence or correction of an aberration, an effect of cost reduction can be expected.

More preferably, the three surfaces A, B and C constituting the first optical system 41 and both the surfaces D and E of the reflective member 41-*b* are all formed in a rotation asymmetrical shape, whereby a degree of freedom of correction of an eccentric aberration increases and it becomes possible to display an image with a high image quality.

At this point, it is preferable to form each rotation asymmetrical surface in a shape that is plane symmetrical in a direction of a local sagittal section having a local meridian section as an only symmetrical surface because processing and manufacturing can be easily performed compared with the case without symmetricalness.

In addition, a degree of freedom of setting a display angle of view with respect to a display size of the image display device 3 is improved by intermediately focusing light once in a transparent body to make it possible to set an angle of view wider (display an image at a high magnitude). At the same time, the total length of the first optical system 41 can be controlled to be short by substantially duplicating a forward and backward optical path with a long optical path length to constitute a very compact display optical system.

Further, in this embodiment, it is also desirable to satisfy the Expressions (1) to (6) described in First Embodiment.

Further, although a display optical system having a first optical system is described in this embodiment, a similar idea may be applied to an image taking optical system shown in Second Embodiment.

Sixth Embodiment

Figure 12:
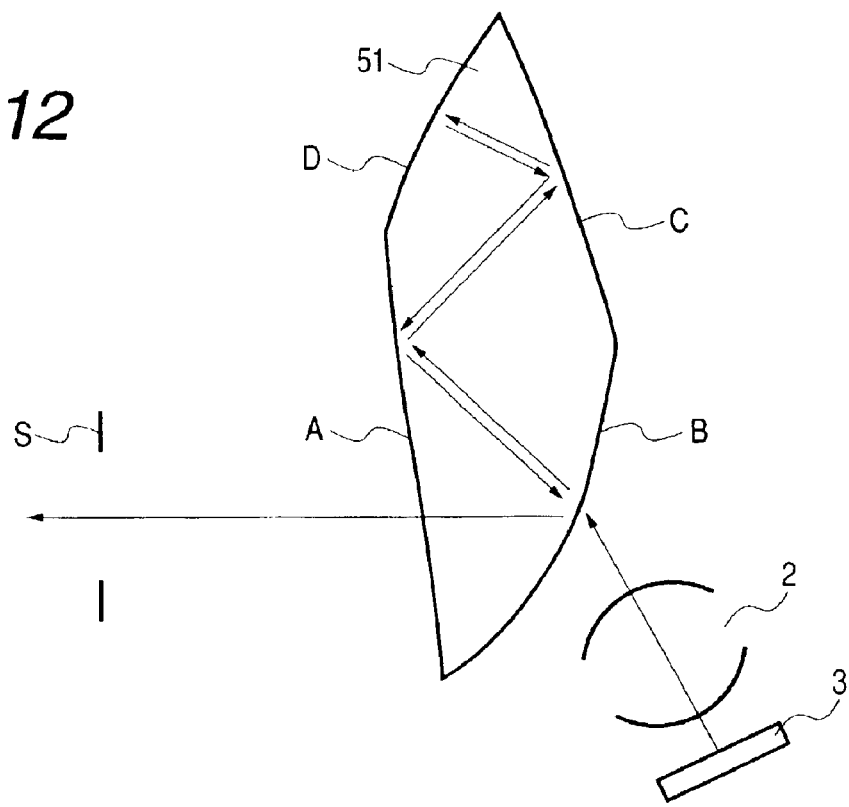
FIG. 12 is a diagram of a display optical system that is Sixth Embodiment of the present invention.

FIG. 12 shows a display optical system that is Sixth Embodiment of the present invention. This display optical system is constituted by a first optical system 51 and a second optical system 2. Four optical surfaces are formed on a transparent body forming the first optical system 51 (hereinafter referred to as first optical element). Both of a surface A (first surface) and a surface B (third surface) are surfaces used for both transmitting and reflecting actions as a transmission surface and a reflection surface, and a surface C (second surface) is a surface for only a reflecting action. Further, a return reflection surface D is formed on the transparent body.

Reflective films are formed on the surface C and the reflection surface D, and a half mirror is formed on the surface B. Further, the reflective film and the half mirror are preferably made of a metal film.

Reference numeral 3 in the figure denotes an image display device (LCD or the like) for displaying an image. In this embodiment, the surface B acts as an incidence surface and a reflection surface of light from the image display device 3, the surface A acts as a reflection surface and an exit surface.

Light emitted from the image display device 3 is guided to the first optical element 51 via the second optical system 2. The light made incident on the first optical element 51 from the surface B is reflected on the surface A and the surface C in order, and then, reflected on the return reflection surface D. Then, after being returned and reflected on the first light reflection area on the surface A by the reflection on the surface C, the light is reflected on the surface B on the exit pupil S (eyeball) side, transmitted through the surface A and exits the first optical element 51 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 51, light passes through each surface in the order of the surface B (transmission)→the surface A (reflection)→the surface C (reflection)→the return reflection surface D (return reflection)→the surface C (re-reflection) →the surface A (re-reflection)→the surface B (reflection) (→the surface A (transmission)), and with the reflection on the return reflection surface D as a boundary, tracks back the optical paths from that point.

Here, the optical path of the surface B (transmission) →thereturn reflection surface D is referred to as a forward path and the optical path of the return reflection surface D→the surface B (reflection) is referred to as a backward path. The forward path and the backward path are collectively referred to as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path is formed in the first optical element 51, whereby the optical paths can be substantially duplicated to effectively use the internal of the first optical element 51 to thereby miniaturize the size of the first optical system 51 with respect to the optical path length. Consequently, the entire display optical system can be miniaturized.

In addition, the light beam from the image display device 3 passes through the forward and backward optical path by the reflection on the surface B and is guided to the eyeball side.

In this embodiment, the return reflection surface D is formed as a surface independent from the surface A as opposed to the structure of First Embodiment shown in FIG. 1. Consequently, the number of surfaces is increased by one to improve a degree of freedom of design.

In addition, in the structure of First Embodiment, a reflective film is necessary in the upper part of the return reflection area of the surface A and partial evaporation of the reflective film has to be performed. However, in this embodiment, since the return reflection surface D is independent from the surface A, evaporation of the reflective film is easy.

It is preferable to make the reflection on the surface A total internal reflection because a loss in an amount of light is reduced. In addition, when at least light is subjected to total internal reflection in an area common for both a reflected light beam and an exiting light beam on the surface A (the lower part of the surface A) and light is reflected by reflective films in areas other than the common area, the same degree of brightness can be secured while increasing a degree of freedom of design compared with the case in which all reflected light beams on the surface A are subjected to total internal reflection.

In addition, in a boundary of the reflective film area and the common area, boundaries of reflective films are clearly seen. Since this is not preferable, it is desirable to gradually increase a reflectance as the distance from the common area increases in the vicinity of the boundary (in the lower part side in the reflective film area) to make the boundaries of the reflective films less conspicuous.

In this embodiment, the surface B, when it acts as the final reflection surface, is a concave mirror having very strong optical power (1/focal length) with respect to the surface A (reflection, re-reflection and transmission) and the surface C (reflection and re-reflection) and assumes main power of the first optical system 51.

In the first optical system 1, since light is reflected twice or more on the surface A and the surface C in accordance with the forward and the backward optical path, power is given to the surface B and power of the surfaces A and C is set weak, in order to prevent occurrence of aberrations. In particular, since a local meridian section is an eccentric section, if power of the surface B on this section in a principal ray at central angle of view is set strong and power of the surfaces A and C is set weak, occurrence of eccentric aberrations can be controlled. In addition, power may be given to only the surface B and the surfaces A and C may be planes.

Since the surface B is an eccentric curved surface, it is desirable to use a surface of a rotation asymmetrical shape (so-called free-form surface) as the surface B to control occurrence of eccentric aberrations as much as possible. In addition, if another surface other than the surface B is a free-form surface, it becomes possible to set an aspect ratio of the image displayed on the image display device 3 and an aspect ratio of the enlarged display surface to close values.

In addition, if the surfaces A, B and C and the return reflection surface D of the first optical element 51 are formed of curved surfaces, respectively, since all the surfaces contribute to condensing of light, divergence or correction of an aberration, an effect of cost reduction can be expected.

More preferably, all the surfaces A, B, C, and D constituting the first optical system 51 are formed in a rotation asymmetrical shape, whereby a degree of freedom of correction of an eccentric aberration increases and it becomes possible to display an image with a high image quality.

At this point, it is preferable to form each rotation asymmetrical surface in a shape that is plane symmetrical in a direction of a local sagittal section having a local meridian section as an only symmetrical surface because processing and manufacturing can be easily performed compared with the case where there is no symmetric property.

In addition, a degree of freedom of setting a display angle of view with respect to a display size of the image display device 3 is improved by intermediately focusing light once in a transparent body to make it possible to set an angle of view wider (display an image at a high magnitude). At the same time, the total length of the first optical system 51 can be controlled to be short by substantially duplicating a forward and backward optical path with a long optical path length to constitute a very compact display optical system.

Further, in this embodiment, it is also desirable to satisfy the Expressions (1) to (6) described in First Embodiment.

Further, although a display optical system having a first optical system is described in this embodiment, a similar idea may be applied to an image taking optical system shown in the Second Embodiment.

Seventh Embodiment

Figure 13:
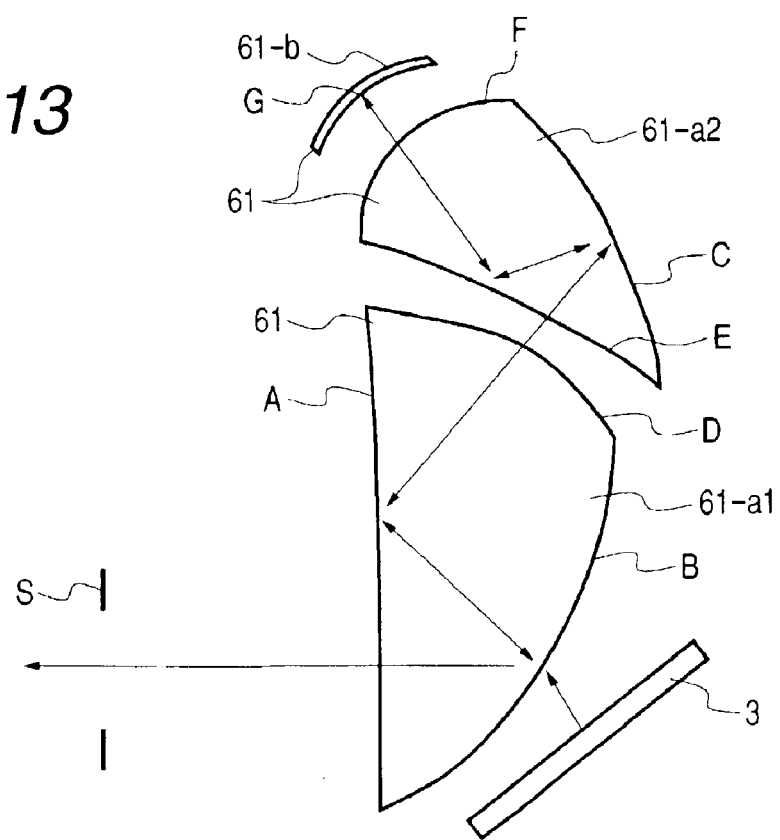
FIG. 13 is a diagram of a display optical system that is Seventh Embodiment of the present invention.

FIG. 13 shows a display optical system that is Seventh Embodiment of the present invention. This display optical system is constituted by a first optical system 61 composed of two optical elements 61-a1 and 61-a2 that are transparent bodies and a reflective member 61-b. Both the optical elements 61-a1 and 61-a2 have three optical surfaces. A surface A (first surface), a surface B (third surface), and a surface E are surfaces used for both transmitting and reflecting action as a transmission surface and a reflection surface, a surface C (second surface) is a surface for only a reflecting action, and a surface D and a surface F are surfaces for only a transmitting action.

The reflective member 61-b has a return reflection surface G which is a surface reflection surface by the reflective film. Reflective films are formed on the reflection surface C and the return reflection surface G of the reflective member 61-b, and a half mirror is formed on the surface B. Further, the reflective film and the half mirror are preferably made of a metal film.

Reference numeral 3 in the figure denotes an image display device (LCD or the like) for displaying an image. In this embodiment, the surface B acts as an incidence surface and a reflection surface of light from the image display device 3, the surface A acts as a reflection surface and an exit surface, the surface C acts as a reflection surface, and the surface E acts as an incidence surface, a reflection surface, and an exit surface.

Light emitted from the image display device 3 is directly guided to the optical element 61-a1 of the first optical system 61. The light made incident on the optical element 61-a1 from the surface B is reflected on the surface A, and then, exits the optical element 61-a1 from the surface D. Then, the light is made incident on the surface E of the optical element 61-a2 and after being reflected on the surface C and the surface E, the light beam exits the optical element 61-a2 from the surface E. Then, the light is returned and reflected on the reflective film (surface G) of the surface of the reflective member 61-b. Thereafter, the light is made incident on the optical element 61-a2 from the surface F, reflected again on the surface E and the surface C, and exits the optical element 61-a2 from the surface E. Further, the light is made incident on the optical element 61-a1 from the surface D, returned to the vicinity of a first reflection area of the light on the surface A, and after being reflected on the reflection surface B to the exit pupil S (eye ball) side, transmitted through the surface A and exits the optical element 61-a1 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 1, light passes through each surface in the order of the surface B (transmission)→the surface A (reflection)→the surface D (transmission)→the surface E (transmission)→the surface C (reflection)→the surface E (reflection)→the surface F (transmission)→the return reflection surface G of the reflective member 61-b (return reflection)→the surface F (re-transmission)→the surface E (re-reflection)→the surface C (re-reflection)→the surface E (re-transmission)→the surface D (re-transmission)→the surface A (re-reflection)→the surface B (reflection) (→the surface A (transmission)), and with reflection on the return reflection surface as a boundary, tracks back the optical paths from that point.

Here, the optical path of the surface B (transmission)→the return reflection surface G is referred to as a forward path and the optical path of the return reflection surface G→the surface B (reflection) is referred to as a backward path. The forward path and the backward path are collectively referred to as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, by forming the forward and backward optical path in the first optical system 61, the optical paths can be substantially duplicated to effectively utilize the inside of the first optical system 61. Consequently, the first optical system 61 can be reduced in size with respect to the optical path length and thus the entire display optical system can be miniaturized.

In addition, the light from the image display device 3 passes through the forward and backward optical path by the reflection on the surface B and guided to the eyeball side.

In this embodiment, since the first optical system 61 is constituted by two optical elements, a forward and backward optical path can be extended and a very long optical path can be contained in the first optical system 61. Consequently, a separate second optical system is not required to be inserted between the image display device and the first optical system as it is required in the above-mentioned each embodiment, and the display optical system is not enlarged downward.

It is preferable to make the reflection on the surface A and the surface E total internal reflection because a loss in an amount of light is reduced. In addition, when at least light is subjected to total internal reflection in an area common for both a reflected light beam and an exiting light beam on the surface A and the surface E (the lower parts of the surface A and the surface E) and light is reflected by reflective films in areas other than the common area, the same degree of brightness can be secured while increasing a degree of freedom of design compared with the case in which all reflected light beams on the surface A and the surface E are subjected to total internal reflection.

In addition, in a boundary of the reflective film area and the common area, boundaries of reflective films are clearly seen. Since this is not preferable, it is desirable to gradually increase a reflectance from the lower part toward the upper part in the vicinity of the boundary (in the lower part side in the reflective film area) to make the boundaries of the reflective films less conspicuous.

In this embodiment, the optical power (1/focal length) of the concave mirrors of the surface B, when it acts as the final reflection surface and the surface C acting as the reflection surface, is very strong with respect to other reflection surfaces. In particular, the optical power of the concave mirror of the surface C acting as the reflection surface is stronger. Thus, the optical power of the concave mirror of the surface B has to be weakened in order to secure sufficient distance between the first optical system 61 and the display device 3. This problem tends to occur particularly on the local meridian section.

In addition, power may be given to only the surface B and the surface C and the surfaces A and E may be planes.

Furthermore, since the surface B is an eccentric curved surface, it is desirable to use a surface of a rotation asymmetrical shape (so-called free-form surface) as the surface B to control occurrence of eccentric aberrations as much as possible.

In addition, if the surfaces A, B, C, E, and the return reflection surface G of the reflective member 61-*b* of the optical elements 61-*a*1, 61-*a*2 are formed of curved surfaces, respectively, since all the surfaces contribute to condensing of light, divergence or correction of an aberration, an effect of cost reduction can be expected.

More preferably, the surfaces A, B, C, E, and G constituting the first optical system 61 are formed in a rotation asymmetrical shape, whereby a degree of freedom of correction of an eccentric aberration increases and it becomes possible to display an image with a high image quality. In addition, by making all the surfaces a free-form surface, it is possible to further obtain an image with a high image quality.

At this point, it is preferable to form each rotation asymmetrical surface in a shape that is plane symmetrical in a direction of a local sagittal section having a local meridian section as an only symmetrical surface because processing and manufacturing can be easily performed compared with the case where there is no symmetric property.

In addition, a degree of freedom of setting a display angle of view with respect to a display size of the image display device 3 is improved by intermediately focusing light once in a transparent body to make it possible to set an angle of view wider (display of an image at a high magnitude). At the same time, the total length of the first optical system 61 can be controlled to be short by substantially duplicating a forward and backward optical path with a long optical path length to constitute a very compact display optical system.

Further, in this embodiment, it is also desirable to satisfy Expressions (1) to (6) described in First Embodiment.

Further, although a display optical system having a first optical system is described in this embodiment, a similar idea may be applied to an image taking optical system shown in Second Embodiment.

Eighth Embodiment

Figure 14:
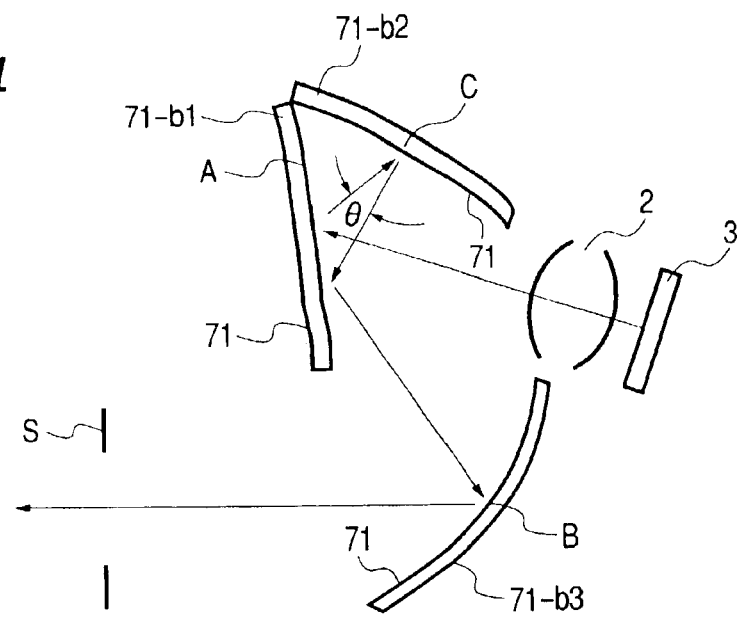
FIG. 14 is a diagram of a display optical system that is Eighth Embodiment of the present invention.

FIG. 14 shows a display optical system that is Eighth Embodiment of the present invention. This display optical system is constituted by a first optical system 71 having a three-surface reflection mirror composed of reflective members 71-*b*1, 71-*b*2, and 71-*b*3 and a second optical system 2.

Reflective films are formed on the surfaces of the reflective members 71-*b*1, 71-*b*2, and 71-*b*3. The reflection surface of the reflective member 71-*b*2 is a return reflection surface. Further, the reflective film is preferably made of a metal film.

Reference numeral 3 in the figure denotes an image display device (LCD or the like) for displaying an image. Light emitted from the image display device 7 is guided to the reflective member 71-*b*1 of the first optical system 71 via the second optical system 3. The light made incident on the first optical element 71 from the surface A (first surface) acting as the reflection surface of the reflective member 71-*b*1 is reflected on the surface A, and then, guided to the return reflection surface C (second surface) acting as the mirror surface of the reflective member 71-*b*2. The light reflected on the return reflection surface C is reflected such that the light is returned to the vicinity of a first reflection area of the light on the surface A. In this case, an angle formed by the incident light and the reflected light on the return reflection surface C of a principal ray at central angle of view is θ.

Then, the light is reflected again on the surface A, further reflected on the surface B (third surface) acting as the mirror surface of the reflective member 71-*b*3, and exits the first optical system 71 to reach an exit pupil S.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In addition, in the first optical element 71, light passes through each surface in the order of the surface A (reflection) →the mirror surface C of the reflective member 71-*b*2 (return reflection)→the surface A (re-reflection)→the surface B (reflection), and on attaining the return reflection on the surface C tracks back the optical paths from that point.

Here, the optical path of the surface A (reflection)→the return reflection surface C is referred to as a forward path and the optical path of the return reflection surface C→the surface A (reflection) is referred to as a backward path. The forward path and the backward path are collectively referred to as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path is formed in the first optical system 71, whereby the optical paths can be substantially duplicated to effectively utilize the inside of the first optical system 71. Consequently, the size of the first optical element 71 can be reduced with respect to the optical path length, and thus the entire display optical system can be miniaturized.

In addition, the light beam from the image display device 3 passes through the forward and backward optical path by the reflection on the surface B and guided to the eyeball side instead of the image display device side.

The display optical system of this embodiment is advantageous in terms of brightness similar to that of Fourth Embodiment. In this embodiment, an angle θ formed by incident light and reflected light of a principal ray at central angle of view with respect to the return reflection surface is set to a relatively large value, the backward path is set to be extended to the surface A, and the separate surface B is arranged in a position slightly deviating from a light beam incident on the first optical system 71 such that the light beam reaches the surface B. In this way, the reflection mirrors of the three surfaces (the surface A, the surface B and the return reflection surface C) are formed of reflective films that are capable of reflecting substantially 100% of a light beam to realize the bright first optical system 71.

In addition, in this embodiment, the surface B, when it acts as the final reflection surface, is a concave mirror having very strong optical power (1/focal length) with respect to the surface A (reflection and re-reflection) and assumes main power of the first optical system 71. This is because light is reflected twice on the surface A due to the forward and backward optical path, so that power is given to the surface B and power of the surface A is set to be weak to control occurrence of aberrations.

In particular, since a local meridian section is an eccentric section, if power of the surface B on this section in a principal ray at central angle of view is set strong and power of the surfaces A is set weak, occurrence of eccentric aberrations can be controlled. In addition, power may be given to only the surface B and the surfaces A may be planes.

Furthermore, since the surface B is an eccentric curved surface, it is desirable to use a surface of a rotation asymmetrical shape (so-called free-form surface) as the surface B to control occurrence of eccentric aberrations as much as possible.

In addition, if a reflection surface other than the surface B is a free-form surface, it becomes possible to set an aspect ratio of the image displayed on the image display device 3 and an aspect ratio of the enlarged display surface to close values.

In addition, if the surfaces A, B and the return reflection surface C are formed of curved surfaces, respectively, since all the surfaces contribute to condensing of light, divergence or correction of an aberration, an effect of cost reduction can be expected.

More preferably, the three surfaces A, B and the return reflection surface C constituting the first optical system 71 are all formed in a rotation asymmetrical shape, whereby a degree of freedom of correction of an eccentric aberration increases and it becomes possible to display an image with a high image quality. At this point, it is preferable to form each rotation asymmetrical surface in a shape that is plane symmetrical in a direction of a local sagittal section having a local meridian section as an only symmetrical surface because processing and manufacturing can be easily performed compared with the case without symmetricalness.

In addition, a degree of freedom of setting a display angle of view with respect to a display size of the image display device 3 is improved by intermediately focusing light once in an optical system to make it possible to set an angle of view wider (display an image at a high magnitude). At the same time, the total length of the first optical system 71 can be controlled to be short by substantially duplicating a forward and backward optical path with a long optical path length to constitute a very compact display optical system.

Further, in this embodiment, it is also desirable to satisfy the Expressions (1) to (6) described in First Embodiment.

Further, although a display optical system having a first optical system is described in this embodiment, a similar idea may be applied to an image taking optical system shown in Second Embodiment.

Ninth Embodiment

Figure 15:
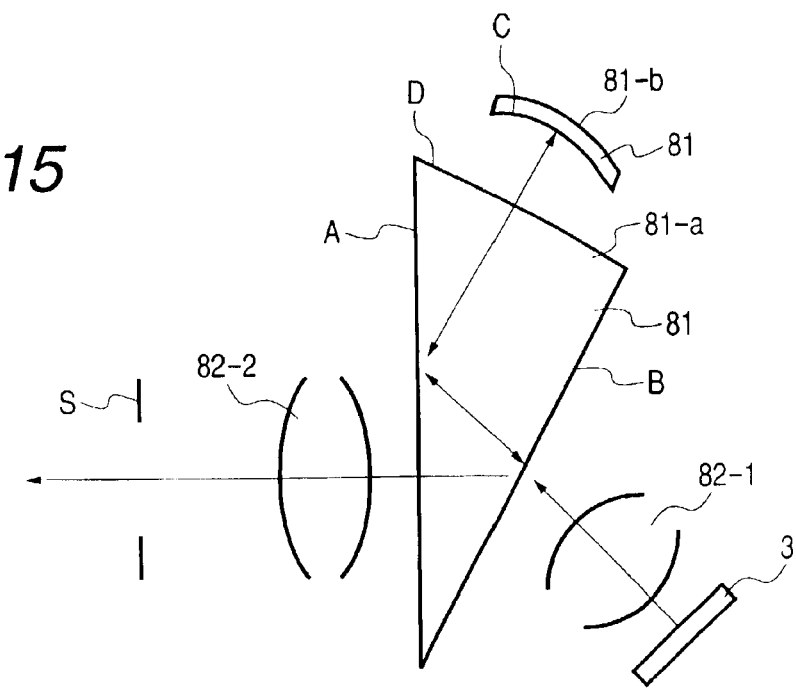
FIG. 15 is a diagram of a display optical system that is Ninth Embodiment of the present invention.

FIG. 15 shows a display optical system that is Ninth Embodiment of the present invention. This display optical system is constituted by a first optical system 81 that is formed of the optical element 81-*a* as a transparent body and the reflective member 81-*b*, and a second optical system that is formed of two optical systems 82-1 and 82-2.

The optical element 81-*a* includes three optical surfaces. The surface A (first surface) and the surface B (third surface) are surfaces used for both transmitting and reflecting actions as a transmission surface and a reflection surface, and the surface D acts as a surface used for transmission. Also, the reflective member 81-*b* includes the return reflection surface C (second surface) formed with a reflective film on its surface. The surface B is a half mirror. Further, the reflective film and the half mirror are preferably made of a metal film.

Reference numeral 3 in the figure denotes an image display device (LCD or the like) for displaying an image. In this embodiment, the surface B acts as an incidence surface and a reflection surface of light from the image display device 3, and the surface A acts as a reflection surface and an exit surface.

Light emitted from the image display device 3 is guided to the optical system 81-*a* of the first optical system 81 via the optical system 82-1 of the second optical systems. The light made incident on the optical element 81-*a* from the surface B is reflected on the surface A and exits from the surface D. Next, the light is reflected on the return reflection surface C of the reflective member 81-*b*. Then, after entering from the surface D of the optical element 81-*a*, the light is returned to a first reflection area of the light on the surface A to be reflected again thereon. Then, the light is reflected on the surface B toward the exit pupil S (eyeball) side of the surface B, transmitted through the surface A, and exits the optical element 81-*a* to reach the exit pupil S with optical power being adjusted at the optical system 82-2 of the second optical systems.

In this figure, as an example of light emitted from the image display device 3, a principal ray at central angle of view that exits the display surface center of the image display device 3 to reach the center of the exit pupil S is shown.

In this embodiment, an observer can visually recognize an enlarged image of an image displayed on the image display device 3 by placing an eye in the vicinity of the position of the exit pupil S.

In the first optical element 81, light passes through each surface in the order of the surface B (transmission)→the surface A (reflection)→the surface D (transmission)→the return reflection surface C of the reflective member 81-*b* (return reflection)→the surface D (re-transmission)→the surface A (re-reflection)→the surface B (reflection) (→the surface A (transmission)), and after the reflection on the return reflection surface, tracks back the optical paths from that point.

Here, the optical path from the surface B (transmission) to the return reflection surface C is referred to as a forward path and the optical path from the return reflection surface C to the surface B (reflection) is referred to as a backward path. The forward path and the backward path are collectively referred to as a forward and backward optical path.

In particular, re-reflection on the surface A forms the forward and backward optical path such that a principal ray at central angle of view is reflected and advances to a side opposite to the first reflection on the surface A with respect to a normal line of a surface on its hit point.

In this way, the forward and backward optical path in the first optical system 81 is formed, whereby the optical paths can be substantially duplicated, and the size of the first optical system 81 can be made small with respect to the optical path length by utilizing the inside of the first optical system 81 efficiently. Consequently, the entire display optical system can be miniaturized.

In addition, the light beam from the image display device 3 passes through the forward and backward optical path by the reflection on the surface B and then guided to the eyeball side.

In this embodiment, the three surfaces of the optical element 81-*a* are formed of planes, the optical element 81-*a* itself does not have optical power and the return reflection surface of the reflective member 81-*b* has optical power. Consequently, costs of the optical element 81-*a* can be reduced significantly and occurrence of aberrations in the optical element 81-*a* is controlled. However, a transparent body provided with a plurality of curved surfaces such as those described in the above-mentioned embodiments (e.g., First Embodiment) may be applied to the optical element 81-*a* of this embodiment.

It is preferable to make the reflection on the surface A total internal reflection because a loss in an amount of light is reduced. In addition, when at least light is subjected to total internal reflection in an area common for both a reflected light beam and an exiting light beam on the surface A (the lower part of the surface A) and light is reflected by reflective films in areas other than the common area, the same degree of brightness can be secured while increasing a degree of freedom of design compared with the case in which all reflected light beams on the surface A are subjected to total internal reflection.

In addition, in a boundary of the reflective film area and the common area, boundaries of reflective films are clearly seen. Since this is not preferable, it is desirable to gradually increase a reflectance as the distance from the common area increases in the vicinity of the boundary (in the lower part side in the reflective film area) to make the boundaries of the reflective films less conspicuous.

In addition, a degree of freedom of setting a display angle of view with respect to a display size of the image display device 3 is improved by intermediately focusing light once in an optical system to make it possible to set an angle of view wider (display an image at a high magnitude). At the same time, the total length of the first optical system 81 can be controlled to be short by substantially duplicating a forward and backward optical path with a long optical path length to constitute a very compact display optical system.

Further, in this embodiment, it is also desirable to satisfy the Expressions (1) to (6) described in First Embodiment.

Further, although a display optical system having a first optical system is described in this embodiment, a similar idea may be applied to an image taking optical system shown in Second Embodiment.

Further, in all the embodiments described above, when an arbitrary light beam of a light beam passing through the first optical system is traced, in the first reflection and the second reflection on the first surface, the light beam takes an optical path in which the light beam is reflected at an angle of reflection of an opposite sign in one reflection with the other reflection as a reference.

More specifically, for example, on the paper surface of FIG. 1, a light beam takes an optical path in which, if an angle of reflection in the first reflection (reflection on the surface A) has a positive sign (the case in which a reflected light exists in the counterclockwise direction on the paper surface of the figure of a normal line), an angle of reflection in the second reflection (re-reflection on the surface A) has a negative sign (the case in which a reflected light exists in the clockwise direction in the paper surface of the figure of the normal line).

Since the light beam substantially moves back and forth between the first surface and the second surface by taking such an optical path, a space in the first optical system can be effectively utilized to gain an optical path length. Moreover, a small optical system can be realized even if an optical path length is long.

Each of the above-mentioned embodiments will be hereinafter described using numerical examples.

First Numerical Example

Figure 16:
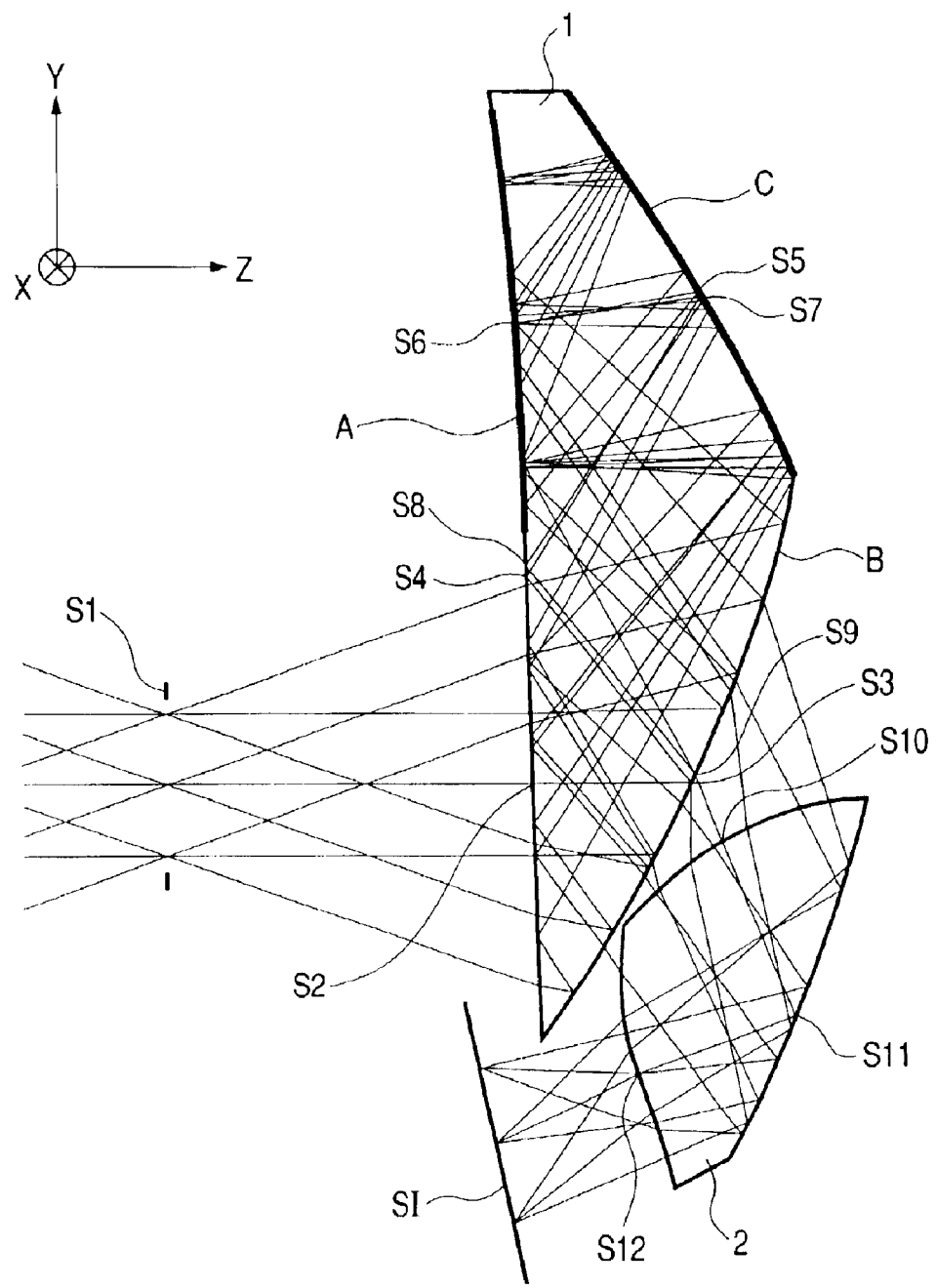
FIG. 16 is a sectional view of an optical system of First Numerical Example (an embodiment form of First Embodiment) of the present invention.

FIG. 16 shows an optical path sectional view with a numerical example of First Embodiment shown in FIG. 1. In the figure, reference numeral 1 denotes a first optical system constituting a display optical system, which is constituted by a transparent body (optical element) of a prism shape having three optical surfaces. Reference symbols S2, S4, S6 and S8 denote an identical surface; S3 and S9, an identical surface; and S5 and S7, an identical surface. These three surfaces correspond to the surfaces A, B, and C described in First Embodiment, respectively.

Reference numeral 2 denotes a second optical system, which is constituted by a transparent body consisting of an identical medium having three surfaces of S10, S11, and S12.

Reference symbol SI denotes an image display surface and S1 denotes an exit pupil S of the display optical system. In addition, reflective films are formed on the return reflection surface A (S6) and the surface C (S5, S7), and a half mirror is formed on the surface B (S3, S9).

In this numerical example, all the optical surfaces are rotation asymmetrical surfaces, which are formed in a plane of a symmetrical shape having the paper surface of the figure (yz section) as an only symmetrical surface.

Optical data of this numerical example is shown in Table 1 and local data with respect to a principal ray at central angle of view is shown in Table 2. In this numerical example, a display optical system is obtained which displays an image with a horizontal angle of view of 50° at an exit pupil diameter φ of 10 mm and an image display size of 10 mm×7.5 mm in the infinitive distance in the positive direction of the z axis.

Further, the leftmost item SURF among the optical data of Table 1 represents a surface number. In addition, X, Y and Z represent positions (x, y, z) of surface vertexes of the surfaces in the coordinate system with the center of the first surface S1 at the origin (0, 0, 0) and the y axis and the z axis shown in the figure and the x axis in the depth direction on the paper surface of the figure. A represents a rotation angle (unit: degree) around the x axis with the counterclockwise direction in the figure as the positive direction.

R represents a radius of curvature. The item TYP represents a type of a surface shape, SPH represents a sphere, and FFS represents a rotation asymmetrical surface in accordance with the following expression:

$$z=(1/R)(x^2+y^2)/(1+(1-(1+k)(1/R)^2(x^2+y^2))^{(1/2)})+c2+c4$$

$$y+c5(x^2-y^2)+c6(-1+2x^2+2y^2)+c10(-2y+3x^2y+3y^3)+c11(3$$

$$x^2y-y^3)+c12(x^4-6x^2y^2+y^4)+c13(-3x^2+4x^4+3y^2-4y^4)+c14$$

$$(1-6x^2+6x^4-6y^2+12x^2y^2+6y^4)+c20\ (3y-12x^2y+10x^4y-12$$

$$y^3+20x^2y^3+10y^5)+c21\ (-12x^2y+15x^4y+4y^3+10x^2y^3-5$$

$$y^5)+c22\ (5x^4y-10x^2y^3+y^5)+c23\ (x^6-15x^4y^2+15x^2y^4-y^6)+c24$$

$$(-5x^4+6x^6+30x^2y^2-30x^4y^2-5y^4-30x^2y^4+6y^6)+c25(6x^2-20$$

$$x^4+15x^6-6y^2+15x^4y^2+20y^4-15x^2y^4-15y^6)+c26\ (-1+12x^2-30$$

$$x^4+20x^6+12y^2-60x^2y^2+60x^4y^2-30y^4+60x^2y^4+20y^6)+\ldots \quad (4)$$

A numerical value written beside FFS in the column of TYP indicate that the surface shape is a rotation symmetrical shape corresponding to aspheric coefficients k and $c_i$ written in the lower part of the table. A value of $c_i$ which is left blank is zero.

Nd and vd (written as vd in the table) represent an index of refraction and an Abbe number at a d-line wavelength of a medium of the surface and subsequent surfaces, respectively. A change of a sign of the index of refraction N indicates that a light beam is reflected on the surface. In addition, if the medium is an air layer, only the index of refraction Nd is shown as 1.000 and the Abbe number vd is omitted.

In addition, an absolute value of an angle θ formed by an incident light beam and a reflected light beam of a principal ray at central angle of view on the return reflection surface is written as |θ|, an absolute value of an angle β at the time when the principal ray at central angle of view is reflected on the surface C (S5) is written as |β|, and an absolute value of an angle a at the time when the principal ray at central angle of view is reflected on the surface C (S7) is written as |α|. The above-mentioned items of the table are the same for numerical examples described below.

TABLE 1

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | 28.526 | 20.239 | 4.593 | −204.6392 | 1 | 1.5745 | 33.8 |
| 3 | 0.000 | 7.627 | 33.817 | −19.766 | −67.7133 | 2 | −1.5745 | 33.8 |
| 4 | 0.000 | 28.526 | 20.239 | 4.593 | −204.6392 | 1 | 1.5745 | 33.8 |
| 5 | 0.000 | 36.806 | 25.514 | 33.313 | −130.8385 | 3 | −1.5745 | 33.8 |
| 6 | 0.000 | 28.526 | 20.239 | 4.593 | −204.6392 | 1 | 1.5745 | 33.8 |
| 7 | 0.000 | 36.806 | 25.514 | 33.313 | −130.8385 | 3 | −1.5745 | 33.8 |
| 8 | 0.000 | 28.526 | 20.239 | 4.593 | −204.6392 | 1 | 1.5745 | 33.8 |
| 9 | 0.000 | 7.627 | 33.817 | −19.766 | −67.7133 | 2 | 1.0000 | |
| 10 | 0.000 | −3.713 | 32.000 | −61.016 | 12.9947 | 4 | 1.5745 | 33.8 |
| 11 | 0.000 | −9.313 | 38.162 | −20.071 | −122.7345 | 5 | −1.5745 | 33.8 |
| 12 | 0.000 | −9.474 | 26.572 | −9.403 | 11.5332 | 6 | −1.0000 | |
| | 0.000 | −7.746 | 16.137 | 12.495 | ∞ | SPH | −1.0000 | |

| | | | | |
|---|---|---|---|---|
| FFS1 | c1: −4.0335e+000 | c5: −5.7321e−004 | c6: −4.6692e−005 | c10: −2.0110e−006 |
| | c11: 1.1077e−005 | c12: 1.0862e−008 | c13: −2.2107e−009 | c14: 2.9702e−009 |
| FFS2 | c1: −9.4887e−001 | c5: −6.6360e−004 | c6: 1.2157e−004 | c10: 4.2469e−006 |
| | c11: −4.5938e−006 | c12: 2.4535e−008 | c13: −2.1846e−007 | c14: 4.9945e−008 |
| FFS3 | c1: −1.5093e+000 | c5: −5.4396e−004 | c6: 1.0629e−004 | c10: 8.7543e−007 |
| | c11: 1.2883e−005 | c12: 2.1023e−007 | c13: −4.0124e−008 | c14: 9.3897e−010 |
| FFS2 | c1: −9.4887e−001 | c5: −6.6360e−004 | c6: 1.2157e−004 | c10: 4.2469e−006 |
| | c11: −4.5938e−006 | c12: 2.4535e−008 | c13: −2.1846e−007 | c14: 4.9945e−008 |
| FFS4 | c1: −6.9842e−001 | c5: 4.3200e−003 | c6: −4.1777e−004 | c10: −1.7318e−004 |
| | c11: −5.6073e−005 | c12: −2.1928e−008 | c13: 9.5676e−006 | c14: −6.5617e−006 |
| FFS5 | c1: −7.4465e+001 | c5: 3.5070e−005 | c6: −4.3265e−004 | c10: 3.2961e−005 |
| | c11: 2.1191e−005 | c12: 2.4966e−006 | c13: 5.1658e−006 | c14: 2.2219e−006 |
| FFS6 | c1: −1.6588e+000 | c5: −4.9496e−003 | c6: 1.2913e−003 | c10: 2.3807e−004 |
| | c11: −7.6089e−005 | c12: −4.4118e−006 | c13: −2.9948e−006 | c14: −5.9707e−006 |

|θ| = 0.75°
|β| = 51.9306°
|α| = 50.5154°

TABLE 2

| SURF | ry | rx | fy | fx | d | n |
|---|---|---|---|---|---|---|
| 1 | ∞ | ∞ | ∞ | ∞ | 21.379 | 1.000 |
| 2 | −4377.57054 | −130.17886 | −7620.089 | −226.604 | 9.251 | 1.574 |
| 3 | −79.10669 | −64.36654 | 25.122 | 20.441 | −15.520 | −1.574 |
| 4 | −500.48703 | −141.39275 | −158.937 | −44.901 | 18.152 | 1.574 |
| 5 | −207.63577 | −105.04493 | 65.938 | 33.359 | −10.962 | −1.574 |
| 6 | −268.59071 | −158.09459 | −85.295 | −50.205 | 10.893 | 1.574 |
| 7 | −206.46469 | −105.28234 | 65.566 | 33.434 | −17.745 | −1.574 |
| 8 | −481.51121 | −141.99501 | −152.911 | −45.093 | 15.717 | 1.574 |
| 9 | −78.45270 | −64.32725 | 136.564 | 111.975 | 4.382 | 1.000 |
| 10 | 15.40473 | 12.02402 | 26.815 | 20.930 | 10.576 | 1.574 |
| 11 | −83.96055 | −95.33091 | 26.663 | 30.274 | −9.873 | −1.574 |
| 12 | 51.82429 | 16.23291 | 90.211 | 28.257 | −15.154 | −1.000 |
| | ∞ | ∞ | ∞ | ∞ | | |

|fyc/fya| = 0.77

Next, a method of reading local data of Table 2 will be described. From the leftmost item, SURF represents a surface number; ry, a radius of curvature of a local meridian section at the time when a principal ray at central angle of view has a hit point on each surface; rx, a radius of curvature of a local sagittal section; fy, a focal length of local meridian section; fx, a focal length of local meridian section; d, a surface interval between the pertinent surface and the next surface (a value without air conversion at a distance on the principal ray at central angle of view); and n, respective index of refraction at a d-line wavelength of a medium on the surface and the subsequent surfaces.

Here, in the first optical system, a focal length of local meridian section is assumed to be fya when a principal ray at central angle of view is returned and reflected on the surface A (S6) among hit points on each surface of the principal ray at central angle of view in the case in which a light beam follows the optical path of the surface B (incidence)→the surface A (reflection)→the surface C (reflection)→the surface A (return reflection)→the surface C (re-reflection)→the surface A (re-reflection)→the surface B (reflection)→the surface A (exit), and a focal length of local meridian section is assumed to be fyc when the principal ray at central angle of view is re-reflected on the surface C (S5). Then, an absolute value of a ratio of fya and fyc is written as follows:

|fyc/fya|

The above-mentioned items of the optical data and the local data are the same in numerical examples described below.

Further, the optical system shown in this numerical example can also be utilized as an image taking optical system that guides a light beam from an object point at the infinitive distance in the negative direction of the z axis to the first optical system 1 through the stop S1 and, after the light beam exits the first optical system 1, focuses the light beam on the image taking surface SI through the second optical system 2 (Second Embodiment)

Second Numerical Example

Figure 17:
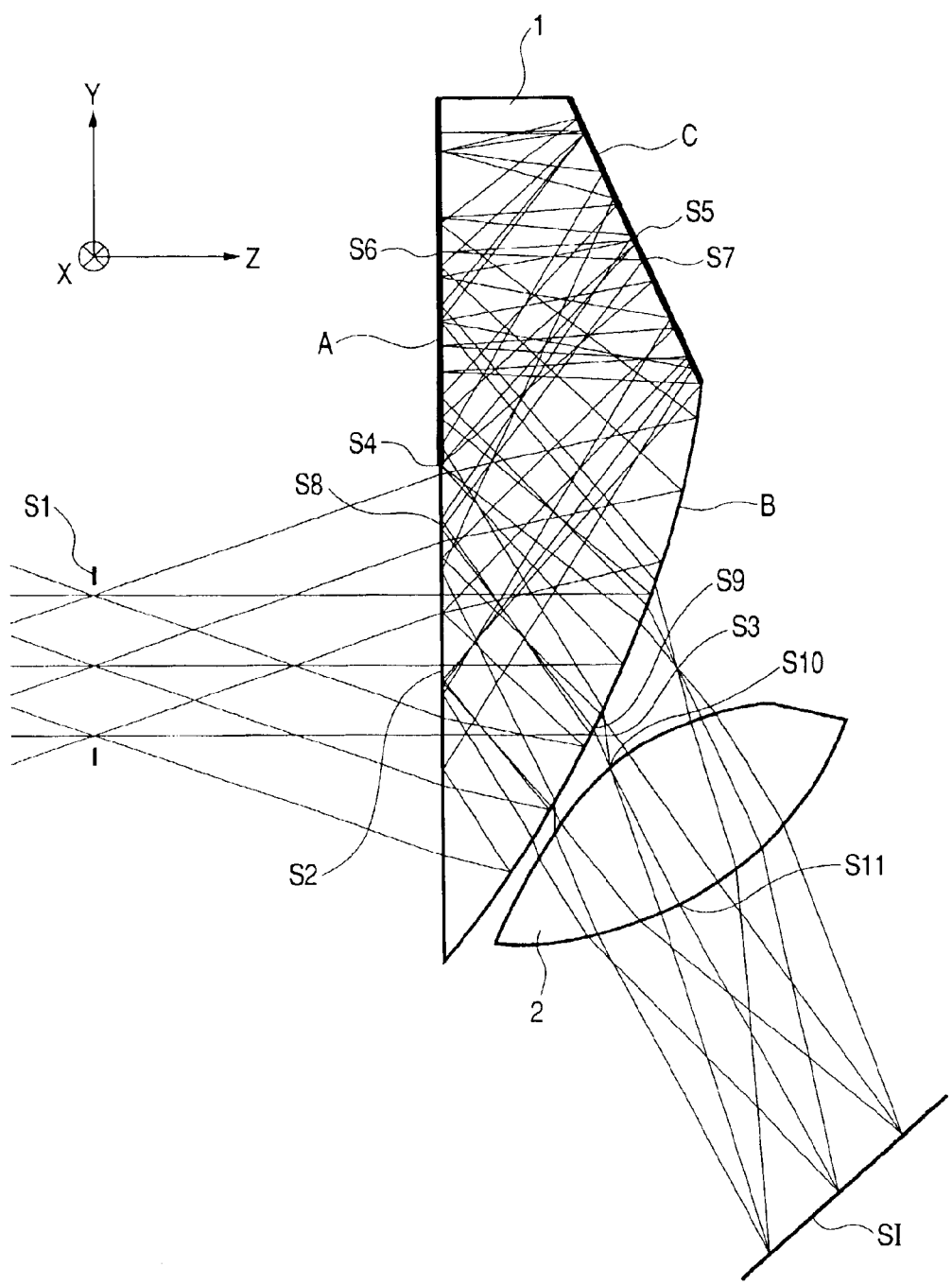
FIG. 17 is a sectional view of an optical system of Second Numerical Example (an embodiment form of First Embodiment) of the present invention.

FIG. 17 shows an optical path sectional view showing Second Numerical Example. In the figure, reference numeral 1 denotes a first optical system, which is constituted by a transparent body (hereinafter, referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is a convex lens formed of two surfaces of S10 and S11. Also, reflective films are formed on the return reflection surface A (S6) and the surface C. Reference symbol SI denotes an image display surface and S1 denotes an exit pupil S of the display optical system.

In this numerical example, the optical surfaces S2 S4, S6, and S8 are planes and all the optical surfaces S3, S5, S7, and S9 to S11 are formed in rotation asymmetrical surfaces. Those three surfaces are formed in a plane symmetrical shape having the paper surface of the figure (yz section) as an only symmetrical surface.

Optical data of this numerical example is shown in Table 3 and local data with respect to a principal ray at central angle of view is shown in Table 4.

TABLE 3

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.609 | 20.026 | 0.046 | ∞ | SPH | 1.5745 | 33.8 |
| 3 | 0.000 | −1.149 | 29.898 | −25.035 | −68.7938 | 1 | −1.5745 | 33.8 |
| 4 | 0.000 | −0.609 | 20.026 | 0.046 | ∞ | SPH | 1.5745 | 33.8 |
| 5 | 0.000 | 20.394 | 33.400 | 24.395 | −238.8022 | 2 | −1.5745 | 33.8 |
| 6 | 0.000 | −0.609 | 20.026 | 0.046 | ∞ | SPH | 1.5745 | 33.8 |
| 7 | 0.000 | 20.394 | 33.400 | 24.395 | −238.8022 | 2 | 1.5745 | 33.8 |
| 8 | 0.000 | −0.609 | 20.026 | 0.046 | ∞ | SPH | 1.5745 | 33.8 |
| 9 | 0.000 | −1.149 | 29.898 | −25.035 | −68.7938 | 1 | 1.0000 | |
| 10 | 0.000 | −6.944 | 28.262 | −45.856 | 15.5850 | 3 | 1.5745 | 33.8 |
| 11 | 0.000 | −11.958 | 36.808 | −54.291 | −19.2483 | 4 | 1.0000 | |
| | 0.000 | −26.493 | 47.255 | −54.291 | ∞ | SPH | 1.0000 | |

TABLE 3-continued

| | | | | |
|---|---|---|---|---|
| FFS1 | c1: −1.9277e+000 | c5: −4.0387e−004 | c6: −2.1835e−004 | c10: −1.3993e−006 |
| | c11: 3.1977e−006 | c12: 9.7794e−008 | c13: 2.9377e−008 | c14: 8.9190e−008 |
| FFS2 | c1: −2.2805e+002 | c5: −2.4755e−004 | c6: −1.2572e−004 | c10: 1.2285e−005 |
| | c11: 5.0338e−006 | c12: −8.9870e−008 | c13: −1.6558e−007 | c14: 1.9101e−007 |
| FFS3 | c1: −1.0918e+000 | c5: 9.3572e−005 | c6: −2.8802e−004 | c10: 1.7426e−004 |
| | c11: −2.5668e−005 | c12: −9.8338e−006 | c13: −1.0709e−005 | c14: −9.2702e−006 |
| FFS4 | c1: 2.6105e+001 | c5: 8.5245e−004 | c6: 2.2998e−004 | c10: −5.8822e−005 |
| | c11: 3.9947e−005 | c12: −1.1115e−005 | c13: −8.7480e−006 | c14: 2.4370e−006 |

$|\theta| = 4.9°$
$|\beta| = 45.6167°$
$|\alpha| = 55.7209°$

TABLE 4

| SURF | ry | rx | fy | fx | d | n |
|---|---|---|---|---|---|---|
| 1 | ∞ | ∞ | ∞ | ∞ | 20.025 | 1.000 |
| 2 | ∞ | ∞ | ∞ | ∞ | 10.399 | 1.574 |
| 3 | −68.33097 | −61.72423 | 21.700 | 19.601 | −15.543 | −1.574 |
| 4 | ∞ | ∞ | ∞ | ∞ | 17.258 | 1.574 |
| 5 | −397.01883 | −223.81036 | 126.080 | 71.074 | −11.556 | −1.574 |
| 6 | ∞ | ∞ | ∞ | ∞ | 12.030 | 1.574 |
| 7 | −323.26423 | −212.86731 | 102.658 | 67.599 | −19.768 | −1.574 |
| 8 | ∞ | ∞ | ∞ | ∞ | 14.234 | 1.574 |
| 9 | −69.60597 | −61.61363 | 121.164 | 107.252 | 2.616 | 1.000 |
| 10 | 15.1644 | 15.54198 | 26.397 | 27.054 | 8.734 | 1.574 |
| 11 | −22.98753 | −21.02927 | 40.015 | 36.606 | 18.373 | 1.000 |
| | ∞ | ∞ | ∞ | ∞ | | |

$|fyc/fya| = 0$

As is seen from Table 3, a light beam from the image display surface SI is made incident on a convex lens of the second optical system 2 from S11 and exits from S10 to travel toward the first optical element 1. The light beam that travels toward the first optical element 1 is made incident on the first optical element 1 from S9 (surface B), reflected on S8 (surface A) and reflected on S7 (surface C), and thereafter, reflected on S6 (surface A—return reflection surface), reflected on S5 (surface C), reflected on S4 (surface A), reflected on S3 (surface B) and exits the first optical element 1 from S2 top be guided to the exit pupil S1 (S).

When it is assumed that a numerical value having a dimension of this numerical example is represented by mm, a display optical system is obtained which displays an image with a horizontal angle of view of 50° at an exit pupil diameter φ of 10 mm and an image display size of 10 mm×7.5 mm in the infinitive distance in the positive direction of the z axis.

Further, the optical system of this numerical example may be utilized in an image taking optical system. In this case, a light beam from an object point at the infinitive distance in the z axis negative direction is guided to the first optical element 1 through the stop S1. Then, the light beam is made incident on the first optical element 1 from S2 (surface A), reflected on S3 (surface B), reflected on S4 (surface A), reflected on S5 (surface C) and reflected on S6 (surface A—return reflection surface), and thereafter, reflected on S7 (surface B), reflected on S8 (surface A) and exits the first optical element 1 from S9 (surface B) to be guided to a convex lens of the second optical system 2. The light beam guided to the convex lens is made incident on the convex lens from S10 and exits from S11 to focus on the image taking surface SI.

Here, since the light beam reflected on S6 (surface A—return reflection surface) does not cause total reflection, a reflective film is formed at least in a part of S6 where the light beam is reflected. However, since the reflective film is not formed in an exiting range of the light beam exiting from the surface A of the first optical system 1 (range of S2 in this numerical example), the reflective film does not become an obstacle to the light beam exiting from S2.

In addition, since a light beam, which is reflected in the exiting range of the light beam exiting from the surface A, among light beams reflected on S4 and S8 is totally reflected, a loss in an amount of light is small.

Moreover, since a light beam reflected on the surface C (S5 and S7 in this numerical example) does not cause total reflection either, a reflective film is formed on the surface C. The formation of the reflective film on S6 and the formation of the reflective film on the surface C are the same in examples described below.

Third Numerical Example

Figure 18:
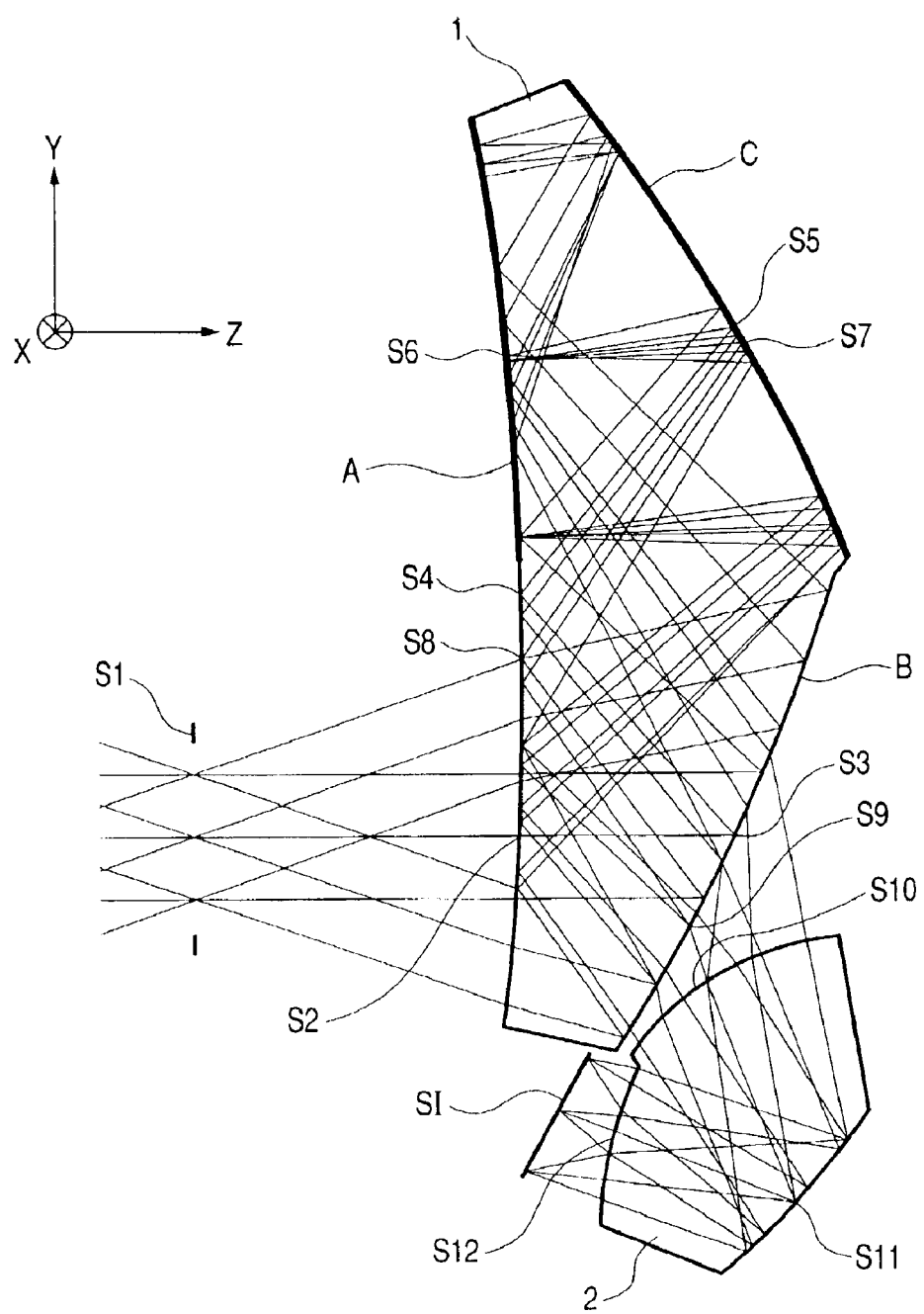
FIG. 18 is a sectional view of an optical system of Third Numerical Example (an embodiment form of First Embodiment) of the present invention.

FIG. 18 shows an optical path sectional view showing Third Numerical Example. In the figure, reference numeral 1 denotes a first optical system, which is constituted by a transparent body (hereinafter, referred to also as first optical element 1) having three optical surfaces. Reference symbols S2, S4, S6, and S8 denote an identical surface; S3 and S9, an identical surface; and S5 and S7, an identical surface. These three surfaces correspond to the surfaces A, B, and C described in First Embodiment, respectively.

Reference numeral 2 denotes a second optical system, which is constituted by a transparent body (optical element) consisting of an identical medium having the three optical surfaces S10, S11, and S12.

In this numerical example, all the optical surfaces S2 to S12 are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light beam from the image display surface SI is made incident on the optical element of the second optical system 2 from S12, reflected on S11 and exits from S10 to travel toward the first optical element 1. An optical path of the light beam since it is made incident on the first optical element 1 until it exits is the same as that in First Numerical Example.

Optical data of this Third Numerical Example is shown in Table 5 and local data with respect to a principal ray at central angle of view is shown in Table 6.

Fourth Numerical Example

Figure 19:
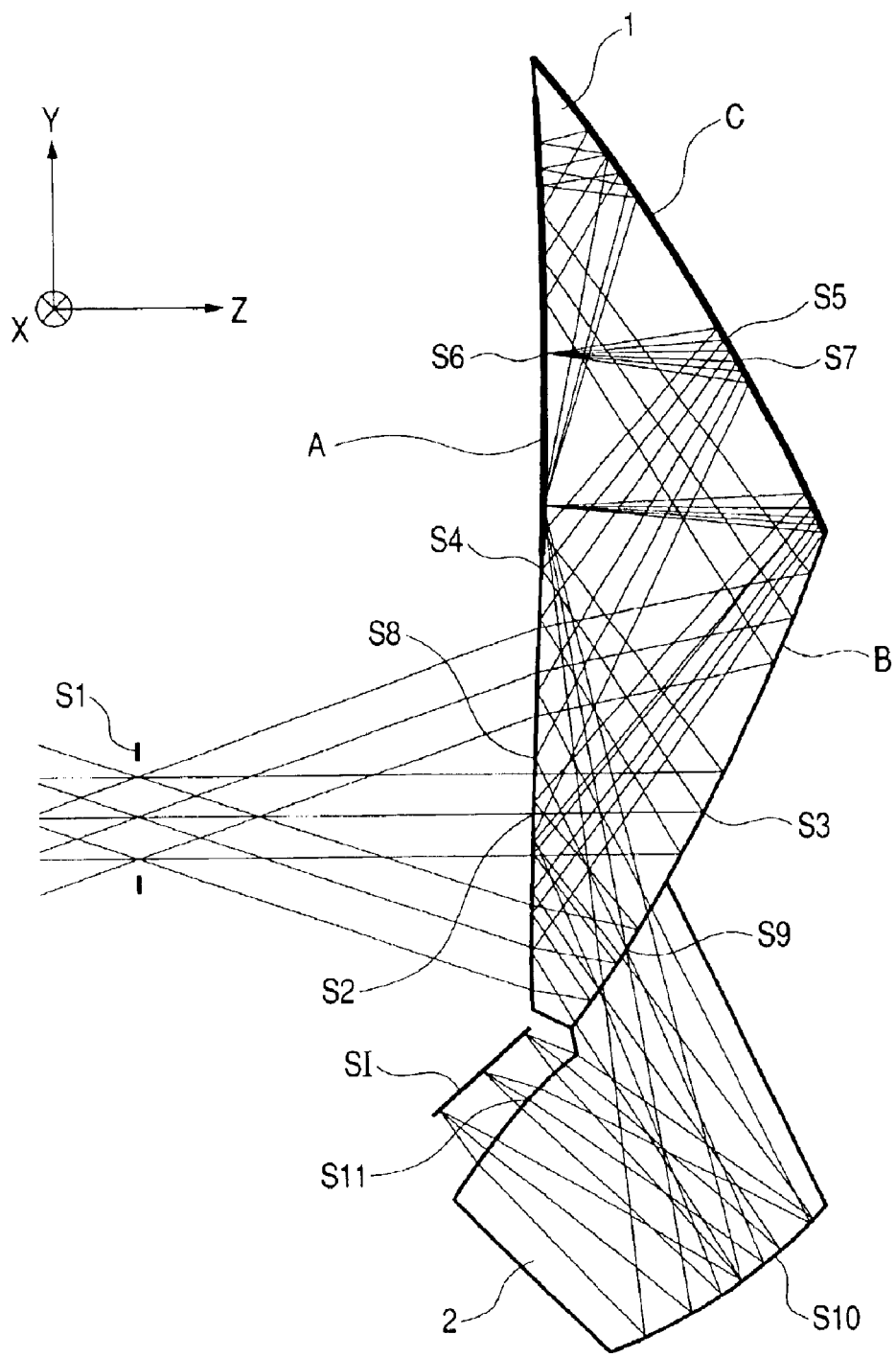
FIG. 19 is a sectional view of an optical system of Fourth Numerical Example (an embodiment form of First Embodiment) of the present invention.

FIG. 19 shows an optical path sectional view showing Fourth Numerical Example. In the figure, reference numeral 1 denotes a first optical system, which is constituted by a transparent body (hereinafter referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is constituted by a transparent body consisting of an

TABLE 5

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.384 | 21.175 | −4.301 | −188.1895 | 1 | 1.5709 | 33.8 |
| 3 | 0.000 | −4.193 | 33.458 | −28.044 | −91.5050 | 2 | −1.5709 | 33.8 |
| 4 | 0.000 | −0.384 | 21.175 | −4.301 | −188.1895 | 1 | 1.5709 | 33.8 |
| 5 | 0.000 | 18.466 | 42.733 | 20.833 | −110.8056 | 3 | −1.5709 | 33.8 |
| 6 | 0.000 | −0.384 | 21.175 | −4.301 | −188.1895 | 1 | 1.5709 | 33.8 |
| 7 | 0.000 | 18.466 | 42.733 | 20.833 | −110.8056 | 3 | −1.5709 | 33.8 |
| 8 | 0.000 | −0.384 | 21.175 | −4.301 | −188.1895 | 1 | 1.5709 | 33.8 |
| 9 | 0.000 | −4.193 | 33.458 | −28.044 | −91.5050 | 2 | 1.0000 | |
| 10 | 0.000 | −9.309 | 33.928 | −60.009 | 14.5664 | 4 | 1.5709 | 33.8 |
| 11 | 0.000 | −13.980 | 46.316 | −30.879 | −63.9341 | 5 | −1.5709 | 33.8 |
| 12 | 0.000 | −17.803 | 27.774 | −17.264 | 14.1462 | 6 | −1.0000 | |
| | 0.000 | −31.022 | 16.891 | −27.045 | ∞ | SPH | −1.0000 | |

| | | | | |
|---|---|---|---|---|
| FFS1 | c1: 3.8814e−001 | c5: −5.8038e−005 | c6: −2.0446e−005 | c10: −2.4513e−007 |
| | c11: −1.6181e−006 | c12: 9.9891e−009 | c13: −2.9297e−010 | c14: −1.4792e−009 |
| FFS2 | c1: −1.1898e+000 | c5: 6.6818e−005 | c6: 1.7143e−005 | c10: 4.6601e−006 |
| | c11: −6.2063e−006 | c12: 5.4655e−009 | c13: 6.1078e−008 | c14: 3.7474e−008 |
| FFS3 | c1: −1.6682e−001 | c5: −4.7265e−005 | c6: −7.5039e−005 | c10: −1.2335e−007 |
| | c11: −1.4967e−006 | c12: −1.9119e−008 | c13: −2.1650e−008 | c14: −1.1517e−009 |
| FFS4 | c1: −8.3126e−001 | c5: 2.2918e−003 | c6: −6.6867e−004 | c10: 1.5742e−005 |
| | c11: 6.4495e−005 | c12: −2.9179e−006 | c13: 6.8680e−006 | c14: −5.0409e−006 |
| FFS5 | c1: 2.4490e−001 | c5: −1.1634e−004 | c6: −4.9721e−005 | c10: 1.1414e−005 |
| | c11: −5.4783e−007 | c12: 3.5491e−008 | c13: 5.1275e−007 | c14: −2.1992e−008 |
| FFS6 | c1: −5.5645e−001 | c5: 9.8151e−004 | c6: −4.0264e−003 | c10: 1.3080e−003 |
| | c11: 2.9911e−004 | c12: 1.0445e−005 | c13: 1.7669e−005 | c14: 4.3047e−005 |

$|\theta| = 5.8°$
$|\beta| = 42.3915°$
$|\alpha| = 52.1564°$

TABLE 6

| SURF | ry | rx | fy | fx | d | n |
|---|---|---|---|---|---|---|
| 1 | ∞ | ∞ | ∞ | ∞ | 21.204 | 1.000 |
| 2 | −189.48530 | −181.29176 | −331.906 | −317.554 | 14.180 | 1.571 |
| 3 | −95.78953 | −93.03087 | 30.489 | 29.611 | −20.976 | −1.571 |
| 4 | −191.81108 | −173.75183 | −61.051 | −55.303 | 22.454 | 1.571 |
| 5 | −112.42882 | −104.17064 | 35.785 | 33.156 | −15.221 | −1.571 |
| 6 | −192.56862 | −163.65884 | −61.282 | −52.091 | 15.906 | 1.571 |
| 7 | −111.72719 | −104.41048 | 35.562 | 33.233 | −26.036 | −1.571 |
| 8 | −191.15702 | −176.72335 | −60.843 | −56.249 | 19.483 | 1.571 |
| 9 | −88.92908 | −93.43696 | 155.770 | 163.666 | 3.685 | 1.000 |
| 10 | 16.35884 | 14.23789 | 28.654 | 24.939 | 15.094 | 1.571 |
| 11 | −43.92270 | −52.17019 | 13.980 | 16.605 | −12.292 | −1.571 |
| 12 | 41.42013 | 23.19733 | 72.552 | 40.633 | −6.590 | −1.000 |
| | ∞ | ∞ | ∞ | ∞ | | |

$|fyc/fya| = 0.58$

In this numerical example, a display optical system is obtained which displays an image with a horizontal angle of view of 50° at an exit pupil diameter φ of 10 mm and an image display size of 10 mm×7.5 mm in the infinitive distance in the positive direction of the z axis.

Further, the optical system shown in this numerical example can also be utilized as an image taking optical system in the same manner as First Numerical Example.

identical medium having three optical surfaces of S9, S10 and S11. The transparent body of the first optical system 1 and the transparent body of the second optical system 2 are joined in S9.

In this numerical example, all the optical surfaces S2 to S11 are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light beam from the image display surface SI is made incident on the optical element of the second optical system 2 from S11, reflected on S10 and exits from S9 to be made incident on the first optical element 1. The position where the light beam is made incident on the first optical element 1 is on the lower side of the surface B compared to that in Second Numerical Example. Further, an optical path of the light beam since it is made incident on the first optical element 1 until it exits is the same as that in First Numerical Example.

Optical data of Fourth Numerical Example is shown in Table 7 and local data with respect to a principal ray at central angle of view is shown in Table 8.

In Fourth Numerical Example, a display optical system is obtained which displays an image with a horizontal angle of view of 50° at an exit pupil diameter φ of 7 mm and an image display size of 10 mm×7.5 mm in the infinitive distance in the positive direction of the z axis.

Further, the optical system shown in this numerical example can also be utilized as an image taking optical system in the same manner as First Numerical Example.

Fifth Numerical Example

Figure 20:
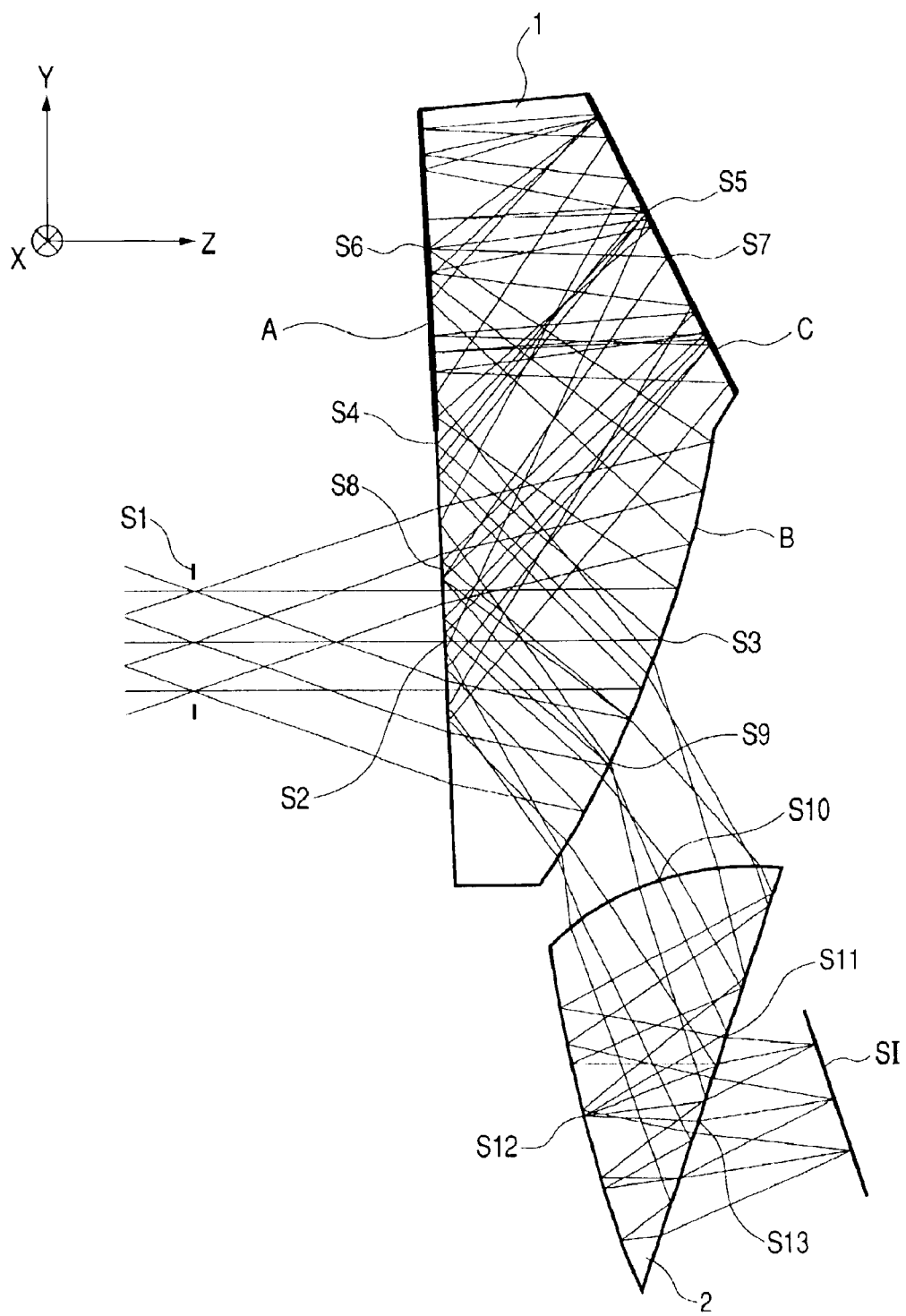
FIG. 20 is a sectional view of an optical system of Fifth Numerical Example (an embodiment form of First Embodiment) of the present invention.

FIG. 20 shows an optical path sectional view showing Fifth Numerical Example. In the figure, reference numeral 1 denotes a first optical system, which is constituted by a transparent body (hereinafter referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is constituted by a transparent body (optical element) consisting of an identical medium having three optical surfaces of S10, S11 (surface identical to S13) and S12.

TABLE 7

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | −4.428 | 26.925 | −2.478 | 10652.1018 | 1 | 1.5745 | 33.8 |
| 3 | 0.000 | −6.925 | 34.658 | −32.507 | −103.0245 | 2 | −1.5745 | 33.8 |
| 4 | 0.000 | −4.428 | 26.925 | −2.478 | 10652.1018 | 1 | 1.5745 | 33.8 |
| 5 | 0.000 | 17.302 | 48.076 | 23.725 | −298.6735 | 3 | −1.5745 | 33.8 |
| 6 | 0.000 | −4.428 | 26.925 | −2.478 | 10652.1018 | 1 | 1.5745 | 33.8 |
| 7 | 0.000 | 17.302 | 48.076 | 23.725 | −298.6735 | 3 | −1.5745 | 33.8 |
| 8 | 0.000 | −4.428 | 26.925 | −2.478 | 10652.1018 | 1 | 1.5745 | 33.8 |
| 9 | 0.000 | −6.925 | 34.658 | −32.507 | −103.0245 | 2 | 1.5745 | 33.8 |
| 10 | 0.000 | −25.172 | 48.564 | −39.984 | −46.1075 | 4 | −1.5745 | 33.8 |
| 11 | 0.000 | −34.244 | 14.766 | −39.849 | 41.4645 | 5 | −1.0000 | |
| | 0.000 | −29.556 | 9.150 | −49.444 | ∞ | SPH | −1.0000 | |

| | | | | |
|---|---|---|---|---|
| FFS1 | c1: 1.7986e+002 | c5: −6.7534e−004 | c6: −9.1158e−005 | c10: −4.4684e−006 |
| | c11: −1.9359e−008 | c12: −1.0150e−007 | c13: −3.8253e−008 | c14: −2.1119e−008 |
| FFS2 | c1: −1.9715e+000 | c5: 2.8251e−004 | c6: 8.0597e−004 | c10: −1.4455e−005 |
| | c11: 1.4729e−006 | c12: −3.7107e−008 | c13: −1.2112e−008 | c14: 1.8826e−007 |
| FFS3 | c1: 3.5406e+000 | c5: −7.6154e−004 | c6: −3.5668e−004 | c10: −4.9989e−006 |
| | c11: 7.5402e−006 | c12: −7.5072e−008 | c13: −5.0148e−008 | c14: −5.0664e−008 |
| FFS4 | c1: 6.6209e−001 | c5: −4.6157e−004 | c6: −2.4056e−004 | c10: 1.5610e−005 |
| | c11: 4.0401e−005 | c12: −2.5231e−007 | c13: 2.7991e−007 | c14: 4.3600e−008 |
| FFS5 | c1: 1.2508e−000 | c5: 2.2006e−002 | c6: 4.9562e−003 | c10: 1.5942e−004 |
| | c11: 8.1253e−004 | c12: 8.5600e−006 | c13: 4.0461e−006 | c14: 2.7346e−006 |

|θ| = 11.0°
|β| = 47.1937°
|α| = 67.3932°

TABLE 8

| SURF | ry | rx | fy | fx | d | n |
|---|---|---|---|---|---|---|
| 1 | ∞ | ∞ | ∞ | ∞ | 27.126 | 1.000 |
| 2 | −1416.00908 | −579.26289 | 2464.864 | −1008.330 | 11.543 | 1.574 |
| 3 | −122.10065 | −161.33706 | 38.775 | 51.235 | −19.750 | −1.574 |
| 4 | −1016.43034 | −533.82311 | −322.783 | −169.524 | 20.661 | 1.574 |
| 5 | −161.70515 | −162.50151 | 51.352 | 51.605 | −12.304 | −1.574 |
| 6 | −334.55186 | −600.00488 | −106.242 | −190.541 | 13.679 | 1.574 |
| 7 | −178.21050 | −162.29594 | 56.594 | 51.540 | −30.331 | −1.574 |
| 8 | 2639.39122 | −558.35340 | 838.180 | −177.314 | 14.264 | 1.574 |
| 9 | −164.77277 | −177.72489 | ∞ | ∞ | 23.686 | 1.574 |
| 10 | −42.19883 | −37.26316 | 13.401 | 11.834 | 19.834 | −1.574 |
| 11 | 29.27583 | 5.21334 | 50.961 | 9.075 | −6.875 | −1.000 |
| | ∞ | ∞ | ∞ | ∞ | | |

|fyc/fya| = 0.48

In this numerical example, all the optical surfaces S2 to S12 (S13) are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light from the image display surface SI is made incident on the optical element of the second optical system 2 from S13, reflected on S12 and S11 and exits from S10 to travel toward the first optical element 1. An optical path of the light since it is made incident on the first optical element 1 until it exits is the same as that in First Numerical Example.

Here, in the transmission surface of the transparent body of the second optical system 2 and the optical surface having the action of the reflection surface, at least reflection in the transmitted light beam area is total reflection. In addition, all reflected light beams on this optical surface may be totally reflected. By totally reflecting a light beam in this way, a loss of an amount of light in the second optical system 2 is eliminated.

In this numerical example, since the thickness of the surface A and the surface C of the first optical system 1 (length of the transparent body in the z axis direction, the same in the following description) increases and the thickness of the surface A and the surface B also increases compared with Third Numerical Example, the first optical system 1 becomes large as a whole.

Optical data of Fifth Numerical Example is shown in Table 9 and local data with respect to a principal ray at central angle of view is shown in Table 10.

TABLE 9

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | 3.442 | 20.885 | 1.589 | −588.1717 | 1 | 1.5745 | 33.8 |
| 3 | 0.000 | −0.275 | 38.308 | −21.040 | −105.6048 | 2 | −1.5745 | 33.8 |
| 4 | 0.000 | 3.442 | 20.885 | 1.589 | −588.1717 | 1 | 1.5745 | 33.8 |
| 5 | 0.000 | 27.834 | 41.705 | 24.808 | −192.6476 | 3 | −1.5745 | 33.8 |
| 6 | 0.000 | 3.442 | 20.885 | 1.589 | −588.1717 | 1 | 1.5745 | 33.8 |
| 7 | 0.000 | 27.834 | 41.705 | 24.808 | −192.6476 | 3 | −1.5745 | 33.8 |
| 8 | 0.000 | 3.442 | 20.885 | 1.589 | −588.1717 | 1 | 1.5745 | 33.8 |
| 9 | 0.000 | −0.275 | 38.308 | −21.040 | −105.6048 | 2 | 1.0000 | |
| 10 | 0.000 | −19.983 | 36.652 | −69.507 | 17.3051 | 4 | 1.5745 | 33.8 |
| 11 | 0.000 | −13.312 | 49.912 | −19.373 | −617.7426 | 5 | −1.5745 | 33.8 |
| 12 | 0.000 | −33.239 | 30.061 | 10.063 | 70.1181 | 6 | 1.5745 | 33.8 |
| 13 | 0.000 | −13.312 | 49.912 | −19.373 | −617.7426 | 5 | 1.0000 | |
| I | 0.000 | −27.817 | 48.686 | 17.381 | ∞ | SPH | 1.0000 | |

| FFS1 | $c_1$: −4.2164e+001 | $c_5$: 4.0033e−004 | $c_6$: 4.2890e−004 | $c_{10}$: −1.0649e−007 |
|---|---|---|---|---|
| | $c_{11}$: −1.4544e−005 | $c_{12}$: 7.8653e−008 | $c_{13}$: −3.3045e−008 | $c_{14}$: −6.4635e−008 |
| FFS2 | $c_1$: −1.0496e+000 | $c_5$: 2.0279e−004 | $c_6$: −2.2194e−004 | $c_{10}$: −6.8870e−006 |
| | $c_{11}$: −1.6213e−005 | $c_{12}$: 6.3979e−008 | $c_{13}$: −8.8582e−009 | $c_{14}$: 4.8517e−008 |
| FFS3 | $c_1$: −2.6909e+001 | $c_5$: −5.7211e−004 | $c_6$: 1.7312e−004 | $c_{10}$: 4.1912e−006 |
| | $c_{11}$: −2.0339e−005 | $c_{12}$: 1.7812e−007 | $c_{13}$: −1.3219e−009 | $c_{14}$: −1.3030e−007 |
| FFS4 | $c_1$: −6.6288e−001 | $c_5$: −2.8218e−003 | $c_6$: −4.3575e−003 | $c_{10}$: −1.0352e−005 |
| | $c_{11}$: −2.1480e−005 | $c_{12}$: 5.2209e−007 | $c_{13}$: −2.0903e−007 | $c_{14}$: −2.6684e−006 |
| FFS5 | $c_1$: −1.6812e+003 | $c_5$: −3.5086e−004 | $c_6$: 4.9810e−005 | $c_{10}$: 6.7950e−007 |
| | $c_{11}$: −3.2005e−006 | $c_{12}$: −1.9200e−007 | $c_{13}$: −3.1215e−008 | $c_{14}$: 3.9784e−008 |
| FFS6 | $c_1$: 1.6255e+000 | $c_5$: 1.1521e−003 | $c_6$: −4.9305e−004 | $c_{10}$: −3.6072e−006 |
| | $c_{11}$: 9.8467e−006 | $c_{12}$: −2.0498e−007 | $c_{13}$: −3.1972e−009 | $c_{14}$: −7.1231e−008 |

|θ| = 9.1°
|β| = 39.471″
|α| = 56.7582°

TABLE 10

| SURF | ry | rx | fy | fx | d | n |
|---|---|---|---|---|---|---|
| 1 | ∞ | ∞ | ∞ | ∞ | 20.974 | 1.000 |
| 2 | −909.03033 | 916.33378 | −1582.360 | 1595.073 | 17.499 | 1.574 |
| 3 | −92.81482 | −99.84204 | 29.475 | 31.706 | −24.212 | −1.574 |
| 4 | 75031.28793 | −1388.86328 | 23827.360 | −441.055 | 25.676 | 1.574 |
| 5 | −510.57949 | −151.81042 | 162.143 | 48.210 | −18.549 | −1.574 |
| 6 | 8089.82790 | −261.77078 | 2569.051 | −83.129 | 19.912 | 1.574 |
| 7 | −394.72518 | −163.29069 | 125.351 | 51.856 | −32.335 | −1.574 |
| 8 | −1644.55569 | 1625.84674 | −522.254 | 516.313 | 20.465 | 1.574 |
| 9 | −102.84096 | −119.10424 | 179.016 | 207.326 | 10.237 | 1.000 |
| 10 | 21.99684 | 29.08547 | 38.290 | 50.629 | 13.811 | 1.574 |
| 11 | 1314.28087 | 5953.78053 | −417.370 | −1890.716 | −13.613 | −1.574 |
| 12 | 92.49879 | 68.80047 | 29.374 | 21.849 | 9.391 | 1.574 |
| 13 | 698.07787 | 608.55465 | −1215.152 | −1059.318 | 22.597 | 1.000 |
| I | ∞ | ∞ | ∞ | ∞ | | |

|fyc/fya| = 0.063

In Fifth Numerical Example, a display optical system is obtained which displays an image with a horizontal angle of view of 50° at an exit pupil diameter φ of 10 mm and an image display size of 10 mm×7.5 mm in the infinitive distance in the positive direction of the z axis.

Further, the optical system shown in this numerical example can also be utilized as an image taking optical system in the same manner as First Numerical Example.

Sixth Numerical Example

Figure 21:
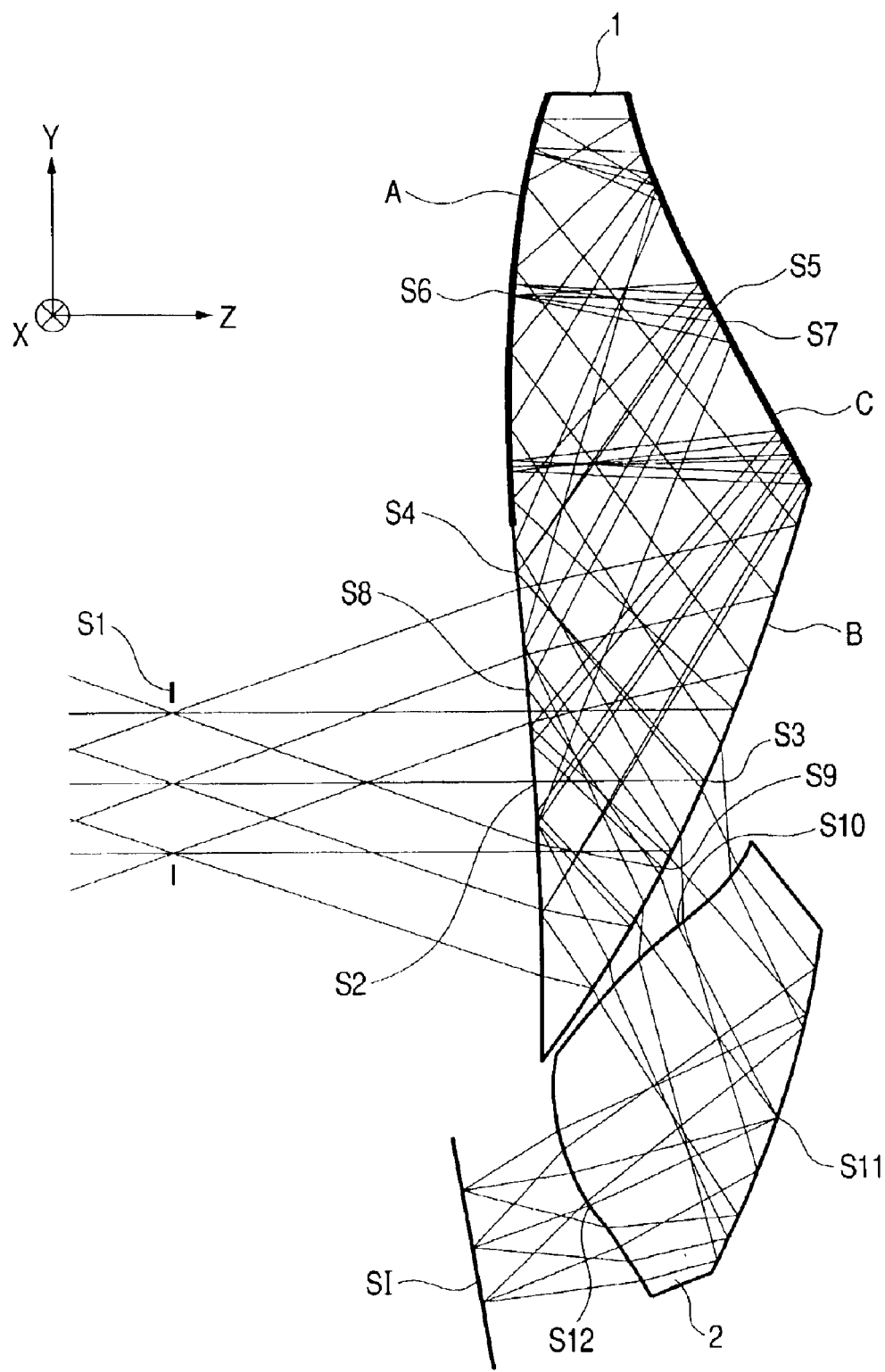
FIG. 21 is a sectional view of an optical system of Sixth Numerical Example (an embodiment form of First Embodiment) of the present invention.

FIG. 21 shows an optical path sectional view showing Sixth Numerical Example. In the figure, reference numeral 1 denotes a first optical system, which is constituted by a transparent body (hereinafter referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is constituted by a transparent body (optical element) consisting of an identical medium having three optical surfaces of S10, S11 and S12.

In this numerical example, all the optical surfaces S2 to S12 are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light beam from the image display surface SI is made incident on the optical element of the second optical system 2 from S12 reflected on S11 and exits from S10 to travel toward the first optical element 1. An optical path of the light beam since it is made incident on the first optical element 1 until it exits is the same as that in First Numerical Example.

In Sixth Numerical Example, the size of the first optical element 1 is substantially equal compared with Third Numerical Example in terms of both the thickness and the height (length of the prism in the y axis direction). However, a curvature at each hit point on the principal ray at central angle of view of the surface A and the surface C has an opposite sign compared with a curvature at each hit point on the principal ray at central angle of view of the surface A and the surface C of Third Numerical Example.

Optical data of Sixth Numerical Example is shown in Table 11 and local data with respect to a principal ray at central angle of view is shown in Table 12.

TABLE 11

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | −7.358 | 25.725 | 1.691 | −142.5869 | 1 | 1.5709 | 33.8 |
| 3 | 0.000 | −3.614 | 35.664 | −25.498 | −72.1903 | 2 | −1.5709 | 33.8 |
| 4 | 0.000 | −7.358 | 25.725 | 1.691 | −142.5869 | 1 | −1.5709 | 33.8 |
| 5 | 0.000 | 19.859 | 45.601 | 27.442 | −144.4084 | 3 | −1.5709 | 33.8 |
| 6 | 0.000 | −7.358 | 25.725 | 1.691 | −142.5869 | 1 | 1.5709 | 33.8 |
| 7 | 0.000 | 19.859 | 45.601 | 27.442 | −144.4084 | 3 | −1.5709 | 33.8 |
| 8 | 0.000 | −7.358 | 25.725 | 1.691 | −142.5869 | 1 | 1.5709 | 33.8 |
| 9 | 0.000 | −3.614 | 35.664 | −25.498 | −72.1903 | 2 | 1.000 | |
| 10 | 0.000 | −11.273 | 34.135 | −48.098 | 13.9179 | 4 | 1.5709 | 33.8 |
| 11 | 0.000 | −19.707 | 43.717 | −16.191 | −73.1488 | 5 | −1.5709 | 33.8 |
| 12 | 0.000 | −23.799 | 26.830 | 7.153 | 12.9591 | 6 | −1.0000 | |
| | 0.000 | −24.716 | 19.518 | 6.978 | ∞ | SPH | −1.0000 | |

| FFS1 | c1: −9.2194e+000 | c5: −2.1084e−003 | c6: −2.2151e−004 | c10: −8.9981e−007 |
|---|---|---|---|---|
| | c11: −1.8001e−005 | c12: 1.1650e−007 | c13: −6.5099e−008 | c14: 3.2506e−009 |
| FFS2 | c1: −3.2599e+000 | c5: −1.5021e−003 | c6: 3.4478e−004 | c10: 1.5942e−005 |
| | c11: −1.4945e−005 | c12: −2.7444e−008 | c13: −5.6082e−008 | c14: −1.0005e−007 |
| FFS3 | c1: −5.8619e−001 | c5: −3.0567e−003 | c6: −2.2009e−005 | c10: −8.1299e−006 |
| | c11: −3.5512e−006 | c12: 7.4574e−007 | c13: −3.6251e−007 | c14: 1.1937e−007 |
| FFS4 | c1: −1.0752e+000 | c5: 6.2101e+003 | c6: −9.4098e−003 | c10: −2.7242e−004 |
| | c11: 2.7212e−004 | c12: 3.9887e−006 | c13: 1.2846e−005 | c14: −1.0777e−005 |
| FFS5 | c1: 6.0769e−000 | c5: −1.7907e−004 | c6: −7.6389e−004 | c10: −1.1269e−005 |
| | c11: 2.7352e−005 | c12: 1.7912e−006 | c13: 1.6690e−006 | c14: 9.7474e−007 |
| FFS6 | c1: −1.4085e+000 | c5: −3.2750e−003 | c6: −1.2446e−003 | c10: 1.7373e−005 |
| | c11: 1.0619e−004 | c12: 5.7466e−006 | c13: 3.5919e−006 | c14: −7.0921e−006 |

$|\theta| = 5.9°$
$|\beta| = 56.1752°$
$|\alpha| = 69.0473°$

TABLE 12

| SURF | ry | rx | fy | fx | d | n |
|---|---|---|---|---|---|---|
| 1 | ∞ | ∞ | ∞ | ∞ | 25.417 | 1.000 |
| 2 | −396.46938 | −77.23868 | −694.460 | −135.293 | 11.995 | 1.571 |
| 3 | −128.37631 | −64.79102 | 40.861 | 20.622 | −19.225 | −1.571 |
| 4 | 447.23164 | −68.32679 | 142.349 | −21.748 | 23.787 | 1.571 |
| 5 | 172.11133 | −63.39475 | −54.781 | 20.178 | −13.899 | −1.571 |
| 6 | 83.12511 | −57.16786 | 26.458 | −18.196 | 14.804 | 1.571 |

TABLE 12-continued

| SURF | ry | rx | fy | fx | d | n |
|---|---|---|---|---|---|---|
| 7 | 236.82846 | −65.22266 | −75.380 | 20.760 | −29.486 | −1.571 |
| 8 | −1290.47551 | −73.12520 | −410.744 | −23.275 | 15.808 | 1.571 |
| 9 | −94.43794 | −64.57663 | 165.419 | 113.114 | 3.914 | 1.000 |
| 10 | 151.16614 | 21.86781 | 264.786 | 38.304 | 15.559 | 1.571 |
| 11 | −67.11530 | −56.44624 | 21.362 | 17.966 | −14.380 | −1.571 |
| 12 | 27.42546 | 20.72726 | 48.039 | 36.306 | 9.018 | −1.000 |
| | ∞ | ∞ | ∞ | ∞ | | |

|fyc/fya| = 2.07

In Sixth Numerical Example, a display optical system is obtained which displays an image with a horizontal angle of view of 50° at an exit pupil diameter φ of 12 mm and an image display size of 10 mm×7.5 mm in the infinitive distance in the positive direction of the z axis.

Further, the optical system shown in this numerical example can also be utilized as an image taking optical system in the same manner as First Numerical Example.

Seventh Numerical Example

Figure 22:
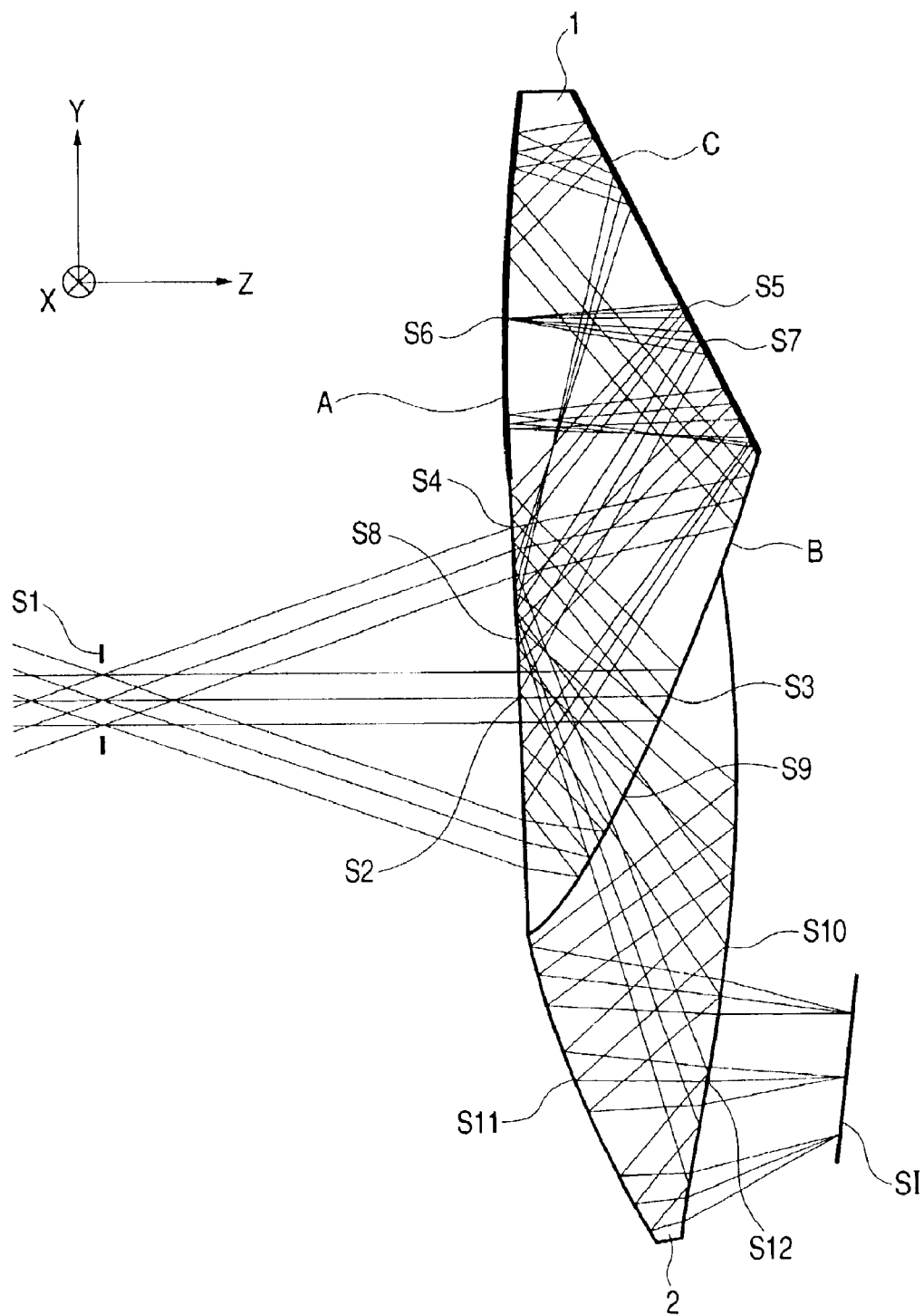
FIG. 22 is a sectional view of an optical system of Seventh Numerical Example (an embodiment form of First Embodiment) of the present invention.

FIG. 22 shows an optical path sectional view showing Seventh Numerical Example. In the figure, reference numeral 1 denotes a first optical system, which is constituted by a transparent body (hereinafter referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is constituted by a transparent body (optical element) consisting of an identical medium having three surfaces of S9, S10 and S11 (surface identical to S12). The optical element of the first optical system 1 and the optical element of the second optical system 2 are joined in S9.

In this numerical example, all the optical surfaces S2 to S11 are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light beam from the image display surface SI is made incident on the optical element of the second optical system 2 from S12 reflected twice on S11 and S10 and passes through S9 to travel toward the first optical element 1. An optical path of the light beam since it is made incident on the first optical element 1 until it exits is the same as that in First Numerical Example.

In Seventh Numerical Example, as in Sixth Numerical Example, a curvature at each hit point on the principal ray at central angle of view of the surface A and the surface C in the first optical system 1 has an opposite sign compared with a curvature at each hit point on the principal ray at central angle of view of the surface A and the surface C of Second Numerical Example.

Further, on the optical surface having both the actions of transmission and reflection in the second optical system 2, since a light beam is totally reflected, there is no loss of an amount of light. In addition, the first optical system 1 is smaller than that of Sixth Numerical Example and is equivalent to that of First Numerical Example.

Optical data of Seventh Numerical Example is shown in Table 13 and local data with respect to a principal ray at central angle of view is shown in Table 14.

TABLE 13

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.153 | 27.498 | 1.459 | 9855.0949 | 1 | 1.5745 | 33.8 |
| 3 | 0.000 | −0.081 | 37.697 | −23.776 | −90.2393 | 2 | −1.5745 | 33.8 |
| 4 | 0.000 | −0.153 | 27.498 | 1.459 | 9855.0949 | 1 | 1.5745 | 33.8 |
| 5 | 0.000 | 21.191 | 41.436 | 25.278 | −247.7460 | 3 | −1.5745 | 33.8 |
| 6 | 0.000 | −0.153 | 27.498 | 1.459 | 9855.0949 | 1 | 1.5745 | 33.8 |
| 7 | 0.000 | 21.191 | 41.436 | 25.278 | −247.7460 | 3 | −1.5745 | 33.8 |
| 8 | 0.000 | −0.153 | 27.498 | 1.459 | 9855.0949 | 1 | 1.5745 | 33.8 |
| 9 | 0.000 | −0.081 | 37.697 | −23.776 | −90.2393 | 2 | −1.5745 | 33.8 |
| 10 | 0.000 | 1.794 | 41.741 | 2.647 | −147.7216 | 4 | −1.5745 | 33.8 |
| 11 | 0.000 | −29.070 | 32.286 | 23.186 | 52.0263 | 5 | 1.5745 | 33.8 |
| 12 | 0.000 | 1.794 | 41.741 | 2.647 | −147.7216 | 6 | 1.0000 | 0.0 |
| | 0.000 | 2.318 | 53.078 | −8.753 | ∞ | SPH | 1.0000 | |

| FFS1 | c1: −1.2303e−004 | c5: −4.1575e−004 | c6: −6.8530e−005 | c10: 1.5123e−006 |
|---|---|---|---|---|
| | c11: −7.372e−006 | c12: 5.9288e−008 | c13: −2.0783e−008 | c14: 1.8283e−008 |
| FFS2 | c1: −2.5670e+000 | c5: 1.0647e−004 | c6: 5.3264e−004 | c10: 2.2638e−005 |
| | c11: 1.6860e−006 | c12: 3.6303e−007 | c13: 7.8953e−008 | c14: 1.3509e−007 |
| FFS3 | c1: −3.3876e+001 | c5: −8.0115e−004 | c6: −1.6349e−004 | c10: −3.6871e−006 |
| | c11: −2.1635e−005 | c12: −6.9312e−008 | c13: −1.5659e−007 | c14: 2.5610e−008 |
| FFS4 | c1: −8.0920e−001 | c5: 1.8474e−003 | c6: 2.1977e−004 | c10: 9.9777e−007 |
| | c11: −10037e−005 | c12: 6.5131e−007 | c13: 9.0879e−009 | c14: 3.0769e−008 |

TABLE 13-continued

| FFS5 | c1: 2.2928e+000 | c5: 3.2354e−003 | c6: 1.2955e−003 | c10: −4.4854e−005 |
|---|---|---|---|---|
| | c11: 5.0794e−006 | c12: 2.0335e−006 | c13: 1.2585e−006 | c14: 1.2881e−007 |
| FFS6 | c1: −8.0920e−001 | c5: 1.8474e−003 | c6: 2.1977e−004 | c10: 9.9777e−007 |
| | c11: −1.0037e−005 | c12: 6.5131e−007 | c13: 9.0879e−009 | c14: 3.0769e−008 |

|θ| = 9.4°
|β| = 46.104°
|α| = 64.2839°

TABLE 14

| SURF | ry | rx | fy | fx | d | n |
|---|---|---|---|---|---|---|
| 1 | ∞ | ∞ | ∞ | ∞ | 27.494 | 1.000 |
| 2 | 1493.60303 | −990.45060 | 2599.933 | −1724.089 | 1.0280 | 1.574 |
| 3 | −110.03334 | −114.78204 | 34.943 | 36.451 | −15.665 | −1.574 |
| 4 | 517.54423 | −684.94749 | 164.354 | −217.516 | 18.394 | 1.574 |
| 5 | −401.12234 | −143.29887 | 127.383 | 45.507 | −11.964 | −1.574 |
| 6 | 230.02924 | −485.32007 | 73.049 | −154.121 | 13.045 | 1.574 |
| 7 | −351.46150 | −149.94132 | 111.612 | 47.616 | −24.245 | −1.574 |
| 8 | 1098.81312 | −894.48284 | 347.357 | −284.057 | 12.136 | 1.574 |
| 9 | −88.41313 | −101.41580 | ∞ | ∞ | 11.662 | 1.574 |
| 10 | −133.10101 | −279.30381 | 42.268 | 88.697 | −13.481 | −1.574 |
| 11 | 67.88094 | 33.56302 | 21.557 | 10.658 | 8.714 | 1.574 |
| 12 | −236.12700 | −164.89695 | 411.029 | 287.038 | 14.782 | 1.000 |
| I | ∞ | ∞ | ∞ | ∞ | ∞ | |

|fyc/fya| = 1.74

In Seventh Numerical Example, a display optical system is obtained which displays an image with a horizontal angle of view of 50° at an exit pupil diameter φ of 4 m and an image display size of 10 mm×7.5 mm in the infinitive distance in the positive direction of the z axis.

Further, the optical system shown in this numerical example can also be utilized as an image taking optical system in the same manner as First Numerical Example.

Eighth Numerical Example

Figure 23:
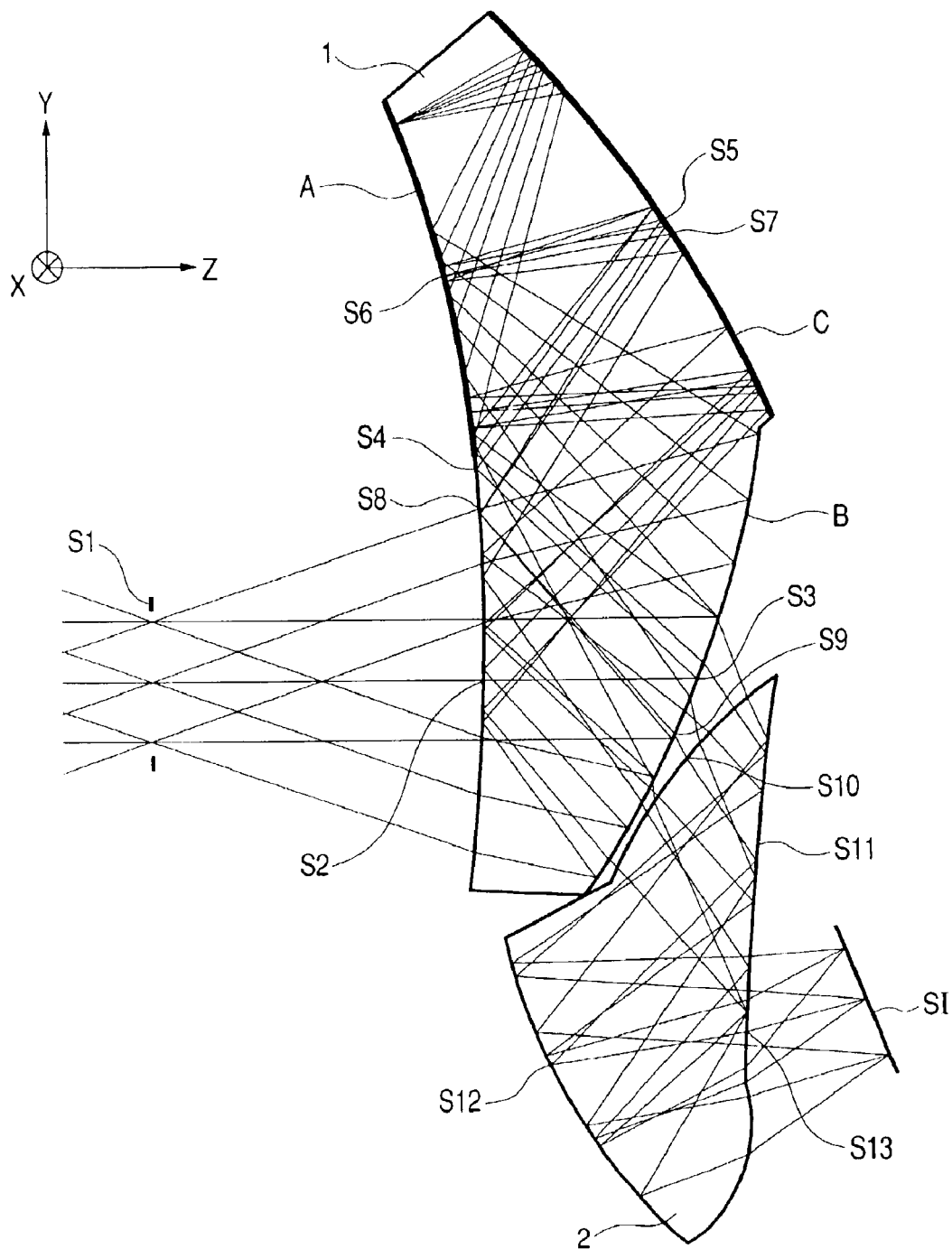
FIG. 23 is a sectional view of an optical system of Eighth Numerical Example (an embodiment form of First Embodiment) of the present invention.

FIG. 23 is an optical path sectional view showing Eighth Numerical Example. In the figure, reference numeral 1 denotes a first optical system, which is constituted by a transparent body (hereinafter referred to also as first optical element 1) having three optical surfaces. Reference symbols S2, S4, S6 and S8 denote an identical surface; S3 and S9, an identical surface; and S5 and S7, an identical surface. These three surfaces correspond to the surfaces A, B and C described in First Embodiment, respectively.

Reference numeral 2 denotes a second optical system, which is constituted by a transparent body (optical element) consisting of an identical medium having three optical surfaces of S10 S11 (surface identical to S13) and S12.

In this numerical example, all the optical surfaces S2 to S13 are rotation asymmetrical surfaces, which are formed in a plane symmetrical shape having the paper surface of the figure (yz section) as an only symmetrical surface. Also, reflective films are formed on S6 and the surface C. Reference symbol SI denotes an image display surface and S1 denotes an exit pupil S of the display optical system.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

A light beam from the image display surface SI is made incident on the optical element of the second optical system 2 from S13, reflected twice on S12 and S11 and exits from S10 to travel toward the first optical element 1. An optical path of the light beam since it is made incident on the first optical element 1 until it exits is the same as that in First Numerical Example.

In Eighth Numerical Example, curvatures at each hit point on the principal ray at central angle of view of the surface A and the surface C in the first optical system 1 both become intense compared with a curvature at each hit point on the principal ray at central angle of view of the surface A and the surface C of Second Numerical Example.

Further, on the optical surface having both the actions of transmission and reflection in the second optical system 2, since a light beam is totally reflected, a loss in an amount of light is small. In addition, the first optical system 1 is equivalent to that of Fourth Numerical Example.

Optical data of Eighth Numerical Example is shown in Table 15 and local data with respect to a principal ray at central angle of view is shown in Table 16.

TABLE 15

| SURF | X | Y | Z | A | R | FFS | Nd | vd |
|---|---|---|---|---|---|---|---|---|
| 1 | 0.000 | 0.000 | 0.000 | 0.000 | ∞ | SPH | 1.0000 | |
| 2 | 0.000 | 1.717 | 23.030 | −1.590 | −163.6302 | 1 | 1.5709 | 33.8 |
| 3 | 0.000 | −4.041 | 36.472 | −25.389 | −74.5831 | 2 | −1.5709 | 33.8 |
| 4 | 0.000 | 1.717 | 23.030 | −1.590 | −163.6302 | 1 | 1.5709 | 33.8 |
| 5 | 0.000 | 20.058 | 43.156 | 24.479 | −111.8720 | 3 | −1.5709 | 33.8 |

TABLE 15-continued

| | | | | | | | | |
|---|---|---|---|---|---|---|---|---|
| 6 | 0.000 | 1.717 | 23.030 | −1.590 | −163.6302 | 1 | 1.5709 | 33.8 |
| 7 | 0.000 | 20.058 | 43.156 | 24.479 | −111.8720 | 3 | −1.5709 | 33.8 |
| 8 | 0.000 | 1.717 | 23.030 | −1.590 | −163.6302 | 1 | 1.5709 | 33.8 |
| 9 | 0.000 | −4.041 | 36.472 | −25.389 | −74.5831 | 2 | 1.0000 | |
| 10 | 0.000 | −3.856 | 38.922 | −48.121 | 32.7675 | 4 | 1.5709 | 33.8 |
| 11 | 0.000 | −2.292 | 43.512 | −8.129 | 734.3017 | 5 | −1.5709 | 33.8 |
| 12 | 0.000 | −23.771 | 25.974 | 21.576 | 47.5264 | 6 | 1.5709 | 33.8 |
| 13 | 0.000 | −2.292 | 43.512 | −8.129 | 734.3017 | 5 | 1.0000 | |
| I | 0.000 | −13.956 | 45.894 | 22.318 | ∞ | SPH | 1.0000 | |

| | | | | |
|---|---|---|---|---|
| FFS1 | c1: 5.3885e+000 | c5: −1.4286e−004 | c6: −3.3833e−004 | c10 −3.9283e−006 |
| | c11: 6.8899e−006 | c12: −2.7344e−008 | c13: 6.7957e−009 | c14: −1.2389e−009 |
| FFS2 | c1: 1.0113e−002 | c5: 5.5884e−004 | c6: 2.7503e−004 | c10: 8.8466e−006 |
| | c11: 2.2294e−006 | c12: 2.4117e−008 | c13: 4.1841e−008 | c14: −2.7567e−008 |
| FFS3 | c1: 1.8410e−001 | c5: 3.6922e−006 | c6: −3.1005e−004 | c10: −5.5644e−007 |
| | c11: 3.8280e−006 | c12: −3.4678e−008 | c13: 8.1421e−006 | c14: −7.9241e 008 |
| FFS4 | c1: −1.1352e+000 | c5: −4.0246e−003 | c6: −2.9791e−004 | c10: −1.5075e−00 |
| | c11: 4.3384e−005 | c12: −1.2122e−006 | c13: 1.0628e−006 | c14: −5.8225e−006 |
| FFS5 | c1: 3.3555e+002 | c5: −4.1408e−004 | c6: −7.4437e−005 | c10: −1.0044e−006 |
| | c11: 5.6621e−006 | c12: −4.4079e−008 | c13: −3.2724e 008 | c14: 7.1532e−008 |
| FFS6 | c1: 8.7800e−002 | c5: 1.8963e−004 | c6: 1.3556e−004 | c10: −9.0087e−006 |
| | c11: 1.5110e−006 | c12: 1.2148e−007 | c13: −1.0245e−007 | c14: −4.9976e−008 |

|θ| = 3.7°
|β| = 37.9623°
|α| = 43.7916°

TABLE 16

| SURF | ry | rx | fy | fx | d | n |
|---|---|---|---|---|---|---|
| 1 | ∞ | ∞ | ∞ | ∞ | 22.973 | 1.000 |
| 2 | −142.98987 | −128.49809 | −250.464 | −225.080 | 15.187 | 1.571 |
| 3 | −77.60382 | −91.32071 | 24.700 | 29.066 | −21.286 | −1.571 |
| 4 | −111.62044 | −131.62281 | −35.528 | −41.894 | 22.435 | 1.571 |
| 5 | −80.91519 | −97.41876 | 25.754 | 31.007 | −16.219 | −1.571 |
| 6 | −86.98574 | −130.62461 | −27.687 | −41.576 | 16.615 | 1.571 |
| 7 | −82.84666 | −97.75209 | 26.369 | 31.113 | −24.316 | −1.571 |
| 8 | −117.84677 | −131.24905 | −37.509 | −41.775 | 20.575 | 1.571 |
| 9 | −74.54873 | −89.40500 | 130.581 | 156.604 | 1.699 | 1.000 |
| 10 | 24.28068 | 45.14214 | 42.531 | 79.072 | 8.765 | 1.571 |
| 11 | 304.31809 | 4150.50353 | −96.861 | −1321.059 | −20.354 | −1.571 |
| 12 | 45.95641 | 45.19685 | 14.627 | 14.386 | 13.997 | 1.571 |
| 13 | 139.64811 | 973.21442 | −244.610 | −1704.702 | 20.866 | 1.000 |
| I | ∞ | ∞ | ∞ | ∞ | | |

|fyc/fya| = 0.93

In this numerical example, a display optical system is obtained which displays an image with a horizontal angle of view of 50° at an exit pupil diameter φ of 10 mm and an image display size of 10 mm×7.5 mm in the infinitive distance in the positive direction of the z axis.

Further, the optical system shown in this numerical example can also be utilized as an image taking optical system in the same manner as First Numerical Example.

Ninth Numerical Example

Figure 24:
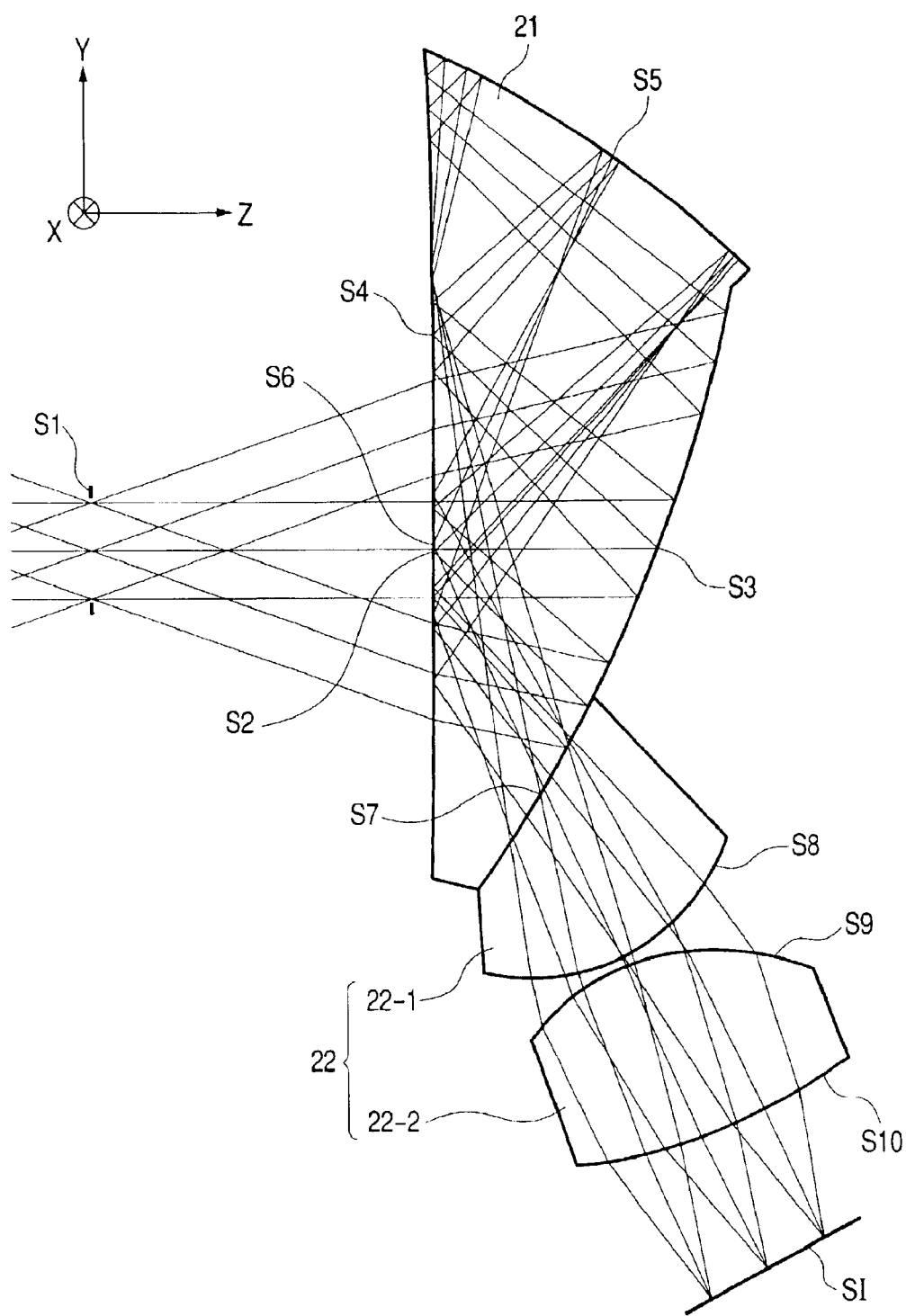
FIG. 24 is a sectional view of an optical system of Ninth Numerical Example (an embodiment form of First Embodiment) of the present invention.

FIG. 24 shows an optical path sectional view with a numerical example of Third Embodiment (similar to Fourth Embodiment shown in FIG. 10) shown in FIG. 7.

In the figure, reference numeral 21 denotes a first optical system constituting a display optical system. Reference symbols S2, S4, and S6 denote the surface A; S3 and S7, the surface B; and S5, a return reflection surface C. A reflective film is formed on the return reflection surface C (S5) and a half mirror is formed on the surface B (S3, S7). Reference symbol SI denotes an image display surface and S1 denotes an exit pupil S of the display optical system.

Reference numeral 2 denotes a second optical system, which consists of two lenses 2-1 and 2-2 that are constituted by two surfaces, respectively. One surface of the lens 2-1 is joined with a transparent body constituting the first optical system 21. This surface is denoted as S7.

In this numerical example, all the optical surfaces S1 to S10 of the first optical system 21 are rotation asymmetrical surfaces, which are formed in a plane symmetrical shape having the paper surface of the figure (yz section) as an only symmetrical surface. Optical data of this numerical example is shown in Table 17.

TABLE 17

| SURF | X | Y | Z | A | R | TYP | Nd | vd |
|---|---|---|---|---|---|---|---|---|
| 1 | 0.000 | 0.000 | 0.000 | −0.000 | ∞ | SPH | 1.0000 | |
| 2 | 0.000 | −2.002 | 22.133 | −0.426 | −733.3383 | FFS 1 | 1.5709 | 33.8 |
| 3 | 0.000 | −5.883 | 34.132 | −25.619 | −96.7035 | FFS 2 | −1.5709 | 33.8 |
| 4 | 0.000 | −2.002 | 22.133 | −0.426 | −733.3383 | FFS 1 | 1.5709 | 33.8 |

TABLE 17-continued

| | | | | | | | | |
|---|---|---|---|---|---|---|---|---|
| 5 | 0.000 | 21.740 | 38.187 | 50.514 | −76.3482 | FFS 3 | −1.5709 | 33.8 |
| 6 | 0.000 | −2.002 | 22.133 | −0.426 | −733.3383 | FFS 1 | 1.5709 | 33.8 |
| 7 | 0.000 | −5.883 | 34.132 | −25.619 | −96.7035 | FFS 2 | 1.5709 | 33.8 |
| 8 | 0.000 | −25.242 | 35.347 | −58.164 | −12.6645 | FFS 4 | 1.0000 | |
| 9 | 0.000 | −25.941 | 36.428 | −77.011 | 14.4303 | FFS 5 | 1.5709 | 33.8 |
| 10 | 0.000 | −36.980 | 40.129 | −68.954 | −37.0315 | FFS 6 | 1.0000 | |
| | 0.000 | −45.714 | 43.489 | −62.590 | ∞ | SPH | 1.0000 | |

| | | | | |
|---|---|---|---|---|
| FFS 1 | k: 1.8728e+02 | c5: −1.3065e−04 | c6: 5.6726e−05 | c10: −3.9177e−08 |
| | c11: −1.9101e−06 | c12: −4.8270e−08 | c13: 7.7877e−09 | c14: −1.1014e−08 |
| FFS 2 | k: −1.1011e+00 | c5: 1.3962e−04 | c6: −9.0431e−05 | c10: 2.0903e−06 |
| | c11: 3.8982e−06 | c12: 1.3565e−07 | c13: 1.4312e−08 | c14: 2.5680e−08 |
| FFS 3 | k: −7.8033e−01 | c5: −4.3217e−04 | c6: −8.6593e−05 | c10: −1.9804e−06 |
| | c11: −3.7354e−06 | c12: −2.7052e−07 | c13: 1.1525e−07 | c14: 3.3291e−08 |
| FFS 4 | k: −1.2730e−01 | c5: −6.8801e−04 | c6: 1.1624e−04 | c10: 2.9988e−05 |
| | c11: −4.0764e−05 | c12: 2.2873e−06 | c13: −2.3612e−06 | c14: 1.3761e−06 |
| FFS 5 | k: −3.5304e−01 | c5: 8.5298e−04 | c6: 3.0465e−04 | c10: −6.5431e−05 |
| | c11: −3.1853e−05 | c12: 4.4543e−07 | c13: −1.4357e−07 | c14: −1.0286e−06 |
| FFS 6 | k: −6.8011e+00 | c5: −1.8750e−04 | c6: −6.0544e−04 | c10: 5.1322e−05 |
| | c11: 5.2327e−05 | c12: −7.7009e−06 | c13: 3.4628.e−06 | c14: 2.7700e−06 |

$|\theta| = 20.7°$

Further, Fourth Embodiment shown in FIG. 10 can be implemented by setting the angle θ such that effective surfaces of the surface S7 and the surface S3 do not overlap each other, separating the surface S7 as an incidence surface, and forming the surface S3 as a surface only for reflection and the surface S7 as a joined surface only for a transmitting action. In addition, the angle θ may be set such that the effective surfaces of S7 and S3 do not overlap each other, S7 and S3 may be maintained as the identical surface, and S3 maybe formed as a surface only for reflection and S7 may be formed as a joined surface only for a transmitting action.

Consequently, the optical system can be reduced in size by one surface and can still enjoy the advantage of brightness. In addition, if the joined surface of S7 having only the transmitting action is eliminated and the optical system 21 and the lens 2-1 are formed as an integral object of an identical member (integrally molded product, etc.), the number of parts is reduced by one and it becomes possible to reduce costs of the optical system. Further, the joined surface of S7 having only the transmitting action may be eliminated and the optical system 21 and the lens 2-1 may be arranged with an air layer of a fine interval between them.

When it is assumed that a numerical value having a dimension of this numerical example is represented by mm, a display optical system is obtained which displays an image with a horizontal angle of view of about 50° and vertical angle of view of about 39° at an exit pupil diameter φ of 6 mm and an image display size of 10 mm×7.5 mm in the infinitive distance in the positive direction of the z axis.

Further, the optical system of this numerical example may be utilized in an image taking optical system in the same manner as First Numerical Example.

Tenth Numerical Example

Figure 25:
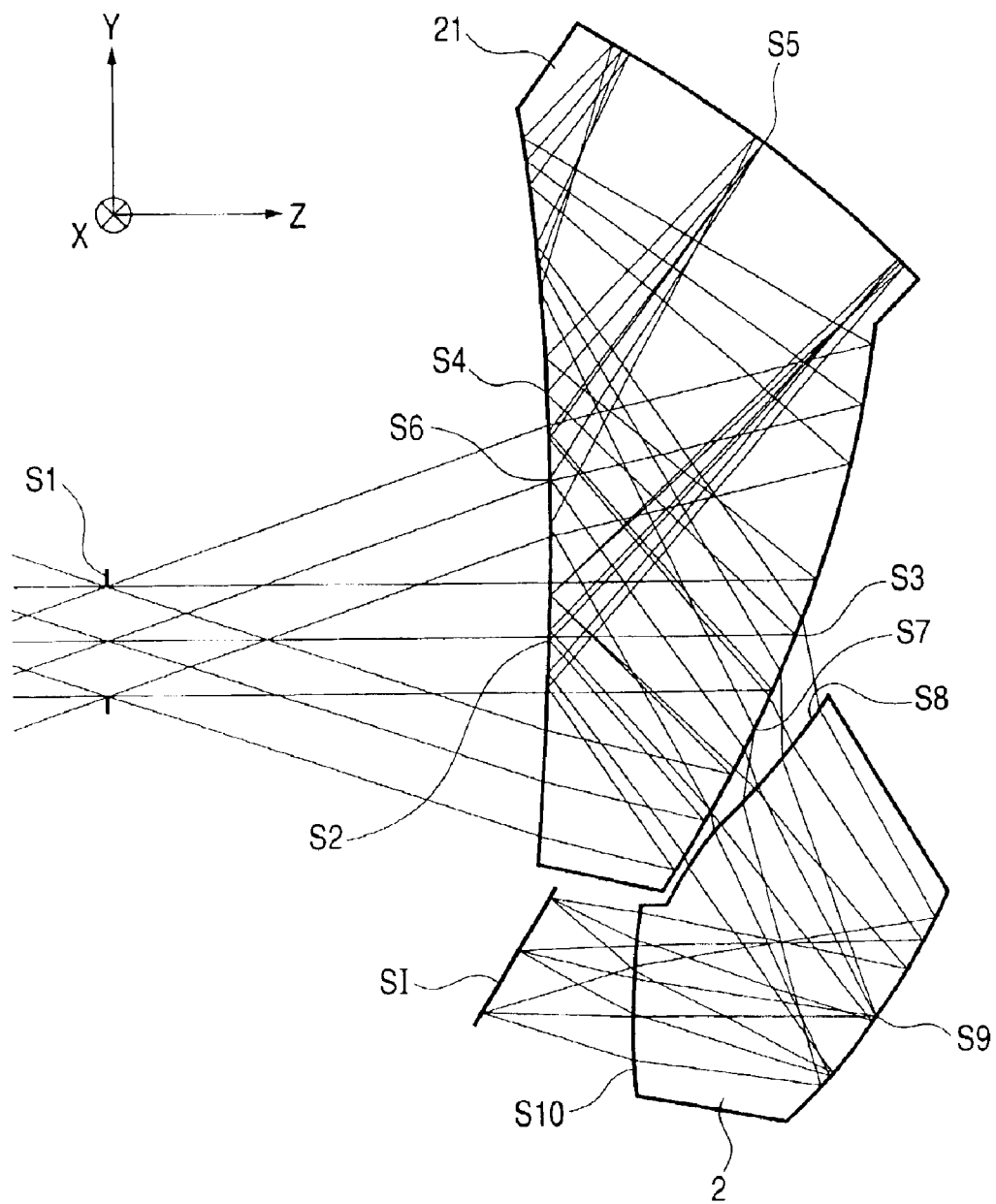
FIG. 25 is a sectional view of an optical system of Tenth Numerical Example (an embodiment form of Third Embodiment) of the present invention.

FIG. 25 shows an optical path sectional view with a numerical example of Third Embodiment shown in FIG. 7. In the figure, reference numeral 21 denotes a first optical system constituting a display optical system, which is constituted by a transparent body (optical element) of a prism shape having three optical surfaces. Reference symbols S2, S4, and S6 denote an identical surface; and S3 and S7, an identical surface. These two surfaces and S5 correspond to the surfaces A, B and C described in Fourth Embodiment, respectively.

Reference numeral 2 denotes a second optical system, which is constituted by a transparent body consisting of an identical medium having three surfaces of S8 S9 and S10. Reference symbol SI denotes an image display surface and S1 denotes an exit pupil S of the display optical system.

In this numerical example, all the optical surfaces S1 to S10 are rotation asymmetrical surfaces, which are formed in a plane symmetrical shape having the paper surface of the figure (yz section) as an only symmetrical surface.

Further, x, y and z in the figure defines a coordinate system with an optical axis direction of an observer as the z axis, a direction perpendicular to the z axis in the paper surface of the figure as the y axis, and a direction perpendicular to the paper surface as the x axis.

The optical data of Tenth Numerical Example is shown in Table 18.

TABLE 18

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −2.273 | 24.000 | −3.345 | −247.2785 | FFS 1 | 1.5709 | 33.8 |
| 3 | 0.000 | −5.208 | 35.525 | −27.157 | −67.1042 | FFS 2 | −1.5709 | 33.8 |
| 4 | 0.000 | −2.273 | 24.000 | −3.345 | −247.2785 | FFS 1 | 1.5709 | 33.8 |
| 5 | 0.000 | 16.473 | 47.429 | 41.765 | −111.3783 | FFS 3 | −1.5709 | 33.8 |
| 6 | 0.000 | −2.273 | 24.000 | −3.345 | −247.2785 | FFS 1 | 1.5709 | 33.8 |
| 7 | 0.000 | −5.208 | 35.525 | −27.157 | −67.1042 | FFS 2 | 1.0000 | |
| 8 | 0.000 | −11.004 | 33.190 | −41.277 | 15.9216 | FFS 4 | 1.5709 | 33.8 |
| 9 | 0.000 | −22.423 | 40.960 | −38.154 | −42.7750 | FFS 5 | −1.5709 | 33.8 |
| 10 | 0.000 | −23.731 | 28.162 | 0.720 | 26.4519 | FFS 6 | −1.0000 | |
| | 0.000 | −17.563 | 21.901 | −30.353 | ∞ | SPH | | |

TABLE 18-continued

| FFS 1 | k = 4.2201e+01 | c5 = −7.2651e−06 | c6 = −6.7463e−04 | c10 = −4.3866e−06 |
|---|---|---|---|---|
| | c11 = −2.9188e−05 | c12 = 3.8137e−08 | c13 = 1.6783e−08 | c14 = 7.7366e−08 |
| FFS 2 | k = 6.8375e−01 | c5 = 1.3989e−04 | c6 = 1.2750e−04 | c10 = 6.3376e−07 |
| | c11 = −2.2030e−05 | c12 = −8.2897e−08 | c13 = 1.1270e−07 | c14 = 6.4467e−08 |
| FFS 3 | k = −2.3229e+00 | c5 = 1.4037e−04 | c6 = −5.5792e−04 | c10 = −8.1600e−06 |
| | c11 = 5.1550e−06 | c12 = 2.8932e−07 | c13 = −1.8001e−08 | c14 = 1.2472e−09 |
| FFS 4 | k = −1.0391e+00 | c5 = 2.2120e−03 | c6 = −8.0615e−03 | c10 = −1.0945e−04 |
| | c11 = 4.4108e−05 | c12 = 7.0952e−06 | c13 = 6.2837e−06 | c14 = −1.4557e−05 |
| FFS 5 | k = −8.1246e+00 | c5 = −5.3103e−04 | c6 = −6.8410e−04 | c10 = −3.2097e−05 |
| | c11 = −2.0613e−06 | c12 = 1.0051e−06 | c13 = 1.0560e−06 | c14 = −5.9957e−07 |
| FFS 6 | k = 2.7242e+00 | c5 = 2.4272e−03 | c6 = −5.7624e−03 | c10 = 7.1569e−05 |
| | c11 = 7.4246e−04 | c12 = −6.1419e−06 | c13 = −7.4558e−06 | c14 = 1.4723e−05 |

$|\theta| = 8.3°$

As is seen from Table 18, a light from the image display surface SI is made incident on an optical element which is a transparent body constituting the second optical system 2 from S10, reflected by the rear surface on S9 and exits from S8 to travel toward the first optical element 21. The light that travels toward the first optical element 21 is made incident on the transparent body of the first optical element 21 from S7 (surface B), reflected by the rear surface on S6 (surface A) and reflected by the rear surface on S5 (surface C) to be returned, and thereafter, reflected by the rear surface on S4 (surface A), reflected by the rear surface on S3 (surface B), and exits the first optical element 21 from S2 to be guided to the exit pupil S1 (S).

When it is assumed that a numerical value having a dimension of this numerical example is represented by mm, a display optical system is obtained which displays an image with a horizontal angle of view of about 50° and a vertical angle of view of about 39° at an exit pupil diameter φ of 6 mm and an image display size of 10 mm×7.5 mm in the infinitive distance in the positive direction of the z axis.

Further, the optical system of this numerical example may be utilized in an image taking optical system. In this case, a light from an object point at the infinitive distance in the z axis negative direction is guided to the first optical element 21 through the stop S1. Then, the light is made incident on the first optical element 21 from S2 (surface A), reflected on S3 (surface B), reflected on S4 (surface A), reflected and returned on S5 (surface C) and reflected on S6 (surface A), and thereafter, exits from S7 (surface B) to be guided to the second optical system 2. Then, the light beam guided to the second optical system 2 is made incident on the transparent body from S8 reflected on S9, and exits from S10 to focus on the image taking surface SI.

Eleventh Numerical Example

Figure 26:
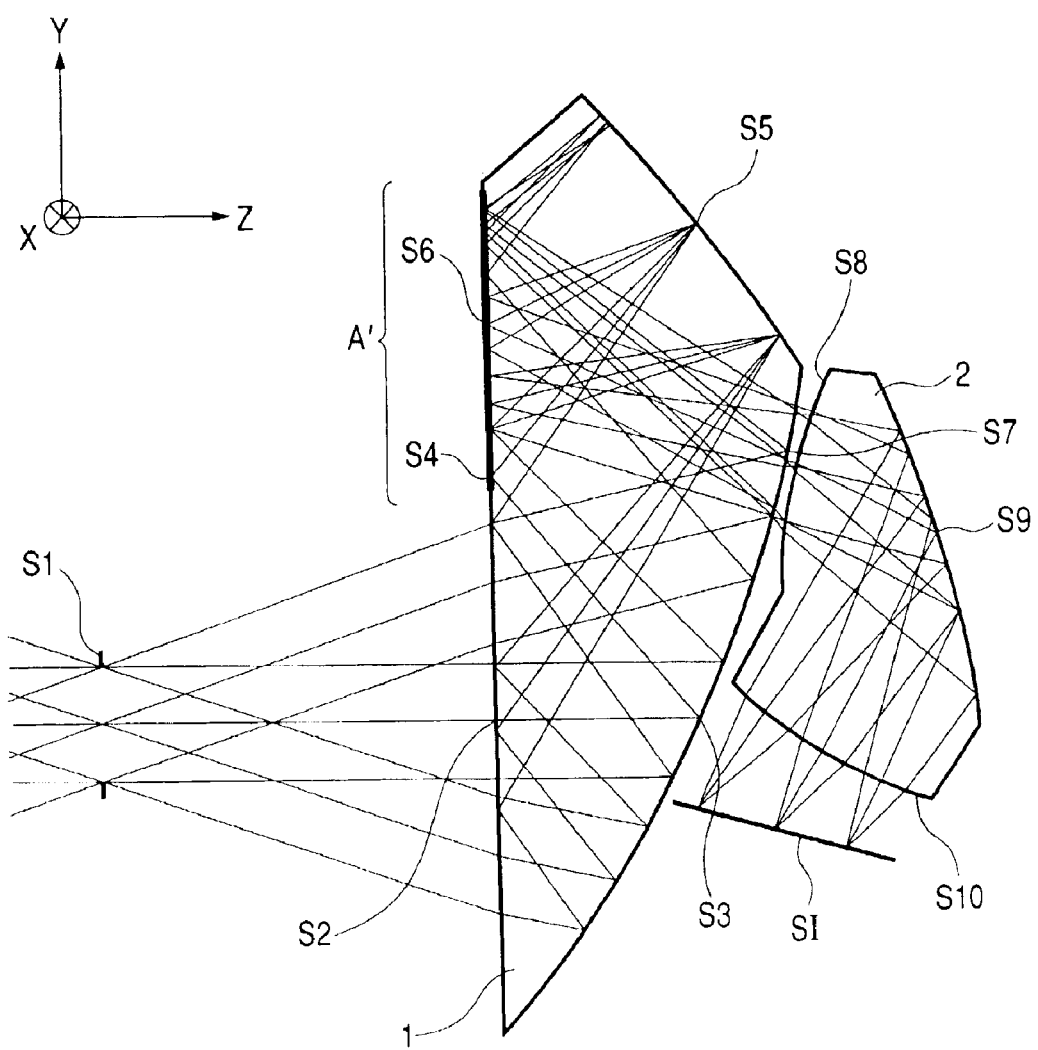
FIG. 26 is a sectional view of an optical system of Eleventh Numerical Example (an embodiment form of Third Embodiment) of the present invention.

FIG. 26 is an optical path sectional view of Eleventh Numerical Example. Also, optical data is shown in Table 19.

In this numerical example, the second optical system 2 is constituted by a transparent body (optical element) of a prism shape having three optical surfaces S8, S9, and S10 on an identical medium.

A light beam from the image display surface SI travels toward the transparent body of the first optical system 1 (first optical element) through S10, S9 and S8 of the second optical system 2 and is made incident on the transparent body from the surface S7 (surface B). Then, the light beam is reflected by the rear surface on S6 (surface A), reflected and returned by the rear surface on S5 (surface C), reflected by the rear surface on S4 (surface A), reflected by the rear surface on S3 (surface B) and exits the first optical element 21 from S2 to be guided to the exit pupil S1 (S) of the optical system.

TABLE 19

| SURF | X | Y | Z | A | R | TYP | Nd | vd |
|---|---|---|---|---|---|---|---|---|
| 1 | 0.000 | 0.000 | 0.000 | −0.000 | ∞ | SPH | 1.0000 | |
| 2 | 0.000 | 0.545 | 20.276 | −0.063 | −3944.0524 | FFS 1 | 1.5745 | 33.8 |
| 3 | 0.000 | 0.367 | 30.753 | −24.827 | −70.3936 | FFS 2 | −1.5745 | 33.8 |
| 4 | 0.000 | 0.545 | 20.276 | −0.063 | −3944.0524 | FFS 1 | 1.5745 | 33.8 |
| 5 | 0.000 | 25.100 | 31.027 | 37.931 | −85.8484 | FFS 3 | −1.5745 | 33.8 |
| 6 | 0.000 | 0.545 | 20.276 | −0.063 | −3944.0524 | FFS 1 | 1.5745 | 33.8 |
| 7 | 0.000 | 0.367 | 30.753 | −24.827 | −70.3936 | FFS 2 | 1.0000 | |
| 8 | 0.000 | 4.343 | 34.993 | 5.095 | 25.1379 | FFS 4 | 1.5826 | 33.8 |
| 9 | 0.000 | 14.871 | 41.033 | 23.836 | −48.8606 | FFS 5 | −1.5826 | 33.8 |
| 10 | 0.000 | −5.517 | 45.166 | 73.840 | 37.9004 | FFS 6 | −1.0000 | |
| | 0.000 | −8.628 | 44.265 | 78.064 | ∞ | SPH | −1.0000 | |

| FFS 1 | k: −1.5950e+05 | c5: −8.9692e−06 | c6: −1.5311e−05 | c10: −4.6491e−07 |
|---|---|---|---|---|
| | c11: −1.5598e−06 | c12: 1.1770e−07 | c13: 5.7298e−09 | c14: −1.5803e−08 |
| FFS 2 | k: −4.0144e−02 | c5: −2.4023e−05 | c6: −1.5464e−05 | c10: 1.1255e−06 |
| | c11: −1.7290e−06 | c12: 1.1758e−07 | c13: −4.7820e−08 | c14: −1.8041e−09 |
| FFS 3 | k: −1.0639e+01 | c5: 8.2736e−04 | c6: 2.7863e−04 | c10: −1.3393e−06 |
| | c11: −7.4865e−06 | c12: 2.7694e−08 | c13: 3.9079e−07 | c14: 4.1693e−07 |
| FFS 4 | k: −9.8437e−03 | c5: 3.9186e−03 | c6: 3.9859e−03 | c10: 6.2138e−06 |
| | c11: 1.0599e−04 | c12: −2.7736e−06 | c13: 1.1141e−06 | c14: 1.5242e−07 |
| FFS 5 | k: 3.7432e−01 | c5: −1.3246e−04 | c6: −6.6549e−05 | c10: 1.8086e−06 |
| | c11: 8.2132e−06 | c12: 5.3630e−07 | c13: 4.1428e−08 | c14: −7.0509e−08 |
| FFS 6 | k: 4.7782e+00 | c5: 1.0088e−02 | c6: 3.8310e−03 | c10: 1.3924e−04 |
| | c11: 3.0547e−04 | c12: −1.1736e−05 | c13: 4.2816e−06 | c14: 3.1284e−06 |

$|\theta| = 24.7°$

In this numerical example, since some reflected light beams on the surface S6 do not satisfy the conditions of total reflection, a reflective film A' is formed in a part of the surface S6 to reflect the light beams by the rear surface.

At this point, the reflective film is formed so as not to overlap an area where the exiting light beam of the surface S2 passes. The reflective film is constituted by metal, dielectrics or the like.

Further, in the area where the reflective film is formed close to the area where the exiting light beam passes, it is preferable to form the film such that a reflectance gradually decreases as it approaches the area where the exiting light beam passes because it becomes difficult to observe a boundary between the part where the reflective film is formed and the part where the reflective film is not formed.

When it is assumed that a numerical value having a dimension of this numerical example is represented by mm, a display optical system is obtained which has substantially the same specification as Tenth Numerical Example.

Further, the optical system of Eleventh Numerical Example may be utilized in an image taking optical system in the same manner as First Numerical Example.

Twelfth Numerical Example

Figure 27:
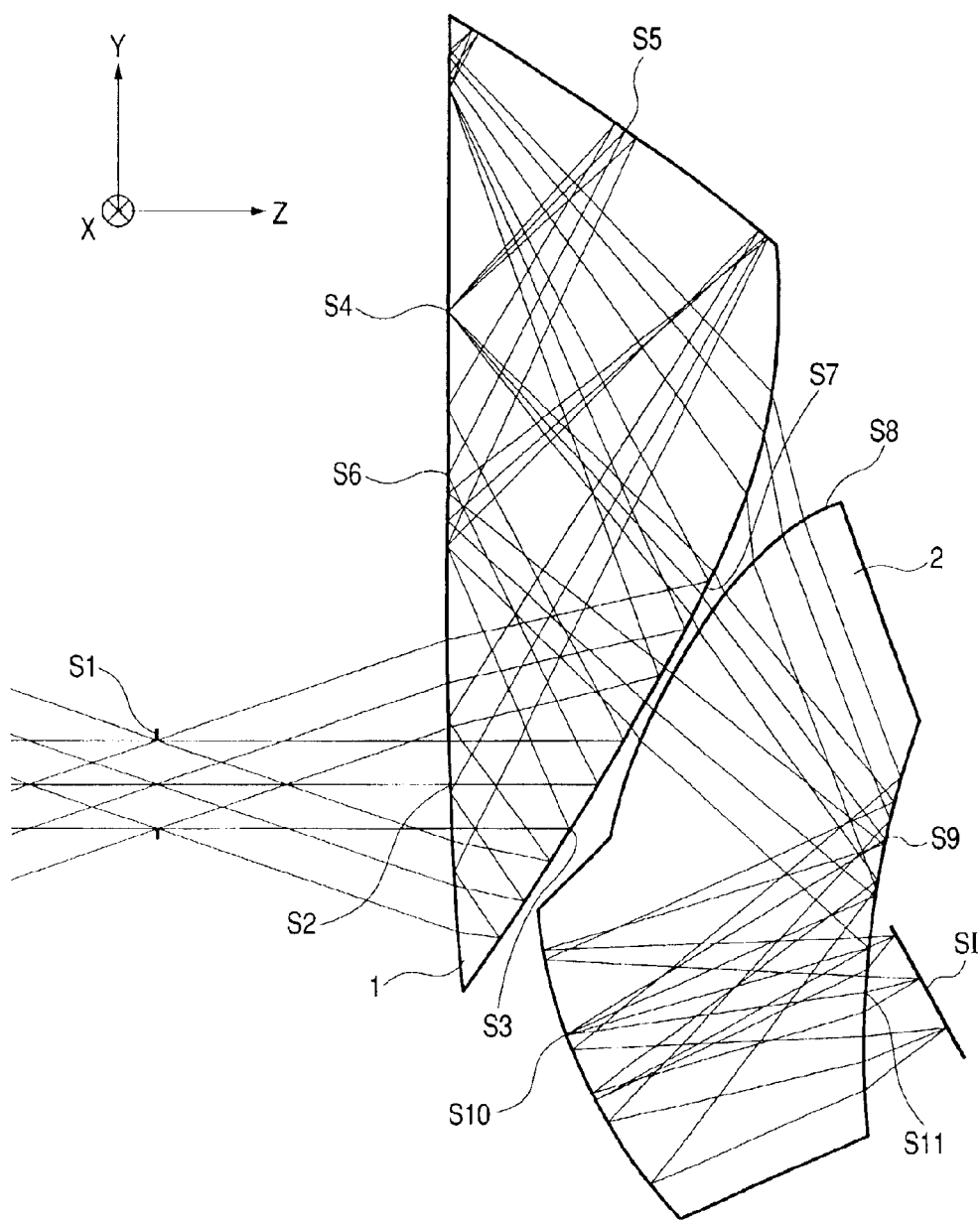
FIG. 27 is a sectional view of an optical system of Twelfth Numerical Example (an embodiment form of Third Embodiment) of the present invention.

FIG. 27 is an optical path sectional view of Twelfth Numerical Example. Also, optical data is shown in Table 20.

In this numerical example, S9 and S11 of the second optical system 2 are each an identical plane provided with a semi-transmission reflective film. The second optical system 2 is constituted by a transparent body (optical element) of a prism shape having three optical surfaces S8, S9 (surface identical to S11), and S10 on an identical medium.

All the optical surfaces S1 to S11 are rotation asymmetrical surfaces, which are formed in a plane symmetrical shape having the paper surface of the figure (yz section) as an only symmetrical surface.

Light from the image display surface SI is made incident on the optical element of the second optical system 2 from the half mirror surface S11, reflected by the rear surface on S10, reflected on the half mirror surface S9, exits from S8 to travel toward the first optical system 1. The light that travels toward the first optical system 1 is made incident on the first optical system 1 from the surface S7 (surface B). Then, the light is reflected by the rear surface on S6 (surface A), reflected and returned by the rear surface on S5 (surface C), reflected by the rear surface on S4 (surface A), reflected by the rear surface on S3 (surface B), and exits the first optical element 1 from S2 to be guided to the exit pupil S1 (S) of the optical system.

Further, the reflections on S4 and S6 are both total internal reflections.

TABLE 20

| SURF | X | Y | Z | A | R | typ | Nd | vd |
|---|---|---|---|---|---|---|---|---|
| 1 | 0.000 | 0.000 | 0.000 | −0.000 | ∞ | SPH | 1.0000 | 0.0 |
| 2 | 0.000 | 4.519 | 19.725 | 1.167 | −1736.3277 | FFS 1 | 1.5709 | 33.8 |
| 3 | 0.000 | 4.100 | 32.361 | −30.359 | −109.6220 | FFS 2 | −1.5709 | 33.8 |
| 4 | 0.000 | 4.519 | 19.725 | 1.167 | −1736.3277 | FFS 1 | 1.5709 | 33.8 |
| 5 | 0.000 | 31.151 | 48.842 | 48.213 | −122.5937 | FFS 3 | −1.5709 | 33.8 |
| 6 | 0.000 | 4.519 | 19.725 | 1.167 | −1736.3277 | FFS 1 | 1.5709 | 33.8 |
| 7 | 0.000 | 4.100 | 32.361 | −30.359 | −109.6220 | FFS 2 | 1.0000 | |
| 8 | 0.000 | 10.422 | 36.716 | −32.050 | 18.7046 | FFS 4 | 1.5709 | 33.8 |
| 9 | 0.000 | −13.564 | 48.290 | −4.970 | 139.5528 | FFS 5 | −1.5709 | 33.8 |
| 10 | 0.000 | −26.101 | 32.187 | 35.158 | 37.0465 | FFS 6 | 1.5709 | 33.8 |
| 11 | 0.000 | −13.564 | 48.290 | −4.970 | 139.5528 | FFS | 1.0000 | |
| 12 | 0.000 | −14.308 | 52.447 | 28.702 | ∞ | SPH | 1.0000 | |

| | | | | |
|---|---|---|---|---|
| FFS 1 | k: −2.4378e+06 | c5: 7.6075e−05 | c6: 6.2917e−04 | c10: 5.5959e−06 |
| | c11: 2.1685e−05 | c12: −8.2021e−09 | c13: 5.9043e−08 | c14: 1.0572e−08 |
| FFS 2 | k: 8.2754e+00 | c5: −4.9930e−04 | c6: 5.8730e−04 | c10: −1.5117e−05 |
| | c11: 1.5560e−05 | c12: 1.6187e−07 | c13: −1.1396e−08 | c14: −8.3568e−08 |
| FFS 3 | k: −8.0071e−01 | c5: −9.5216e−04 | c6: 2.2840e−04 | c10: 4.9947e−06 |
| | c11: −4.8150e−06 | c12: −3.8819e−07 | c13: 4.1668e−07 | c14: 2.5137e−07 |
| FFS 4 | k: −9.4462e−01 | c5: −1.8830e−03 | c6: −5.9203e−03 | c10: 1.2950e−04 |
| | c11: −7.4459e−05 | c12: −1.4290e−06 | c13: −1.3262e−06 | c14: −1.0302e−06 |
| FFS 5 | k: 4.9257e+01 | c5: −4.5142e−04 | c6: 1.0487e−03 | c10: −5.5426e−05 |
| | c11: −9.5671e−06 | c12: −1.0091e−07 | c13: 5.0536e−07 | c14: 1.2849e−06 |
| FFS 6 | k: 1.1901e−01 | c5: 1.1105e−04 | c6: −7.4056e−05 | c10: 1.3669e−05 |
| | c11: −5.6456e−06 | c12: −3.6994e−08 | c13: 2.1088e−08 | c14: −8.9699e−08 |

$|\theta| = 16.4°$

When it is assumed that a numerical value having a dimension of Twelfth Numerical Example is represented by mm, a display optical system is obtained which has substantially the same specification as Tenth Numerical Example.

Further, the optical system of Twelfth Numerical Example may be utilized in an image taking optical system in the same manner as First Numerical Example.

Thirteenth Numerical Example

Figure 28:
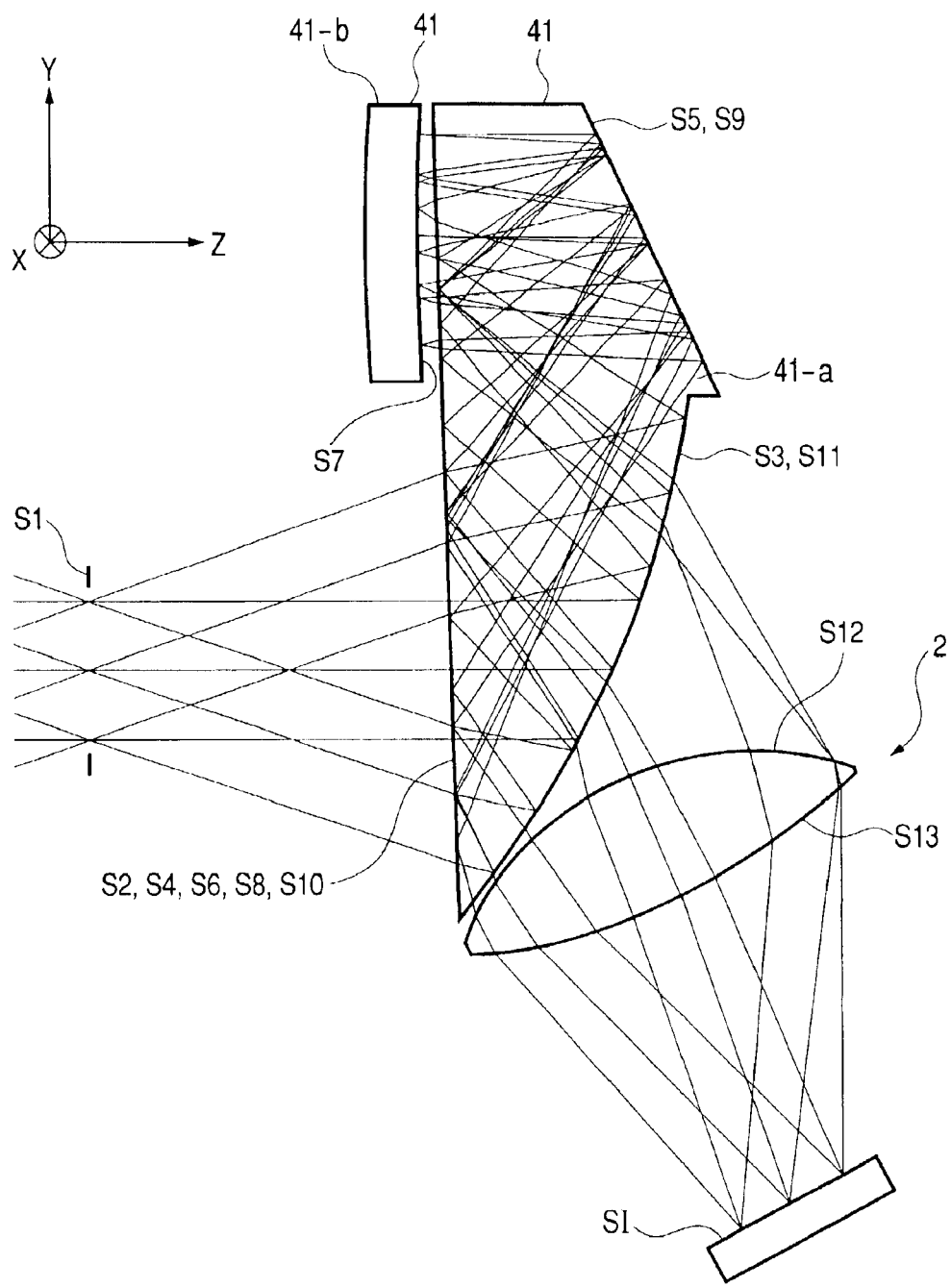
FIG. 28 is a sectional view of an optical system of Thirteenth Numerical Example (an embodiment form of Third Embodiment) of the present invention.

FIG. 28 is an optical path sectional view with a numerical example of Fifth Embodiment shown in FIG. 11.

In the figure, reference numeral 41 denotes a first optical system; reference symbol 41-a, an optical element as a transparent body having at least three surfaces; S2, S4, S6, S8 and S10, an identical surface; S3 and S11, an identical surface; and S5 and S9, an identical surface. These surfaces correspond to the surfaces A, B and C described in FIG. 5, respectively.

S7 is a return reflection surface. Reflective films are formed on this return reflection surface (S7) and the surface C (S5, S9), and a half mirror is formed on the surface B (S3, S11). Reference symbol SI denotes an image display surface and S1 denotes an exit pupil S of the display optical system.

In the figure, reference numeral 2 denotes a second optical system, which is constituted by a lens having S12 and S13.

Although the angle θ of a certain size is set in FIG. 11, the value of θ is made considerably smaller to give priority to an optical performance of the display optical system in this numerical example. Optical data of this numerical example is shown in Table 21.

TABLE 21

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | 1.755 | 20.489 | 0.880 | −607.2300 | FFS1 | 1.5745 | 33.8 |
| 3 | 0.000 | 0.352 | 30.133 | −24.069 | −59.6754 | FFS2 | −1.5745 | 33.8 |
| 4 | 0.000 | 1.755 | 20.489 | 0.880 | −607.2300 | FFS1 | 1.5745 | 33.8 |
| 5 | 0.000 | 23.714 | 32.547 | 25.095 | −295.3234 | FFS3 | −1.5745 | 33.8 |
| 6 | 0.000 | 1.755 | 20.489 | 0.880 | −607.2300 | FFS1 | −1.0000 | |
| 7 | 0.000 | 1.724 | 18.489 | −1.620 | −2000.000 | SPH | 1.0000 | |
| 8 | 0.000 | 1.755 | 20.489 | 0.880 | −607.2300 | FFS1 | 1.5745 | 33.8 |
| 9 | 0.000 | 23.714 | 32.547 | 25.095 | −295.3234 | FFS3 | −1.5745 | 33.8 |
| 10 | 0.000 | 1.755 | 20.489 | 0.880 | −607.2300 | FFS1 | 1.5745 | 33.8 |
| 11 | 0.000 | 0.352 | 30.133 | −24.069 | −59.6754 | FFS2 | 1.0000 | |
| 12 | 0.000 | −7.189 | 28.468 | −57.836 | 13.6358 | FFS4 | 1.5745 | 33.8 |
| 13 | 0.000 | −13.875 | 32.576 | −66.833 | −25.0883 | FFS5 | 1.0000 | |
|  | 0.000 | −31.547 | 40.139 | −63.210 | ∞ | SPH | 1.0000 | |

FFS1  $c1 = 5.1936e+001$   $c5 = -1.0304e-003$   $c6 = -1.8227e-005$   $c10 = 3.5979e-006$
      $c11 = -2.5096e-006$  $c12 = -7.4519e-008$  $c13 = -1.3933e-007$  $c14 = -1.7806e-008$
FFS2  $c1 = -9.6500e-001$   $c5 = -9.3134e-004$   $c6 = -4.3744e-004$   $c10 = -4.8960e-008$
      $c11 = -1.1248e-006$  $c12 = 1.0577e-008$   $c13 = 8.6492e-008$   $c14 = 1.5783e-007$
FFS3  $c1 = -1.7121e+003$   $c5 = -2.4479e-003$   $c6 = 8.2902e-005$    $c10 = 3.8688e-005$
      $c11 = -1.4501e-005$  $c12 = 1.5808e-007$   $c13 = -4.6303e-007$  $c14 = 2.9468e-007$
FFS4  $c1 = -7.3615e-001$   $c5 = 8.2022e-004$    $c6 = -1.2095e-003$   $c10 = 1.3578e-004$
      $c11 = 3.2939e-005$   $c12 = 6.2055e-007$   $c13 = 9.3472e-005$   $c14 = -3.7753e-006$
FFS5  $c1 = 1.7098e-001$    $c5 = 1.1702e-003$    $c6 = 1.6960e-003$    $c10 = 2.9578e-005$
      $c11 = 1.7027e-005$   $c12 = 6.9794e-007$   $c13 = -1.0985e-007$  $c14 = 3.9150e-006$ $|\theta| = 3.54032°$ When it is assumed that a numerical value having a dimension of this numerical example is represented by mm, a display optical system is obtained which has substantially the same specification as First Numerical Example.

Further, the optical system of this numerical example may be utilized in an image taking optical system in the same manner as First Numerical Example.

Fourteenth Numerical Example

Figure 29:
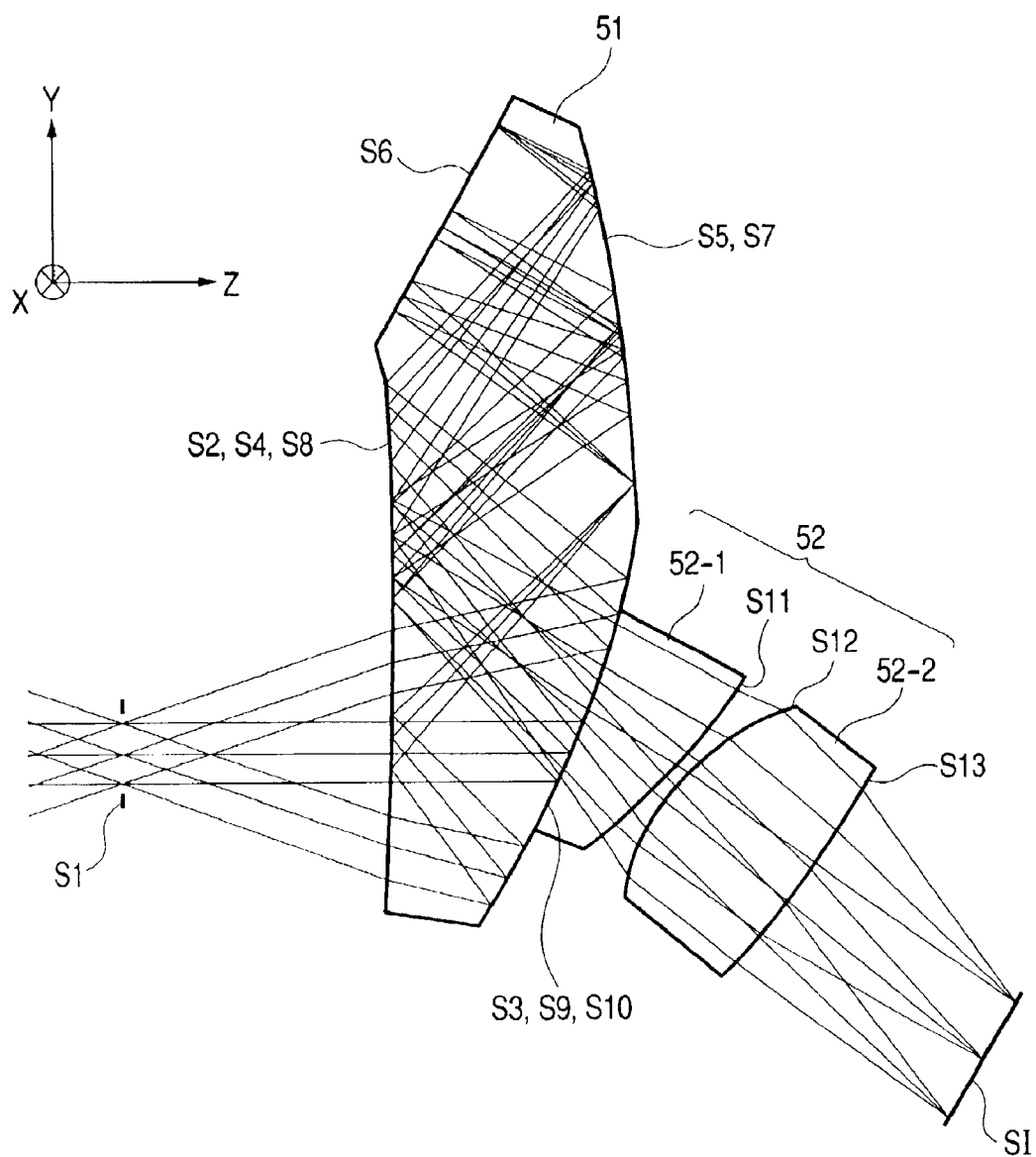
FIG. 29 is a sectional view of an optical system of Fourteenth Numerical Example (an embodiment form of Fourth Embodiment) of the present invention.

FIG. 29 is an optical path sectional view with a numerical example of Sixth Embodiment shown in FIG. 12. In the figure, reference numeral 51 denotes a first optical system constituting a display optical system, which is constituted by an optical element as a transparent body having four optical surfaces.

Reference symbols S2, S4 and S8 denote an identical surface; S3 and S9, an identical surface; and S5 and S7, an identical surface. These three surfaces correspond to the surfaces A, B and C described in Sixth Embodiment, respectively.

S6 is a return reflection surface D. Reflective films are formed on the return reflection surface D (S6) and the surface C (S5, S7), and a half mirror is formed on the surface B (S3, S9).

Reference numeral 2 denotes a second optical system, which consists of two lenses 2-1 and 2-2 that are constituted by two surfaces, respectively. One surface of the lens 2-1 is joined with the surface identical to the surface S9 of the first optical system 51. Reference symbol SI denotes an image display surface and S1 denotes an exit pupil S of the display optical system.

In this numerical example, all the optical surfaces are rotation asymmetrical surfaces, which are formed in a plane symmetrical shape having the paper surface of the figure (yz section) as an only symmetrical surface. Optical data of this numerical example is shown in Table 22.

TABLE 22

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | −0.841 | 20.716 | −1.832 | −210.9505 | FFS1 | 1.5709 | 33.8 |
| 3 | 0.000 | −3.305 | 32.926 | −25.577 | −79.0339 | FFS2 | −1.5709 | 33.8 |
| 4 | 0.000 | −0.841 | 20.716 | −1.832 | −210.9505 | FFS1 | 1.5709 | 33.8 |
| 5 | 0.000 | 19.444 | 39.528 | 3.168 | −119.0122 | FFS3 | −1.5709 | 33.8 |
| 6 | 0.000 | 0.000 | 0.000 | −35.000 | −210.0000 | FFS4 | 1.5709 | 33.8 |
| 7 | 0.000 | 19.444 | 39.528 | 3.168 | −119.0122 | FFS3 | −1.5709 | 33.8 |
| 8 | 0.000 | −0.841 | 20.716 | −1.832 | −210.9505 | FFS1 | 1.5709 | 33.8 |
| 9 | 0.000 | −3.305 | 32.926 | −25.577 | −79.0339 | FFS2 | 1.5709 | 33.8 |
| 10 | 0.000 | −3.305 | 32.926 | −25.577 | −79.0339 | FFS2 | 1.5709 | 33.8 |
| 11 | 0.000 | −2.719 | 40.967 | −45.577 | −56.8565 | SPH | 1.0000 | 0.0 |
| 12 | 0.000 | −3.433 | 41.667 | −38.076 | 17.6688 | FFS5 | 1.7700 | 50.0 |
| 13 | 0.000 | −10.834 | 51.114 | −38.076 | −94.4518 | SPH | 1.0000 | 0.0 |
| 14 | 0.000 | −22.562 | 66.084 | −29.254 | ∞ | SPH | 1.0000 | 0.0 |

TABLE 22-continued

| | | | |
|---|---|---|---|
| FFS1 | c1: −3.3800e+000 | c5: −1.5442e−004 | c6: 9.1501e−005 | c10: 3.9955e−007 |
| | c11: −1.0116e−005 | c12: −8.8473e−009 | c13: −2.5342e−011 | c14: 8.1952e−009 |
| FFS2 | c1: −1.3081e+000 | c5: 3.3647e−004 | c6: −2.1809e−004 | c10: 4.4236e−006 |
| | c11: −1.5144e−005 | c12: −1.8098e−007 | c13: −7.9785e−008 | c14: 5.1626e−008 |
| FFS3 | c1: −5.0162e+000 | c5: −5.6006e−004 | c6: 6.6079e−006 | c10: 1.9403e−006 |
| | c11: 2.7683e−006 | c12: 1.9872e−007 | c13: −5.2904e−008 | c14: 1.2571e−008 |
| FFS4 | c1: 3.3800e+000 | c5: −1.5442e−004 | c6: 9.1501e−005 | c10: 3.9955e−007 |
| | c11: −1.0116e−005 | c12: −8.8473e−009 | c13: −2.5342e−011 | c14: 8.1952e−009 |
| FFS5 | c1: −9.7960e−001 | c5: 1.1595e−003 | c6: 7.6355e−005 | c10: −2.5701e−005 |
| | c11: 1.1897e−005 | c12: 6.6007e−009 | c13: −8.9349e−007 | c14: −1.0840e−006 |

$|\theta| = 22°$

When it is assumed that a numerical value having a dimension of this numerical example is represented by mm, a display optical system is obtained which has substantially the same specification as Ninth Numerical Example.

Further, the optical system of this numerical example may be utilized in an image taking optical system in the same manner as First Numerical Example.

Fifteenth Numerical Example

Figure 30:
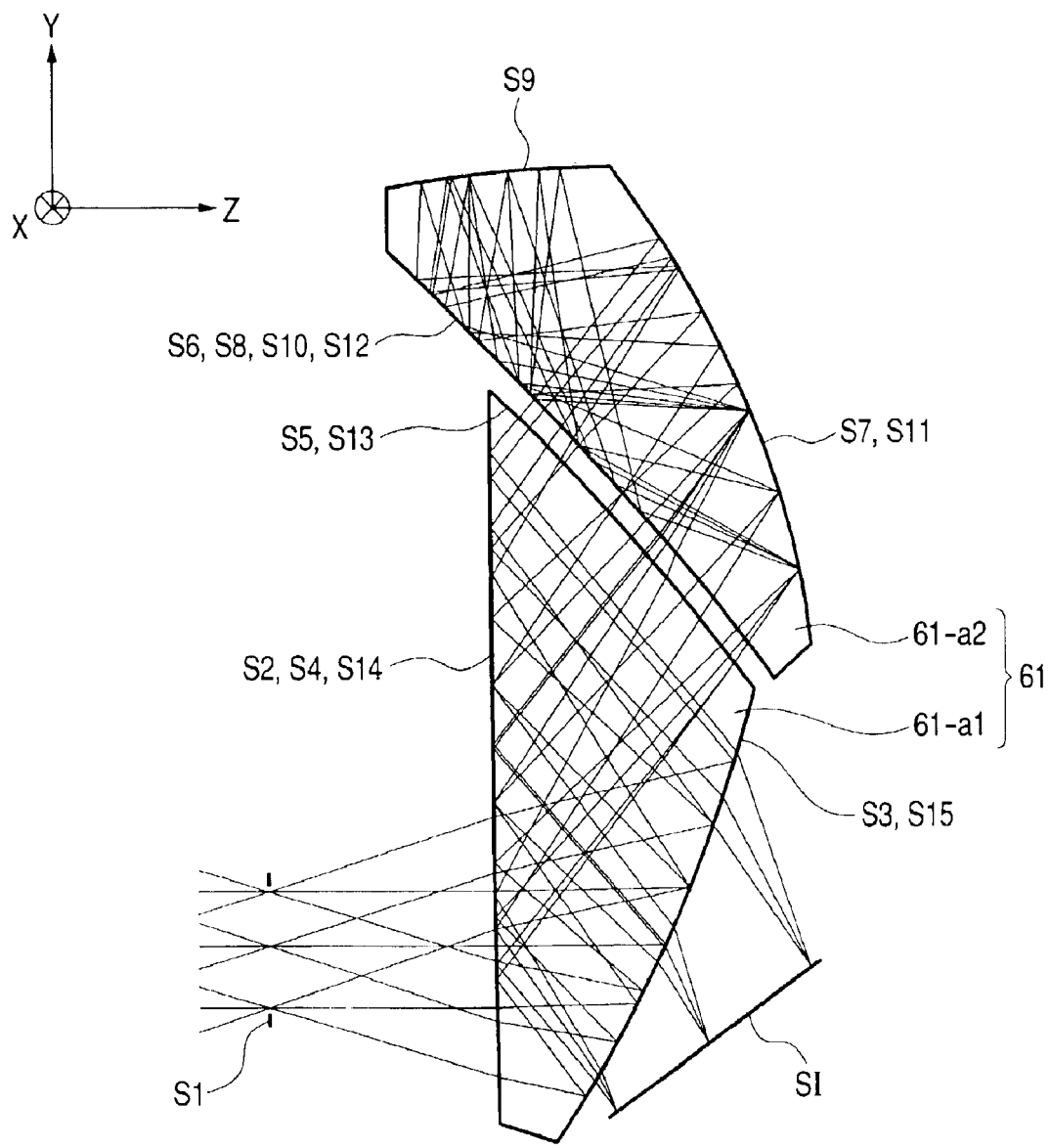
FIG. 30 is a sectional view of an optical system of Fifteenth Numerical Example (an embodiment form of Fifth Embodiment) of the present invention.

FIG. 30 is an optical path sectional view with a numerical example of an embodiment similar to Seventh Embodiment shown in FIG. 13. In the figure, reference numeral 61 denotes a first optical system constituting a display optical system, which is constituted by two optical elements 61-$a1$ and 61-$a2$, which both have three optical surfaces.

Reference symbols S2, S4, and S14 denote an identical surface; S3 and S15, an identical surface; S7 and S11, an identical surface; and S6, S8, S10 and S12, an identical surface. These four surfaces correspond to the surfaces A, B, C and E described in Seventh Embodiment, respectively.

S9 is a return reflection surface G. Reflective films are formed on the return reflection surface G (S9) and the surface C (S7, S11), and a half mirror is formed on the surface B (S3, S15).

Further, Fifteenth Numerical Example is slightly different from Seventh Embodiment shown in FIG. 13 in that the reflective member having the return reflection surface G is not used in the first optical system 61 and the surface S9 in the optical element 61-$a2$ is formed as a return reflection surface to facilitate optical adjustment. In addition, since two optical elements are adopted in the first optical system 61, a second optical system is not required between the first optical system 61 and the image display device 63 (SI).

Reference symbol SI denotes an image display surface and Si denotes an exit pupil S of the display optical system. In this numerical example, a rotation asymmetrical surface is adopted in the surface B (S3, S15), the surface C (S7, S11) and the return reflection surface G (S9), which are formed in a plane symmetrical shape having the paper surface of the figure (yz section) as an only symmetrical surface. Further, a better optical performance is obtained if the rotation asymmetrical surface is adopted in all the optical surfaces. Optical data of this numerical example is shown in Table 23.

TABLE 23

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | 0.000 | 20.000 | 0.000 | 83521.7984 | SPH | 1.5185 | 64.2 |
| 3 | 0.000 | 0.000 | 35.000 | −25.000 | −135.7647 | FFS1 | −1.5185 | 64.2 |
| 4 | 0.000 | 0.000 | 20.000 | 0.000 | 83521.7984 | SPH | 1.5185 | 64.2 |
| 5 | 0.000 | 30.000 | 37.000 | 40.000 | −1484.2778 | SPH | 1.0000 | 0.0 |
| 6 | 0.000 | 31.286 | 38.532 | 40.000 | −433.2031 | SPH | 1.5185 | 64.2 |
| 7 | 0.000 | 37.713 | 46.193 | 15.000 | −77.9579 | FFS2 | −1.5185 | 64.2 |
| 8 | 0.000 | 31.286 | 38.532 | 40.000 | −433.2031 | SPH | 1.5185 | 64.2 |
| 9 | 0.000 | 66.524 | 8.964 | 98.000 | −157.8022 | FFS3 | −1.5185 | 64.2 |
| 10 | 0.000 | 31.286 | 38.532 | 40.000 | −433.2031 | SPH | 1.5185 | 64.2 |
| 11 | 0.000 | 37.713 | 46.193 | 15.000 | −77.9579 | FFS2 | −1.5185 | 64.2 |
| 12 | 0.000 | 31.286 | 38.532 | 40.000 | −433.2031 | SPH | −1.0000 | 0.0 |
| 13 | 0.000 | 30.000 | 37.000 | 40.000 | −1484.2778 | SPH | −1.5185 | 64.2 |
| 14 | 0.000 | 0.000 | 20.000 | 0.000 | 83521.7984 | SPH | 1.5185 | 64.2 |
| 15 | 0.000 | 0.000 | 35.000 | −25.000 | −135.7647 | FFS1 | 1.0000 | 0.0 |
| 16 | 0.000 | −4.649 | 44.969 | −55.000 | ∞ | SPH | 1.0000 | 0.0 |

| | | | | |
|---|---|---|---|---|
| FFS1 | c1: 5.0603e+000 | c5: −5.2606e−004 | c6: −1.9583e−004 | c10: −2.7280e−006 |
| | c11: −2.8118e−005 | c12: −1.7960e−008 | c13: −1.0135e−008 | c14: 1.1395e−008 |
| FFS2 | c1: −8.1721e−001 | c5: −1.0408e−004 | c6: −3.6362e−005 | c10: 3.6137e−006 |
| | c11: −2.6282e−006 | c12: −9.4531e−008 | c13: −1.8160e−008 | c14: 2.9239e−008 |
| FFS3 | c1: −1.4951e+001 | c5: −1.2428e−003 | c6: −2.8930e−004 | c10: −9.4660e−007 |
| | c11: −7.1816e−006 | c12: −9.4575e−007 | c13: 5.7749e−008 | c14: 6.7102e−008 |

$|\theta| = 0.31°$

When it is assumed that a numerical value having a dimension of Fifteenth Numerical Example is represented by mm, a display optical system is obtained which has substantially the same specification as First Numerical Example.

Further, the optical system of this numerical example may be utilized in an image taking optical system in the same manner as First Numerical Example.

Sixteenth Numerical Example

Figure 31:
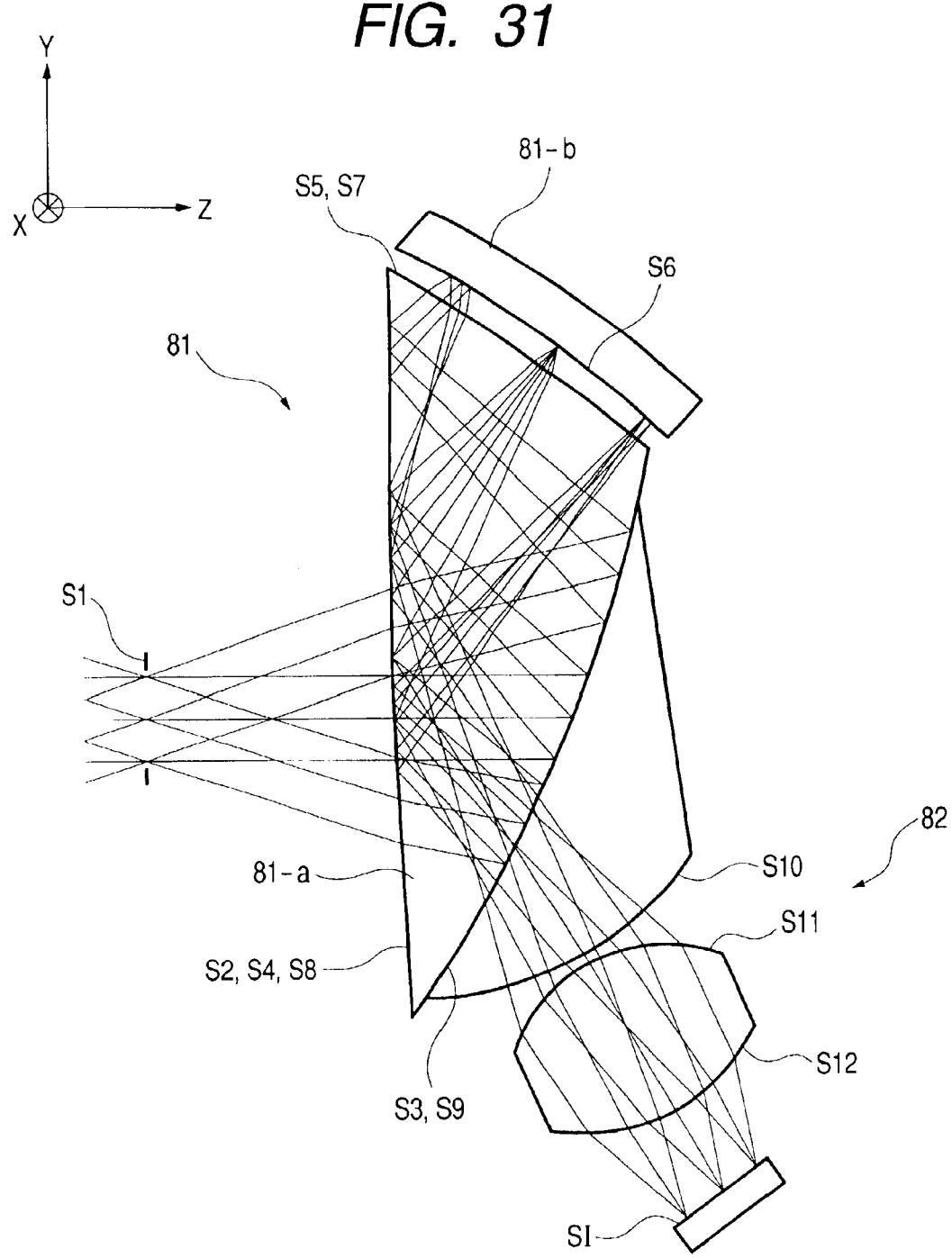
FIG. 31 is a sectional view of an optical system of Sixteenth Numerical Example (an embodiment form of Sixth Embodiment) of the present invention.
Figure 32:
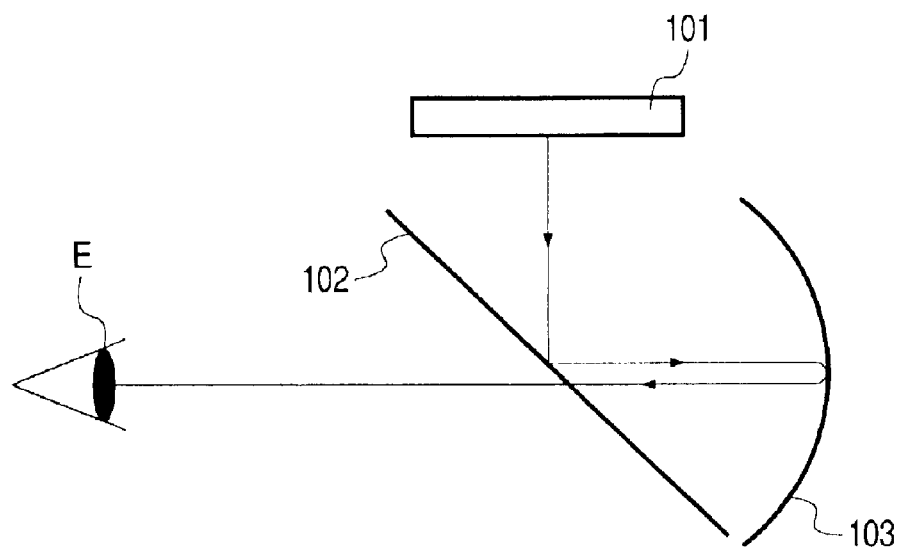
FIG. 32 is a diagram of a conventional display optical system.
Figure 33:
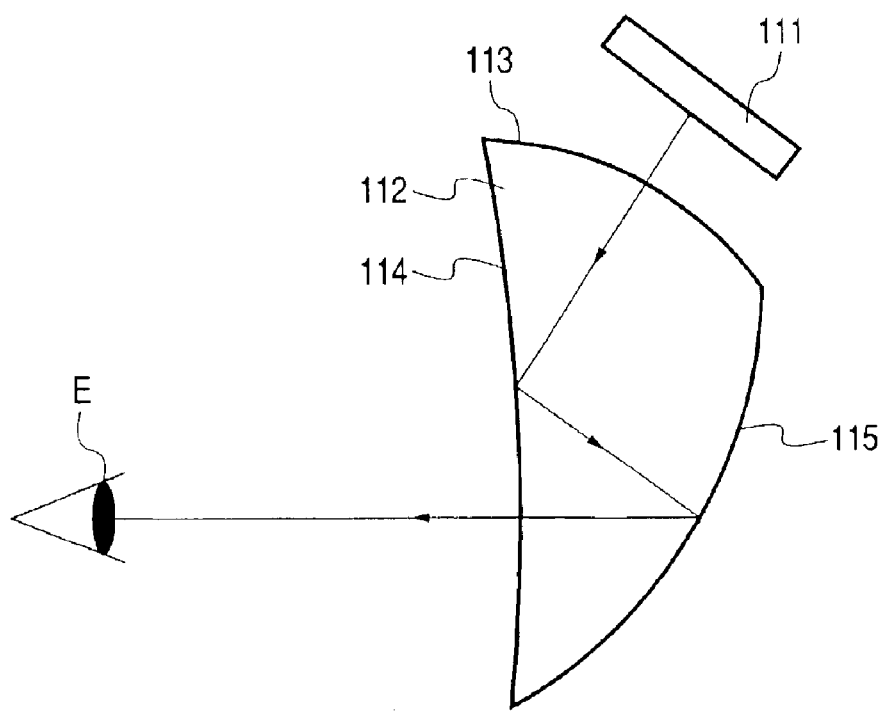
FIG. 33 is a diagram of the conventional display optical system.

FIG. 31 is an optical path sectional view with a numerical example of an embodiment similar to Ninth Embodiment shown in FIG. 15. In the figure, reference numeral 3 denotes a display optical system. Reference symbol 81-*a* denotes a transparent body (first optical element) constituting the first optical system 81 having three optical surfaces and symbol 81-*b* denotes a reflection mirror member.

Reference symbols S2, S4, S8 denote an identical surface; S3 and S9, an identical surface; and S5 and S7, an identical surface. The respective surfaces correspond to the surfaces A, B and D described in Ninth Embodiment.

In addition, reference numeral 82 in the figure denotes a second optical system, which is constituted by surfaces S9 to S12. In this numerical example, one surface of the transparent body (first optical system 81) and one surface of the transparent body (optical element) constituting the second optical system 82 are jointed, and the joined surface is S9.

Further, this numerical example is different from FIG. 15 in that the three surfaces provided in the first optical element 81-*a* are formed of curved surfaces and the optical system 82-2 forming a part of the second optical system 82 is not provided.

All these surfaces constituting surfaces of the first and second optical systems 81 and 82 are rotation asymmetrical surfaces, which are formed in a plane symmetrical shape having the paper surface of the figure (yz section) as an only symmetrical surface. Optical data of this numerical example is shown in Table 24.

a display optical system is obtained which displays an image with a horizontal angle of view of 50 ° and a vertical angle of view of 39° at an exit pupil diameter φ of 6 mm and an image display size of 10 mm×7.5 mm in the infinitive distance in the positive direction of the z axis.

Further, the optical system of this numerical example maybe utilized in an image taking optical system. In this case, light from an object point at the infinitive distance in the z axis negative direction is guided to the first optical element 81 from S2 through the stop S1. Then, the light is reflected on S3 and S4 to exit the transparent body from S5. Thereafter, the light is reflected on S6, made incident on the transparent body again from S7, reflected on S8 and exits the transparent body from S9. The light that has exit the transparent body is guided to the second optical system 2 and focus an image on the image taking surface SI via S10, S11, and S12.

What is claimed is:

1. An image display apparatus comprising:
   a display for displaying an original picture; and
   an optical system that guides a light beam from said display to an eye of an observer or a surface to have an image projected thereon, said optical system comprising:
   a first surface having at least a reflecting action; and
   a second surface that reflects a light beam reflected on said first surface toward said first surface again,
   wherein a principal ray at central angle of view that is made incident on said first surface again is reflected and

TABLE 24

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.224 | 20.435 | 1.280 | −828.7149 | FFS1 | 1.5709 | 33.8 |
| 3 | 0.000 | −2.043 | 34.424 | −24.243 | −93.4330 | FFS2 | −1.5709 | 33.8 |
| 4 | 0.000 | −0.224 | 20.435 | 1.280 | −828.7149 | FFS1 | 1.5709 | 33.8 |
| 5 | 0.000 | 25.928 | 36.891 | 52.320 | −91.0518 | FFS3 | 1.0000 | |
| 6 | 0.000 | 27.511 | 38.113 | 50.320 | −100.0000 | SPH | −1.0000 | |
| 7 | 0.000 | 25.928 | 36.891 | 52.320 | −91.0518 | FFS3 | −1.5709 | 33.8 |
| 8 | 0.000 | −0.224 | 20.435 | 1.280 | −828.7149 | FFS1 | 1.5709 | 33.8 |
| 9 | 0.000 | −2.043 | 34.424 | −24.243 | −93.4330 | FFS2 | 1.5709 | 33.8 |
| 10 | 0.000 | −20.059 | 36.317 | −57.922 | −19.5305 | FFS4 | 1.0000 | |
| 11 | 0.000 | −20.506 | 37.246 | −68.982 | 11.4838 | FFS5 | 1.5709 | 33.8 |
| 12 | 0.000 | −33.733 | 43.112 | −59.493 | −19.3820 | FFS6 | 1.0000 | |
| | 0.000 | −40.195 | 46.919 | −53.740 | ∞ | SPH | 1.0000 | |

| FFS1 | $c_1$ = −2.1849e+000 | $c_5$ = −1.0917e−003 | $c_6$ = 1.2044e−004 | $c_{10}$ = −7.3750e−007 |
|---|---|---|---|---|
| | $c_{11}$ = −6.0741e−006 | $c_{12}$ = −4.6354e−008 | $c_{13}$ = 8.4739e−009 | $c_{14}$ = −2.5652e−008 |
| FFS2 | $c_1$ = −7.5630e+000 | $c_5$ = −7.8616e−004 | $c_6$ = −1.6991e−004 | $c_{10}$ = −6.6580e−006 |
| | $c_{11}$ = 2.7084e−006 | $c_{12}$ = −1.7724e−008 | $c_{13}$ = 5.8789e−008 | $c_{14}$ = 7.5122e−008 |
| FFS3 | $c_1$ = 1.1572e+000 | $c_5$ = −1.0859e−003 | $c_6$ = 4.9398e−004 | $c_{10}$ = 6.5076e−006 |
| | $c_{11}$ = −1.2557e−005 | $c_{12}$ = 1.7275e−007 | $c_{13}$ = 1.8847e−008 | $c_{14}$ = 1.2194e−008 |
| FFS4 | $c_1$ = −3.3189e−001 | $c_5$ = −1.4535e−003 | $c_6$ = 1.9593e−003 | $c_{10}$ = 9.2628e−005 |
| | $c_{11}$ = 6.4215e−006 | $c_{12}$ = −2.3185e−006 | $c_{13}$ = 3.9919e−007 | $c_{14}$ = 3.5461e−006 |
| FFS5 | $c_1$ = −7.5154e−001 | $c_5$ = 1.0642e−003 | $c_6$ = 3.2814e−004 | $c_{10}$ = −1.0843e−004 |
| | $c_{11}$ = 8.2848e−007 | $c_{12}$ = −9.0330e−006 | $c_{13}$ = 2.0004e−006 | $c_{14}$ = −2.1897e−006 |
| FFS6 | $c_1$ = −2.2467e+000 | $c_5$ = 9.2436e−004 | $c_6$ = −3.7178e−003 | $c_{10}$ = 7.1756e−005 |
| | $c_{11}$ = −1.0102e−004 | $c_{12}$ = −1.7830e−005 | $c_{13}$ = 4.5495e−006 | $c_{14}$ = 7.4397e−006 |

|θ| = 22.7789°

As is seen from Table 24 light from the image display surface SI is made incident on the optical system 81 from S9 (surface B) via S12, S11 and S10, reflected on S8 (surface A), and refracted on S7 (surface D) to exit the transparent body of the first optical system 81. The light that exits is reflected on S6 (surface C), made incident on the transparent body again from S5 (surface D), reflected on S4 (surface A), and reflected on S3 (surface B), and exits the transparent body from S2 (surface A) to be guided to the exit pupil S1 (S).

When it is assumed that a numerical value having a dimension of this numerical example is represented by mm, travels to a side opposite to a side of the last time it is reflected from said first surface with respect to each normal line to said first surface at each hit point of the principal ray at central angle of view, and wherein said optical system forms an intermediate image of the original picture within an optical path.

2. An image display apparatus according to claim 1, further comprising a third surface that transmits or reflects the light beam reflected on said second surface and subsequently re-reflected on said first surface.

3. An image display apparatus according to claim 2, wherein said third surface is a curved surface.

4. An image display apparatus according to claim 3, wherein said third surface is a surface of a rotation asymmetrical shape.

5. An image display apparatus according to claim 3, wherein at least one of said first surface and said second surface is a surface of a rotation asymmetrical shape.

6. An image display apparatus according to claim 2, wherein a focal length of said third surface on a section including an optical path of the principal ray at central angle of view is positive, and is shorter than focal lengths of said first surface and said second surface on the section including the optical path of the principal ray at central angle of view.

7. An image display apparatus according to claim 1, wherein at least said first surface is placed on a transparent body with the inside thereof filled with an optical medium.

8. An image display apparatus according to claim 7, wherein the light is subjected to total internal reflection on said first surface.

9. An optical system comprising:

a first surface having at least a reflecting action, a principal ray incident on said first surface at a central angle of view defines a first hit point and a first normal line that is perpendicular to said first surface at the first hit point where the principal ray is reflected from said first surface;

a second surface disposed to receive the principal ray reflected from said first surface, said second surface being capable of reflecting the principal ray toward said first surface again; and a third surface capable of transmitting or reflecting the light beam reflected on said second surface prior to being re-reflected on said first surface, wherein the principal ray defines a first traveling direction with respect to the first normal line after reflection from said first surface that is opposite of a second traveling direction with respect to a second normal line defined at a second hit point of the principal ray on said first surface after reflection from said second surface, the second normal line being perpendicular to said first surface.

10. An image display apparatus according to claim 2, further comprising a transparent body of which said first optical surface, said second optical surface, and said third optical surface are formed, and wherein a light beam made incident on said transparent body follows an optical path in which a light beam is transmitted through said third optical surface, reflected on said first optical surface, reflected on said second optical surface, reflected on said first optical surface, reflected on said second optical surface, reflected on said first optical surface, reflected on said third optical surface, and transmitted through said first optical surface in order or an optical path of the opposite order to exit from said transparent body.

11. An image display apparatus according to claim 10, wherein an angle γ formed by the principal ray at central angle of view that is reflected on said second optical surface and made incident on said first optical surface first, and a relected light beam thereof satisfies a condition |γ| <60°.

12. An image display apparatus according to claim 10, wherein an angle α formed by the principal ray at central angle of view that is reflected on said first optical surface and made incident on said second surface first, and a reflected light beam thereof satisfies a condition 25° <|α|<85°.

13. An image display apparatus according to claim 10, wherein an angle β formed by the principal ray at central angle of view that is reflected on said first optical surface and made incident on said second surface for the second time, and a reflected principal ray thereof satisfies a condition 20° |β|<75°.

14. An image display apparatus according to claim 2, further comprising a transparent body on which said first optical surface, said second optical surface, and said third optical surface are formed, and wherein a light beam made incident on said transparent body follows an optical path in which a light beam is transmitted through said third optical surface, reflected on said first optical surface, reflected on said second optical surface, reflected on said first optical surface, reflected on said third optical surface, and transmitted through said first optical surface in order or an optical path of the opposite order to exit from said transparent body.

* * * * *

UNITED STATES PATENT AND TRADEMARK OFFICE
CERTIFICATE OF CORRECTION

PATENT NO. : 7,019,909 B2 Page 1 of 1
DATED : March 28, 2006
INVENTOR(S) : Shoichi Yamazaki et al.

It is certified that error appears in the above-identified patent and that said Letters Patent is hereby corrected as shown below:

Column 64,
Line 19, delete "relected" and insert -- reflected --.

Signed and Sealed this

Thirtieth Day of May, 2006

JON W. DUDAS
*Director of the United States Patent and Trademark Office*